United States Patent
Shin et al.

(10) Patent No.: US 12,004,204 B2
(45) Date of Patent: Jun. 4, 2024

(54) METHOD FOR TRANSMITTING AND RECEIVING UPLINK DATA BY USING PUR IN WIRELESS COMMUNICATION SYSTEM, AND DEVICE FOR SAME

(71) Applicant: LG Electronics Inc., Seoul (KR)

(72) Inventors: Seokmin Shin, Seoul (KR); Seonwook Kim, Seoul (KR); Changhwan Park, Seoul (KR); Hanjun Park, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 519 days.

(21) Appl. No.: 17/267,458

(22) PCT Filed: Aug. 8, 2019

(86) PCT No.: PCT/KR2019/009993
§ 371 (c)(1),
(2) Date: Feb. 9, 2021

(87) PCT Pub. No.: WO2020/032634
PCT Pub. Date: Feb. 13, 2020

(65) Prior Publication Data
US 2021/0321413 A1     Oct. 14, 2021

(30) Foreign Application Priority Data

Aug. 9, 2018   (KR) .................. 10-2018-0092751
Aug. 9, 2018   (KR) .................. 10-2018-0092765
(Continued)

(51) Int. Cl.
*H04W 72/53*     (2023.01)
*H04B 17/318*    (2015.01)
(Continued)

(52) U.S. Cl.
CPC .......... *H04W 72/53* (2023.01); *H04B 17/318* (2015.01); *H04W 56/0045* (2013.01);
(Continued)

(58) Field of Classification Search
CPC ........................... H04W 72/1268; G01S 5/08
(Continued)

(56) References Cited

U.S. PATENT DOCUMENTS

2013/0010720 A1   1/2013  Lohr et al.
2021/0345372 A1*  11/2021 Li ..................... H04W 72/1268
2021/0352691 A1*  11/2021 Li ......................... H04L 5/0044

FOREIGN PATENT DOCUMENTS

CN      103686694       3/2014
CN      103957603       7/2014
(Continued)

OTHER PUBLICATIONS

Ericsson, "New WID on Rel-16 MTC enhancements for LTE," RP-181450, 3GPP TSG RAN Meeting #80, La Jolla, USA, dated Jun. 11-14, 2018, 5 pages.
(Continued)

*Primary Examiner* — Kiet M Doan
(74) *Attorney, Agent, or Firm* — Fish & Richardson P.C.

(57) ABSTRACT

The present specification provides a method for transmitting uplink data by using a preset uplink resource (PUR) in a wireless communication system. More specifically, the method, which is performed by a terminal, includes: a step for receiving setting information from a base station in an RRC connected state, the setting information being for transmitting uplink data by using the PUR in an RRC idle state; a step for transitioning from the RRC connected state to the RRC idle state; and a step for using the PUR to transmit the uplink data to the base station in the RRC idle state on the basis of the setting information.

13 Claims, 24 Drawing Sheets

(30) Foreign Application Priority Data

| Sep. 21, 2018 | (KR) | ........................ 10-2018-0114497 |
| Nov. 2, 2018 | (KR) | ........................ 10-2018-0134001 |
| Nov. 12, 2018 | (KR) | ........................ 10-2018-0138091 |

(51) Int. Cl.
*H04W 56/00* (2009.01)
*H04W 72/0446* (2023.01)
*H04W 72/0453* (2023.01)
*H04W 72/23* (2023.01)
*H04W 76/27* (2018.01)

(52) U.S. Cl.
CPC ... *H04W 72/0446* (2013.01); *H04W 72/0453* (2013.01); *H04W 72/23* (2023.01); *H04W 76/27* (2018.02)

(58) Field of Classification Search
USPC ................................... 370/329, 316; 55/458
See application file for complete search history.

(56) References Cited

FOREIGN PATENT DOCUMENTS

| KR | 20140031242 | 3/2014 |
| WO | WO2018062957 | 4/2018 |

OTHER PUBLICATIONS

Huawei, "Summary of email discussion [99#42][NB-loT] on SPS options," R2-1711329, 3GPP TSG-RAN WG2 Meeting#99bis, Prague, Czech Republic, dated Oct. 9-13, 2017, 24 pages.

Mediatek Inc., "NB-loT Idle mode SPS for M2M regular reporting," R2-1802617, 3GPP TSG-RAN WG2 Meeting #101, Athens, Greece, dated Feb. 26-Mar. 2, 2018, 6 pages.

Office Action in Chinese Appln. No. 201980052764.6, dated Jun. 29, 2023, 18 pages (with English translation).

\* cited by examiner

METHOD FOR TRANSMITTING AND RECEIVING UPLINK DATA BY USING PUR IN WIRELESS COMMUNICATION SYSTEM, AND DEVICE FOR SAME

CROSS-REFERENCE TO RELATED APPLICATIONS

This application is the national stage filing under 35 U.S.C. 371 of international application no. Pct/kr2019/009993, filed on Aug. 8, 2019, which claims the benefit of Korean application no. 10-2018-0092751, filed on Aug. 9, 2018, Korean application no. 10-2018-0092765, filed on Aug. 9, 2018, Korean application no. 10-2018-0114497, filed on Sep. 21, 2018, Korean application no. 10-2018-0134001, filed on Nov. 2, 2018, and Korean application no. 10-2018-0138091, filed on Nov. 12, 2018, the contents of which are all hereby incorporated by reference herein in their entirety.

TECHNICAL FIELD

The present disclosure relates to a wireless communication system, and more particularly, to a method for transmitting/receiving uplink data using PUR, and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method necessary for maintaining the complexity of a terminal and saving battery in a situation where a semi-persistent scheduling (SPS) is to be operated in an NB-IoT system supporting cellular IoT (internet of things).

In addition, an object of the present disclosure is to provide a method for a terminal to transmit uplink data using PUR in idle state.

The technical objects to attain in the present disclosure are not limited to the above-described technical objects and other technical objects which are not described herein will become apparent to those skilled in the art from the following description.

Technical Solution

In the present disclosure, a method of transmitting uplink data using a preconfigured uplink resource (PUR) in a wireless communication system, the method performed by a terminal includes receiving in an RRC connected state, from a base station, configuration information for transmitting the uplink data using the PUR in an RRC idle state; transitioning from the RRC connected state to the RRC idle state; and transmitting, to the base station, the uplink data using the PUR based on the configuration information in the RRC idle state.

In addition, in the present disclosure, the configuration information includes information on a transmission interval of the uplink data and information on the number of repetitions of transmission of the uplink data.

In addition, in the present disclosure, the method further includes determining a validity of a configured timing advance (TA).

In addition, in the present disclosure, the validity of the TA is determined based on a TA validity timer, reference signal received power (RSRP) detection information, and time difference of arrival (TDoA) information.

In addition, in the present disclosure, the validity of the TA is determined by an AND operation of the TA validity timer, the RSRP detection information and the TDoA.

In addition, in the present disclosure, when the TA validity timer, the RSRP detection information and the TDoA are all positive, the TA is determined to be valid.

In addition, in the present disclosure, the method further includes performing a random access procedure for updating the TA when the TA is not valid as a result of determining the validity of the TA.

In addition, in the present disclosure, the method further includes receiving, from the base station, downlink control information (DCI) including resource information related to retransmission of the uplink data.

In addition, in the present disclosure, the DCI is received in a new search space that is distinguished from a legacy search space.

In addition, in the present disclosure, the configuration information further includes configuration information related to the new search space.

In addition, in the present disclosure, a terminal for transmitting uplink data using a preconfigured uplink resource (PUR) in a wireless communication system, the terminal includes a transmitter for transmitting a radio signal; a receiver for receiving a radio signal; and a processor for controlling the transmitter and the receiver, wherein the processor is configured to control the receiver to receive in an RRC connected state, from a base station, configuration information for transmitting the uplink data using the PUR in an RRC idle state; transition from the RRC connected state to the RRC idle state; and control the transmitter to transmit, to the base station, the uplink data using the PUR based on the configuration information in the RRC idle state.

Technical Effects

This disclosure has an effect of maintaining the complexity of the terminal and reducing battery consumption by defining a method of operating the semi-persistent scheduling (SPS) in an idle mode and/or a connected mode in the NB-IoT system supporting cellular IoT (internet of things), The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present disclosure, provide embodiments of the present disclosure, and describe the technical features of the present disclosure with the description below.

BEST MODE FOR INVENTION

Figure 1:
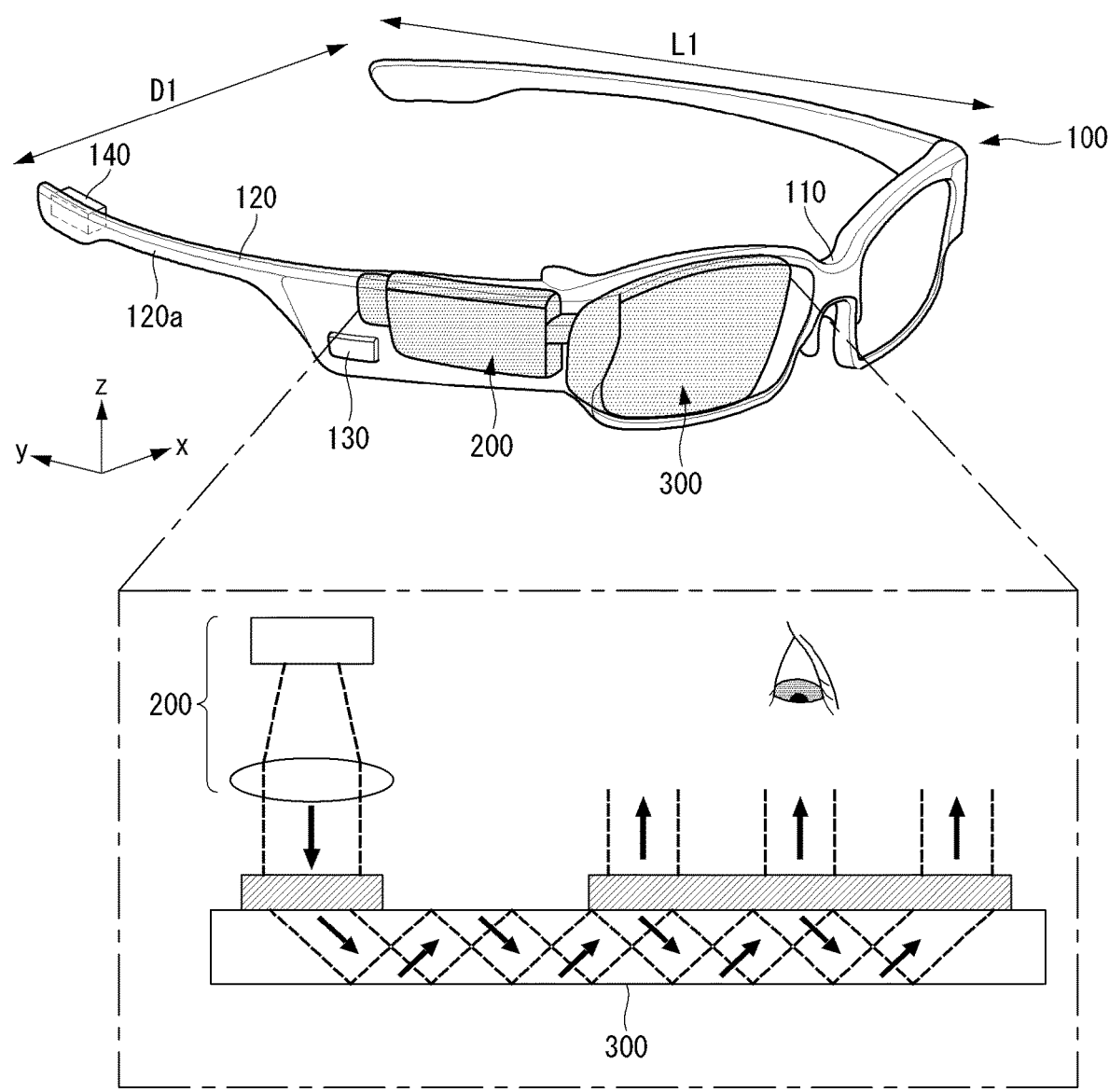
FIG. 1 is a perspective view of an augmented reality electronic device according to an embodiment of the present disclosure.

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

5G Scenario

The three main requirements areas of 5G include (1) Enhanced Mobile Broadband (eMBB) area, (2) Massive Machine Type Communication (mMTC) area, and (3) Ultra-reliable and Low Latency Communications (URLLC) area.

In some use cases, multiple areas may be required for optimization, and other use cases may be focused on only one key performance indicator (KPI). 5G supports these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOCSIS) as a means of providing streams rated at hundreds of megabits per second to gigabits per second. These high speeds are required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window and displays information that tells the driver about the distance and movement of the object. In the future, wireless modules enable communication between vehicles, exchange of information between the vehicle and supporting infrastructure, and exchange of information between the vehicle and other connected devices (e.g., devices carried by pedestrians). The safety system can lower the risk of an accident by guiding the driver through alternative courses of action to make driving safer. The next step will be a remote controlled or self-driven vehicle. It is very reliable and requires very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

Artificial Intelligence (AI)

Artificial intelligence refers to the field of researching artificial intelligence or the methodology to create it, and machine learning refers to the field of researching methodologies to define and solve various problems dealt with in the field of artificial intelligence. do. Machine learning is also defined as an algorithm that improves the performance of a task through continuous experience.

An Artificial neural network (ANN) is a model used in machine learning, and may refer to an overall model with problem-solving ability, which is composed of artificial neurons (nodes) that form a network by combining synapses. The artificial neural network may be defined by a connection pattern between neurons of different layers, a learning process for updating model parameters, and an activation function for generating an output value.

The artificial neural network may include input layer, output layer, and optionally one or more hidden layers. Each layer includes one or more neurons, and the artificial neural network may include neurons and synapses connecting neurons. In an artificial neural network, each neuron can output a function value of an activation function for input signals, weights, and biases input through synapses.

Model parameters refer to parameters that are determined through learning, and include weights of synaptic connections and biases of neurons. In addition, the hyperparameter refers to a parameter that must be set before learning in a machine learning algorithm, and includes a learning rate, iteration count, mini-batch size, and initialization function.

The purpose of learning artificial neural networks can be as determining model parameters that minimize the loss function. The loss function can be used as an index for determining an optimal model parameter in the learning process of the artificial neural network.

Machine learning can be classified into supervised learning, unsupervised learning, and reinforcement learning according to the learning method.

Supervised learning refers to a method of training an artificial neural network when a label for training data is given, and a label may mean the correct answer (or result value) that the artificial neural network must infer when training data is input to the artificial neural network. Unsupervised learning may mean a method of training an artificial neural network in a state where a label for training data is not given. Reinforcement learning may mean a learning method in which an agent defined in a certain environment learns to select an action or action sequence that maximizes the cumulative reward in each state.

Among artificial neural networks, machine learning implemented as a deep neural network (DNN) including a plurality of Hidden Layers is sometimes referred to as deep learning, and deep learning is a part of machine learning. Hereinafter, machine learning is used in the sense including deep learning.

Robot

A robot may refer to a machine that automatically processes or operates a task given by its own capabilities. In particular, a robot having a function of recognizing the environment and performing an operation by self-determining may be referred to as an intelligent robot.

Robots can be classified into industrial, medical, household, military, etc. depending on the purpose or field of use.

The robot may be provided with a driving unit including an actuator or a motor to perform various physical operations such as moving a robot joint. In addition, the movable robot includes a wheel, a brake, a propeller, and the like in a driving unit, and can travel on the ground or fly in the air through the driving unit.

Self-Driving, Autonomous-Driving

Autonomous driving refers to self-driving technology, and autonomous driving vehicle refers to a vehicle that is driven without a user's manipulation or with a user's minimal manipulation.

For example, in autonomous driving, a technology that maintains a driving lane, a technology that automatically adjusts the speed such as adaptive cruise control, a technology that automatically drives along a specified route, and a technology that automatically sets a route when a destination is set, etc. All of these can be included.

The vehicle includes all vehicles including only an internal combustion engine, a hybrid vehicle including an internal combustion engine and an electric motor, and an electric vehicle including only an electric motor, and may include not only automobiles, but also trains and motorcycles.

In this case, the autonomous vehicle can be viewed as a robot having an autonomous driving function.

Extended Reality (XR)

The extended reality collectively refers to virtual reality (VR), augmented reality (AR), and mixed reality (MR). VR technology provides only CG images of real world objects or backgrounds, AR technology provides virtually created CG images on top of real object images, and MR technology is a computer graphic technology that mixes and combines virtual objects in the real world.

MR technology is similar to AR technology in that it shows real and virtual objects together. However, in AR technology, virtual objects are used in a form that complements real objects, whereas in MR technology, virtual objects and real objects are used with equal characteristics.

XR technology can be applied to HMD (Head-Mount Display), HUD (Head-Up Display), mobile phones, tablet PCs, laptops, desktops, TVs, digital signage, etc., and devices applied with XR technology may be called as XR devices.

FIG. 1 is a perspective view of an augmented reality electronic device according to an embodiment of the present disclosure.

As shown in FIG. 1, an electronic device according to an embodiment of the present disclosure may include a frame 100, a control unit 200, and a display unit 300.

The electronic device may be provided in a glass type (smart glass). The glass-type electronic device is configured to be worn on the head of the human body, and may include a frame (case, housing, etc.) 100 therefor. The frame 100 may be formed of a flexible material to facilitate wearing.

The frame 100 is supported on the head and provides a space in which various parts are mounted. As illustrated, electronic components such as a control unit 200, a user input unit 130, or an audio output unit 140 may be mounted on the frame 100. In addition, a lens covering at least one of the left eye and the right eye may be detachably mounted on the frame 100.

As shown in the drawings, the frame 100 may have a form of glasses worn on the face of the user's body, but is not necessarily limited thereto, and may have a form such as goggles worn in close contact with the user's face.

Such a frame 100 may include a front frame 110 having at least one opening and a pair of side frames 120 extending in a first direction y crossing the front frame 110 and parallel to each other.

The control unit 200 is provided to control various electronic components provided in the electronic device.

The controller 200 may generate an image displayed to a user or an image in which the images are continuous. The controller 200 may include an image source panel that generates an image and a plurality of lenses that diffuse and converge light generated from the image source panel.

The control unit 200 may be fixed to either side frame 120 of the two side frames 120. For example, the control unit 200 may be fixed inside or outside any one side frame 120, or may be integrally formed by being built in the inside of any one side frame 120. Alternatively, the control unit 200 may be fixed to the front frame 110 or may be provided separately from the electronic device.

The display unit 300 may be implemented in the form of a head mounted display (HMD). The HMD type refers to a display method that is mounted on the head and displays an image directly in front of the user's eyes. When the user wears the electronic device, the display unit 300 may be disposed to correspond to at least one of the left eye and the right eye so that an image can be directly provided in front of the user's eyes. In this drawing, it is illustrated that the display unit 300 is positioned at a portion corresponding to the right eye so that an image can be output toward the user's right eye.

The display unit 300 may perform a user so that an image generated by the controller 200 is visible to the user while the user visually perceives the external environment. For example, the display unit 300 may project an image onto the display area using a prism.

In addition, the display unit 300 may be formed to be light-transmitting so that the projected image and the general field of view (a range that the user sees through the eyes) can be seen at the same time. For example, the display unit 300 may be translucent and may be formed of an optical element including glass.

In addition, the display unit 300 may be inserted into and fixed to an opening included in the front frame 110, or located at the rear surface of the opening (i.e., between the opening and the user), and fixed to the front frame 110. In the drawing, the display unit 300 is located at the rear of the opening and is fixed to the front frame 110 as an example, but unlike this, the display unit 300 may be arranged and fixed at various positions of the frame 100.

As shown in FIG. 1, when the control unit 200 injects image light for an image to one side of the display unit 300, the electronic device may emit image light to the other side through the display unit 300 to display an image generated by the control unit 200 to a user.

Accordingly, the user can view the image generated by the controller 200 at the same time while viewing the external environment through the opening of the frame 100. That is, the image output through the display unit 300 may be viewed as overlapping with the general view. The electronic device may provide an Augmented Reality (AR) that displays a virtual image as a single image by superimposing a virtual image on a real image or a background using such display characteristics.

Figure 2:
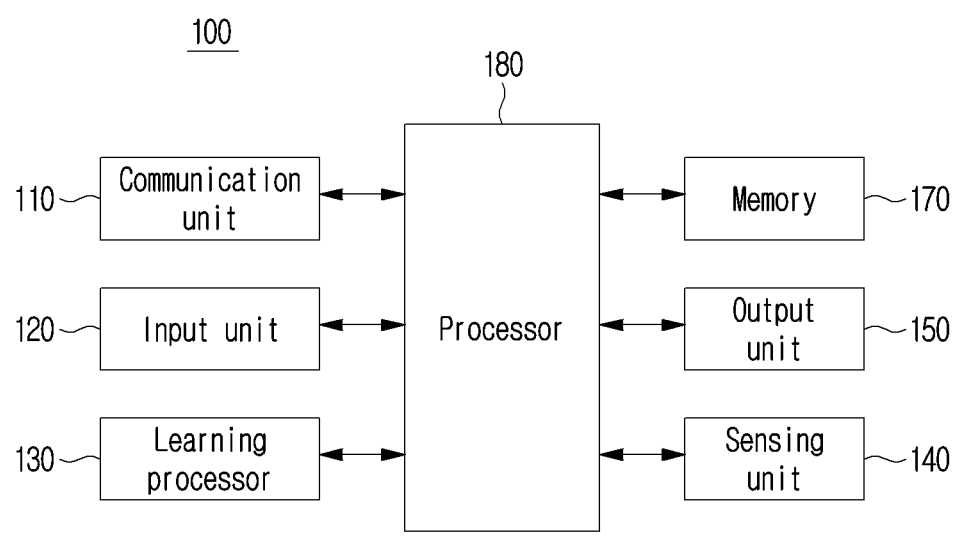
FIG. 2 illustrates an AI device 100 according to an embodiment of the present disclosure.

FIG. 2 illustrates an AI device 100 according to an embodiment of the present disclosure.

The AI device 100 may be implemented as a fixed device or a movable device such as a TV, a projector, a mobile phone, a smartphone, a desktop computer, a laptop computer, a digital broadcasting terminal, a personal digital assistants (PDA), a portable multimedia player (PMP), a navigation, a tablet PC, a wearable device, a set-top box (STB), a DMB receiver, a radio, a washing machine, a refrigerator, a desktop computer, a digital signage, a robot, a vehicle, and the like.

Referring to FIG. 2, the terminal 100 may include a communication unit 110, an input unit 120, a learning processor 130, a sensing unit 140, an output unit 150, a memory 170, and a processor 180.

The communication unit 110 may transmit and receive data with external devices such as other AI devices 100a to 100e or the AI server 200 using wired/wireless communication technology. For example, the communication unit 110 may transmit and receive sensor information, a user input, a learning model, and a control signal with external devices.

Here, the communication technologies used by the communication unit 110 include Global System for Mobile communication (GSM), Code Division Multi Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, and Near Field Communication (NFC) and the like.

The input unit 120 may acquire various types of data.

Here, the input unit 120 may include a camera for inputting an image signal, a microphone for receiving an audio signal, and a user input unit for receiving information from a user. Here, by treating a camera or microphone as a sensor, a signal acquired from the camera or microphone may be referred to as sensing data or sensor information.

The input unit 120 may acquire input data to be used when acquiring an output by using training data for model training and the training model. The input unit 120 may obtain unprocessed input data, and in this case, the processor 180 or the learning processor 130 may extract an input feature as a pre-process for the input data.

The learning processor 130 may train a model composed of an artificial neural network using the training data. Here, the learned artificial neural network may be referred to as a learning model. The learning model can be used to infer a result value for new input data other than the training data, and the inferred value can be used as a basis for a decision to perform a certain operation.

In this case, the learning processor 130 may perform AI processing together with the learning processor 240 of the AI server 200.

Here, the learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 may acquire at least one of internal information of the AI device 100, information on the surrounding environment of the AI device 100, and user information by using various sensors.

Here, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, a radar, etc.

The output unit 150 may generate output related to visual, auditory or tactile sense.

Here, the output unit 150 may include a display unit that outputs visual information, a speaker that outputs auditory information, and a haptic module that outputs tactile information.

The memory 170 may store data supporting various functions of the AI device 100. For example, the memory 170 may store input data, training data, a learning model, and a learning history acquired from the input unit 120.

The processor 180 may determine at least one executable operation of the AI device 100 based on information determined or generated using a data analysis algorithm or a machine learning algorithm. Further, the processor 180 may perform a determined operation by controlling the components of the AI device 100.

To this end, the processor 180 may request, search, receive, or utilize data from the learning processor 130 or the memory 170, and may control the components of the AI device 100 to perform a predicted or desirable operation among the at least one executable operation.

Here, if connection of an external device is required to perform the determined operation, the processor 180 may generate a control signal for controlling the corresponding external device and transmit the generated control signal to the corresponding external device.

The processor 180 may obtain intention information for a user input, and determine a user's requirement based on the obtained intention information.

Here, the processor 180 may obtain intention information corresponding to the user input by using at least one of a Speech To Text (STT) engine for converting a speech input into a character string or a Natural Language Processing (NLP) engine for obtaining intention information of a natural language.

Here, at least one or more of the STT engine and the NLP engine may be composed of an artificial neural network at least partially trained according to a machine learning algorithm. In addition, at least one of the STT engine or the NLP engine may be learned by the learning processor 130, learned by the learning processor 240 of the AI server 200, or learned by distributed processing thereof.

The processor 180 may collect history information including user feedback on the operation content or operation of the AI device 100, and store it in the memory 170 or the learning processor 130, or transfer to an external device such as the AI server 200. The collected historical information can be used to update the learning model.

The processor 180 may control at least some of the components of the AI device 100 to drive an application program stored in the memory 170. Further, the processor 180 may operate by combining two or more of the components included in the AI device 100 to drive the application program.

Figure 3:
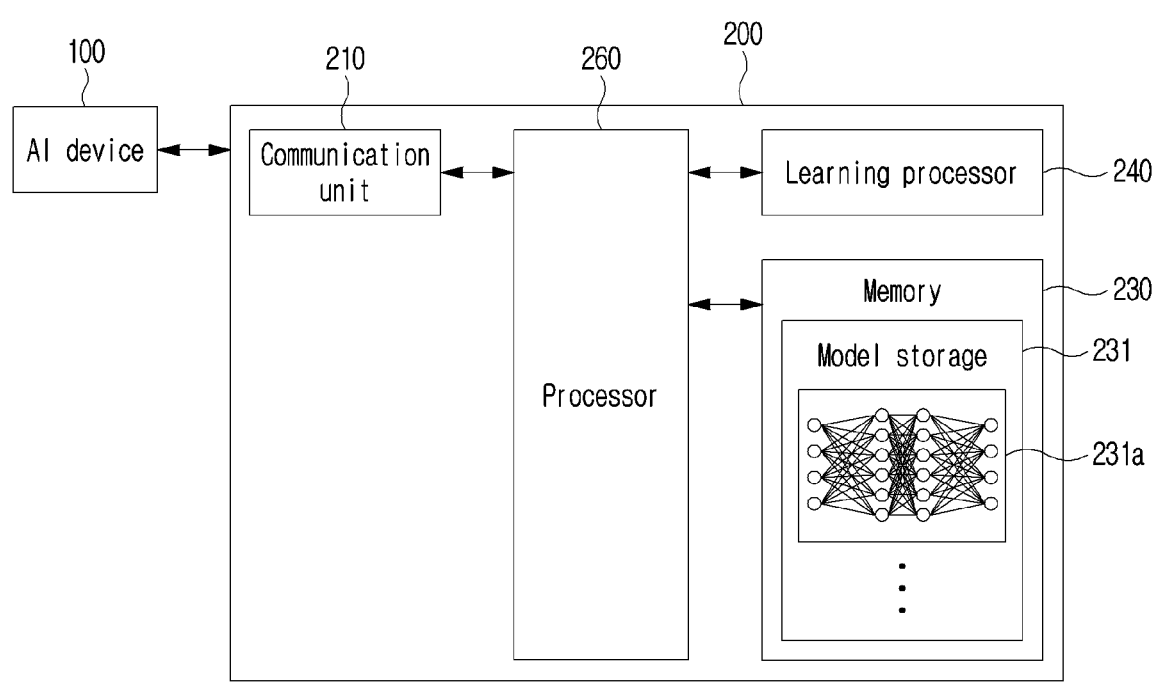
FIG. 3 illustrates an AI server 200 according to an embodiment of the present disclosure.

FIG. 3 illustrates an AI server 200 according to an embodiment of the present disclosure.

Referring to FIG. 3, the AI server 200 may refer to a device that trains an artificial neural network using a machine learning algorithm or uses the learned artificial neural network. Here, the AI server 200 may be composed of a plurality of servers to perform distributed processing, or may be defined as a 5G network. In this case, the AI server 200 may be included as a part of the AI device 100 to perform at least part of AI processing together.

The AI server 200 may include a communication unit 210, a memory 230, a learning processor 240, and a processor 260.

The communication unit 210 may transmit and receive data with an external device such as the AI device 100.

The memory 230 may include a model storage 231. The model storage 231 may store a model (or artificial neural network, 231a) being trained or trained through the learning processor 240.

The learning processor 240 may train the artificial neural network 231a using the training data. The learning model may be used while being mounted on the AI server 200 of an artificial neural network, or may be mounted on an external device such as the AI device 100 and used.

The learning model can be implemented in hardware, software, or a combination of hardware and software. When part or all of the learning model is implemented in software, one or more instructions constituting the learning model may be stored in the memory 230.

The processor 260 may infer a result value for new input data using the learning model, and generate a response or a control command based on the inferred result value.

Figure 4:
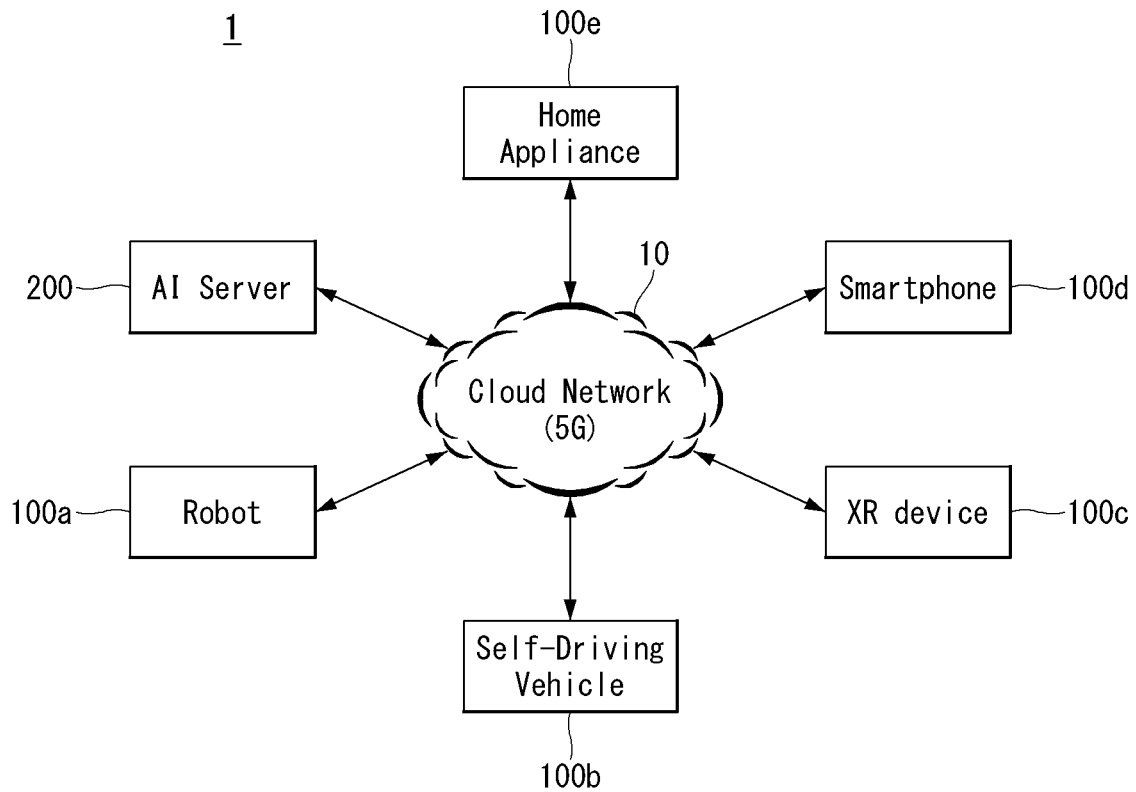
FIG. 4 illustrates an AI system according to an embodiment of the present disclosure.

FIG. 4 illustrates an AI system according to an embodiment of the present disclosure.

Referring to FIG. 4, the AI system 1 includes at least one of an AI server 200, a robot 100a, a self-driving (autonomous) vehicle 100b, an XR device 100c, a smartphone 100d, or a home appliance 100e. connected with the cloud network 10. Here, the robot 100a to which the AI technology is applied, the self-driving vehicle 100b, the XR device 100c, the smart phone 100d, or the home appliance 100e may be referred to as the AI devices 100a to 100e.

The cloud network 10 may constitute a part of the cloud computing infrastructure or may mean a network that exists in the cloud computing infrastructure. Here, the cloud network 10 may be configured using a 3G network, a 4G or long term evolution (LTE) network, or a 5G network.

That is, the devices 100a to 100e and 200 constituting the AI system 1 may be connected to each other through the cloud network 10. In particular, the devices 100a to 100e and 200 may communicate with each other through a base station, but may communicate with each other directly without through a base station.

The AI server 200 may include a server that performs AI processing and a server that performs an operation on big data.

The AI server 200 is connected through the cloud network 10 with at least one of the robot 100a, the self-driving vehicle 100b, the XR device 100c, the smartphone 100d, or a the home appliance 100e, which are AI devices constituting the AI system 1 and may help at least part of the AI processing of the connected AI devices 100a to 100e.

In this case, the AI server 200 may train an artificial neural network according to a machine learning algorithm in place of the AI devices 100a to 100e, and may directly store the learning model or transmit it to the AI devices 100a to 100e.

At this time, the AI server 200 may receive input data from the AI devices 100a to 100e, infer a result value for the received input data using a learning model, and generate a response or a control command based on the inferred result value, and transmit it to the AI devices 100a to 100e.

Alternatively, the AI devices 100a to 100e may infer a result value for input data using a direct learning model and generate a response or a control command based on the inferred result value.

Hereinafter, various embodiments of the AI devices 100a to 100e to which the above-described technology is applied will be described. Here, the AI devices 100a to 100e shown in FIG. 4 may be as a specific example of the AI device 100 shown in FIG. 2.

AI+Robot

The robot 100a is applied with AI technology and may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implementing the same as hardware.

The robot 100a may acquire status information of the robot 100a using sensor information obtained from various types of sensors, detect (recognizes) surrounding environments and objects, generate map data, decide a moving route and a driving plan, decide a response to user interaction, or decide an action.

Here, the robot 100a may use sensor information obtained from at least one sensor among a lidar, a radar, and a camera in order to determine the moving route and the driving plan.

The robot 100a may perform the above operations using a learning model composed of at least one artificial neural network. For example, the robot 100a may recognize a surrounding environment and an object using a learning model, and may determine an operation using the recognized surrounding environment information or object information. Here, the learning model may be directly learned by the robot 100a or learned by an external device such as the AI server 200.

Here, the robot 100a may perform an operation by generating a result using a direct learning model, but it may transmit sensor information to an external device such as the AI server 200 and perform the operation by receiving the result generated accordingly.

The robot 100a may determine the moving route and the driving plan using at least one of map data, object information detected from sensor information, or object information obtained from an external device, and may control the driving unit to drive the robot 100a according to the determined moving route and driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, type, distance, and location.

In addition, the robot 100a may perform an operation or run by controlling a driving unit based on a user's control/interaction. In this case, the robot 100a may acquire interaction intention information according to a user's motion or voice speech, and determine a response based on the obtained intention information to perform the operation.

AI+Autonomous Driving

The self-driving (autonomous) vehicle 100b may be implemented as a mobile robot, vehicle, or unmanned aerial vehicle by applying AI technology.

The self-driving vehicle 100b may include an autonomous driving control module for controlling an autonomous driving function, and the autonomous driving control module may refer to a software module or a chip implementing the same as hardware. The autonomous driving control module may be included inside as a configuration of the self-driving vehicle 100b, but may be configured as separate hardware and connected to the exterior of the self-driving vehicle 100b.

The self-driving vehicle 100b may acquire status information of the self-driving vehicle 100b using sensor information obtained from various types of sensors, detect (recognizes) surrounding environments and objects, generate map data, decide a moving route and a driving plan, decide a response to user interaction, or decide an action.

Here, the self-driving vehicle 100b may use sensor information obtained from at least one sensor among a lidar, a radar, and a camera, similar to the robot 100a, in order to determine the moving route and the driving plan.

In particular, the self-driving vehicle 100b may recognize an environment or object in an area where the field of view is obscured or an area greater than a certain distance by receiving sensor information from external devices or directly recognized information from external devices.

The self-driving vehicle 100b may perform the above operations using a learning model composed of at least one artificial neural network. For example, the self-driving vehicle 100b may recognize a surrounding environment and an object using a learning model, and may determine a driving path using the recognized surrounding environment information or object information. Here, the learning model may be directly learned by the self-driving vehicle 100b or learned by an external device such as the AI server 200.

Here, the self-driving vehicle 100b may perform an operation by generating a result using a direct learning model, but it may transmit sensor information to an external device such as the AI server 200 and perform the operation by receiving the result generated accordingly.

The self-driving vehicle 100b may determine the moving route and the driving plan using at least one of map data, object information detected from sensor information, or object information obtained from an external device, and may control the driving unit to drive the self-driving vehicle 100b according to the determined moving route and driving plan.

The map data may include object identification information on various objects arranged in a space (e.g., road) in which the self-driving (autonomous) vehicle 100b moves. For example, the map data may include object identification information on fixed objects such as street lights, rocks, and buildings and movable objects such as vehicles and pedestrians. In addition, the object identification information may include a name, type, distance, and location.

In addition, the self-driving vehicle 100b may perform an operation or drive by controlling a driving unit based on a user's control/interaction. In this case, the self-driving vehicle 100b may acquire interaction intention information according to a user's motion or voice speech, and determine a response based on the obtained intention information to perform the operation.

AI+XR

The XR device 100c is applied with AI technology, and may be implemented as HMD (Head-Mount Display), HUD (Head-Up Display) provided in the vehicle, a TV, a mobile phone, a smart phone, a computer, a wearable device, a home appliance, a digital signage, a vehicle, a fixed robot or a mobile robot.

The XR device 100c may acquire information on a surrounding space or a real object by analyzing 3D point cloud data or image data acquired through various sensors or from an external device to generate location data and attribute data for 3D points, and may render the XR object to be displayed to output. For example, the XR apparatus 100c may output an XR object including additional information on the recognized object corresponding to the recognized object.

The XR apparatus 100c may perform the above operations using a learning model composed of at least one artificial neural network. For example, the XR device 100c may recognize a real object from 3D point cloud data or image data using a learning model, and may provide information corresponding to the recognized real object. Here, the learning model may be directly learned by the XR device 100c or learned by an external device such as the AI server 200.

At this time, the XR device 100c may directly generate a result using a learning model to perform an operation, but may also transmit sensor information to an external device such as the AI server 200 and receive the generated result to perform the operation.

AI+Robot+Autonomous Driving

The robot 100a may be implemented as a guide robot, a transport robot, a cleaning robot, a wearable robot, an entertainment robot, a pet robot, an unmanned flying robot, etc. by applying AI technology and autonomous driving technology.

The robot 100a to which AI technology and autonomous driving technology are applied may refer to a robot having an autonomous driving function or a robot 100a interacting with the self-driving vehicle 100b.

The robot 100a having an autonomous driving function may collectively refer to devices that move by themselves according to a given movement line without the user's control or by determining the movement line by themselves.

The robot 100a having an autonomous driving function and the self-driving vehicle 100b may use a common sensing method to determine one or more of a moving route or a driving plan. For example, the robot 100a having an autonomous driving function and the self-driving vehicle 100b may determine one or more of a movement route or a driving plan using information sensed through a lidar, a radar, and a camera.

The robot 100a interacting with the self-driving vehicle 100b exists separately from the self-driving vehicle 100b and may be linked to an autonomous driving function inside or outside the autonomous driving vehicle 100b, or may perform an operation associated with the user on board in the self-driving vehicle 100b.

Here, the robot 100a interacting with the self-driving vehicle 100b may control or assist the autonomous driving function of the self-driving vehicle 100b by acquiring sensor information on behalf of the self-driving (autonomous) vehicle 100b to provide it to the self-driving vehicle 100b, or acquiring sensor information and generating object information on the surrounding environment to provide it to the self-driving vehicle 100b.

Alternatively, the robot 100a interacting with the self-driving vehicle 100b may monitor a user in the self-driving vehicle 100b or control functions of the self-driving vehicle 100b through interaction with the user. For example, when it is determined that the driver is in a drowsy state, the robot 100a may activate an autonomous driving function of the self-driving vehicle 100b or assist in controlling the driving unit of the self-driving vehicle 100b. Here, the functions of the self-driving vehicle 100b controlled by the robot 100a may include not only an autonomous driving function, but also functions provided by a navigation system or an audio system provided inside the self-driving vehicle 100b.

Alternatively, the robot 100a interacting with the self-driving vehicle 100b may provide information or assist a function to the self-driving vehicle 100b from outside of the self-driving vehicle 100b. For example, the robot 100a may provide traffic information including signal information to the self-driving vehicle 100b, such as a smart traffic light, or automatically connect an electric charger to the charging port by interacting with the self-driving vehicle 100b, such as an automatic electric charger for an electric vehicle.

AI+Robot+XR

The robot 100a may be implemented as a guide robot, a transport robot, a cleaning robot, a wearable robot, an entertainment robot, a pet robot, an unmanned flying robot, a drone, etc. by applying AI technology and XR technology.

The robot 100a to which the XR technology is applied may refer to a robot to be controlled/interacted within an XR image. In this case, the robot 100a is distinguished from the XR device 100c and may be interacted with each other.

When the robot 100a, which is the object of control/ interaction in the XR image, acquires sensor information from sensors including a camera, the robot 100a or the XR device 100c may generate an XR image based on the sensor information, and XR device 100c may output the generated XR image. In addition, the robot 100a may operate based on a control signal input through the XR device 100c or a user's interaction.

For example, the user may check the XR image corresponding to the viewpoint of the robot 100a linked remotely through an external device such as the XR device 100c, and may adjust the autonomous driving path of the robot 100a through the interaction, or control motion or driving, or check information on surrounding objects.

AI+Autonomous Driving+XR

The self-driving (autonomous) vehicle 100b may be implemented as a mobile robot, a vehicle, or an unmanned aerial vehicle by applying AI technology and XR technology.

The self-driving vehicle 100b to which the XR technology is applied may mean an autonomous driving vehicle including a means for providing an XR image, or an autonomous driving vehicle that is an object of control/interaction within the XR image. In particular, the self-driving vehicle 100b, which is an object of control/interaction in the XR image, is distinguished from the XR device 100c and may be interacted with each other.

The self-driving vehicle 100b having a means for providing an XR image may acquire sensor information from sensors including a camera, and may output an XR image generated based on the acquired sensor information. For example, the self-driving vehicle 100b may provide an XR object corresponding to a real object or an object in a screen to the occupant by outputting an XR image with a HUD.

In this case, when the XR object is output to the HUD, at least a part of the XR object may be output to overlap the actual object facing the occupant's gaze. On the other hand, when the XR object is output on a display provided inside the self-driving vehicle 100b, at least a part of the XR object may be output to overlap an object in the screen. For example, the self-driving vehicle 100b may output XR objects corresponding to objects such as lanes, other vehicles, traffic lights, traffic signs, motorcycles, pedestrians, and buildings.

When the self-driving vehicle 100b, which is an object of control/interaction in the XR image, acquires sensor information from sensors including a camera, the self-driving vehicle 100b or the XR device 100c may generate an XR image based on the sensor information, and output the generated XR image. In addition, the self-driving vehicle 100b may operate based on a control signal input through an external device such as the XR device 100c or a user's interaction.

General System

Figure 5:
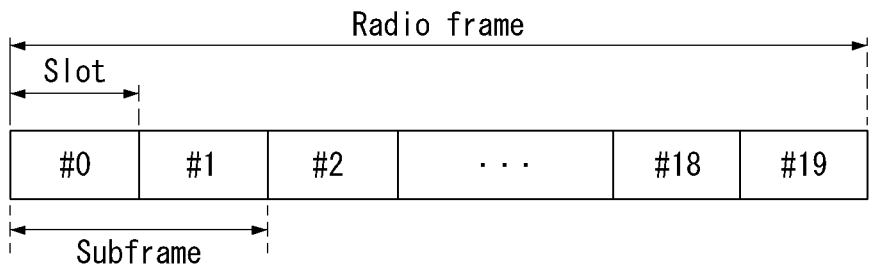
FIG. 5 is a diagram illustrating an example of the structure of a radio frame of LTE.

FIG. 5 is a diagram illustrating an example of the structure of a radio frame of LTE.

In FIG. 5, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 6:
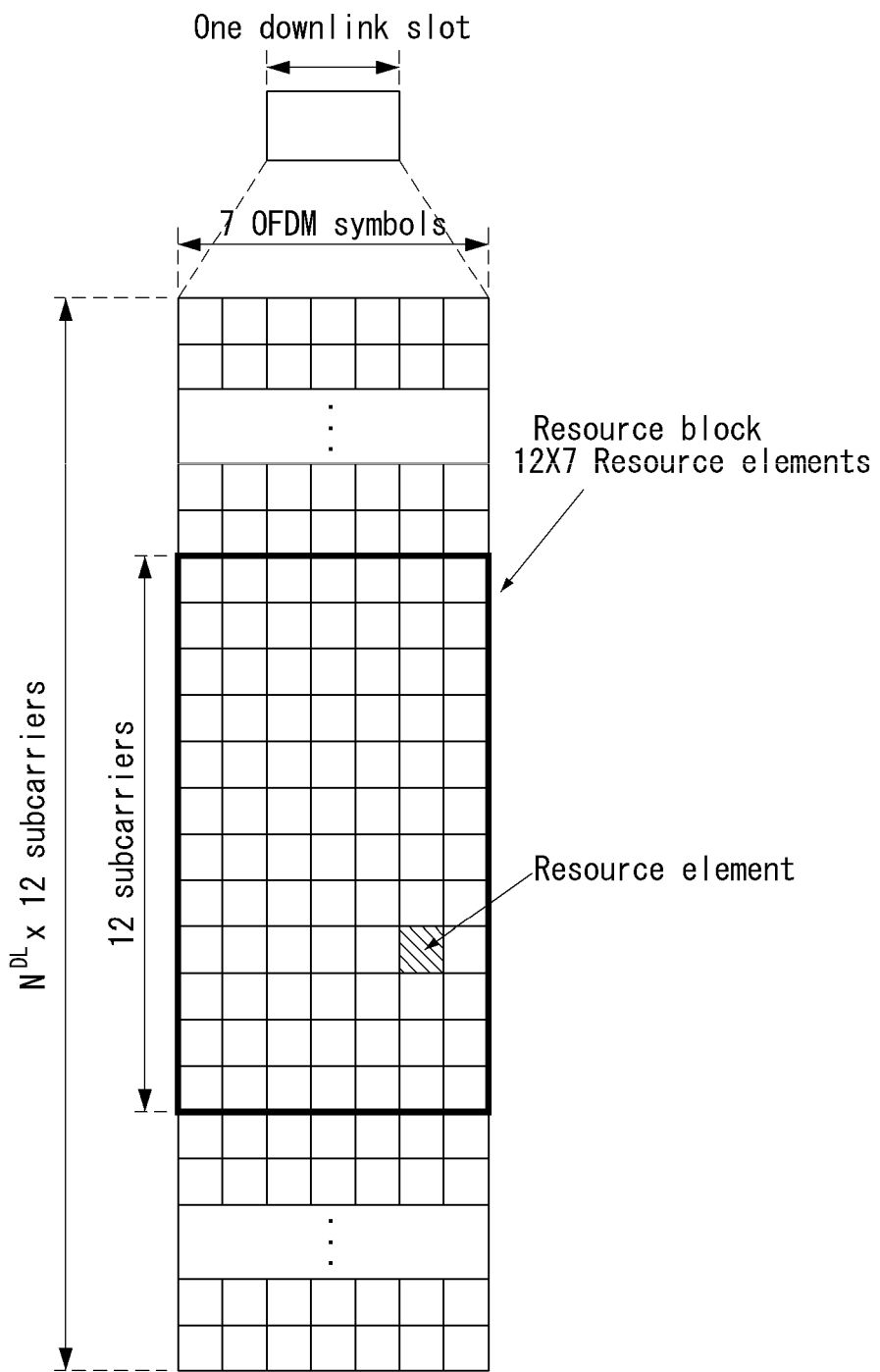
FIG. 6 is a diagram illustrating an example of a resource grid for downlink slot.

FIG. 6 is a diagram illustrating an example of a resource grid for downlink slot.

In FIG. 6, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 7:
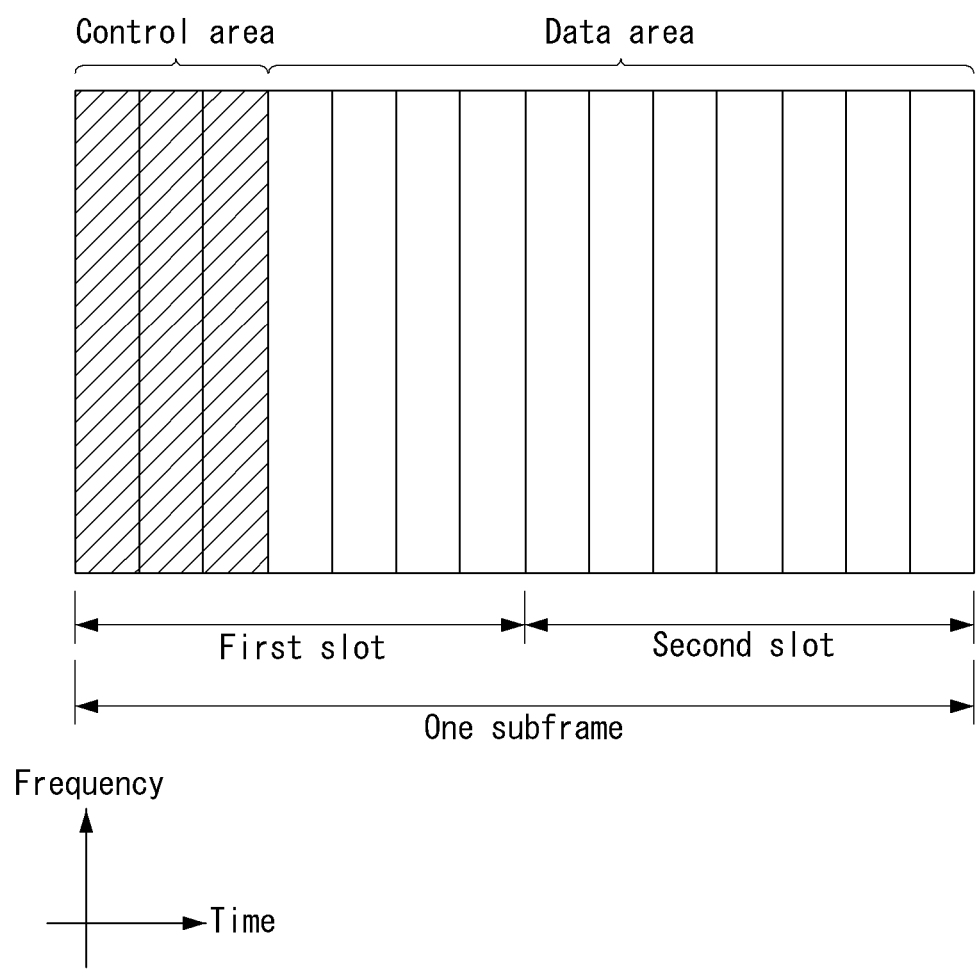
FIG. 7 is a diagram illustrating an example of the structure of downlink subframe.

FIG. 7 is a diagram illustrating an example of the structure of downlink subframe.

In FIG. 7, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 8:
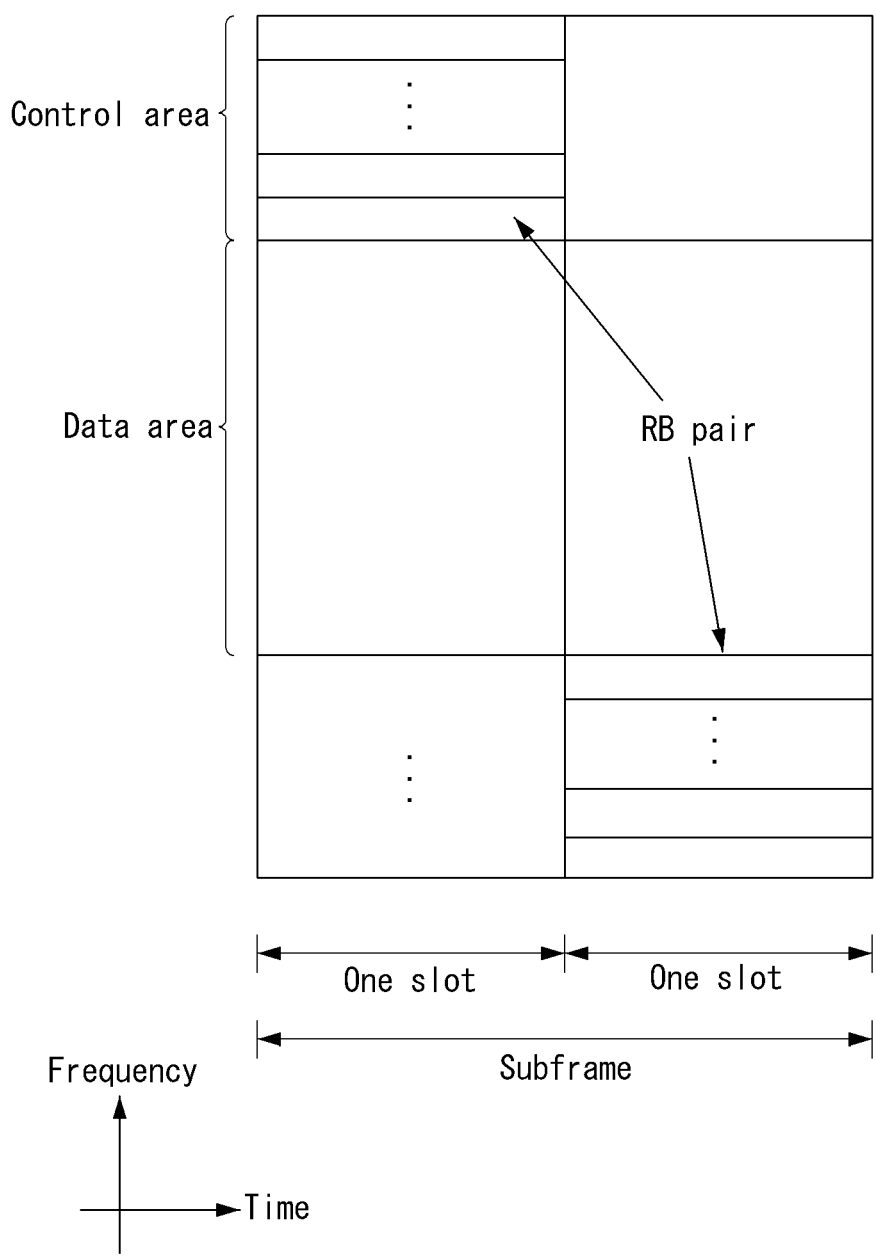
FIG. 8 is a diagram illustrating an example of the structure of uplink subframe.

FIG. 8 is a diagram illustrating an example of the structure of uplink subframe.

In FIG. 8, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, the LTE frame structure will be described in more detail.

Throughout LTE specification, unless otherwise noted, the size of various fields in the time domain is expressed as a number of time units $T_s = 1/(15000 \times 2048)$ seconds.

Downlink and uplink transmissions are organized into radio frames with $T_f = 307200 \times T_s = 10$ ms duration. Two radio frame structures are supported:

Type 1, applicable to FDD
Type 2, applicable to TDD
Frame Structure Type 1

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Figure 9:
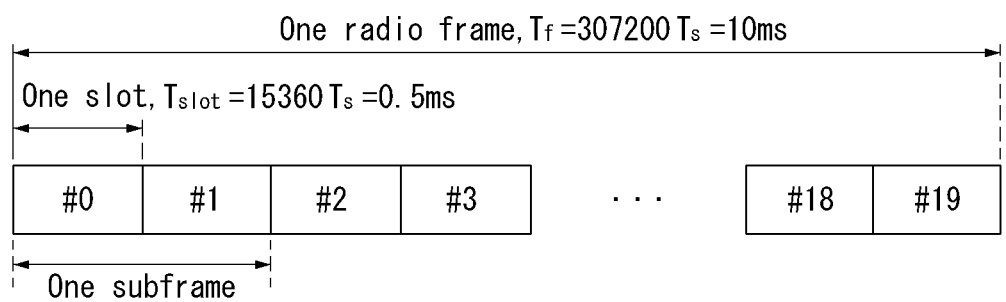
FIG. 9 illustrates an example of the frame structure type 1.

FIG. 9 illustrates an example of the frame structure type 1.

Frame Structure Type 2

Frame structure type 2 is applicable to FDD. Each radio frame of length $T_f=307200 \times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720\ T_s=1$ ms. Each subframe i is defined as two slots, 2i and 2i+1 of length $T_{slot}=15360 \cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

Figure 10:
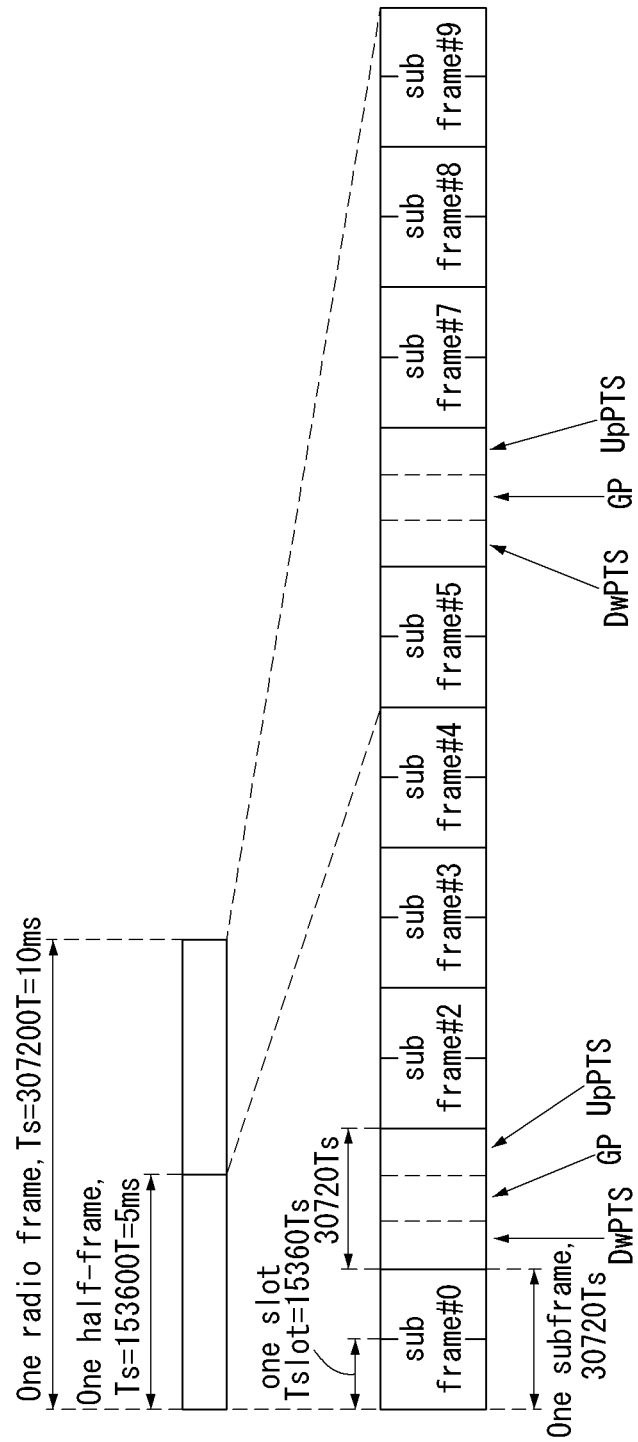
FIG. 10 is a diagram illustrating another example of the frame structure type 2.

FIG. 10 is a diagram illustrating another example of the frame structure type 2.

Table 1 shows an example of a configuration of a special subframe.

Table 2 shows an example of an uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

SPS (Semi-Persistent Scheduling)

Semi-Persistent Scheduling (SPS) is a scheduling method in which resources are continuously maintained for a specific time period to a specific terminal.

When a certain amount of data is transmitted for a specific time, such as VoIP (Voice over Internet Protocol), it is not necessary to transmit control information for each data transmission duration for resource allocation, so the waste of control information can be reduced by using the SPS method. In the so-called SPS method, a time resource region in which a resource can be allocated to a terminal is first allocated.

In this case, in the semi-persistent allocation method, a time resource region allocated to a specific terminal may be configured to have periodicity. Then, the time-frequency resource allocation is completed by allocating a frequency resource region as necessary. This allocation of the frequency resource region may be referred to as so-called activation. When the semi-persistent allocation method is used, since resource allocation is maintained for a certain period by one signaling, there is no need to repeatedly allocate resources, thereby reducing signaling overhead.

Thereafter, when resource allocation for the terminal is no longer required, signaling for releasing frequency resource allocation can be transmitted from the base station to the terminal. This release of the allocation of the frequency resource region may be referred to as deactivation.

In the current LTE, for SPS for uplink and/or downlink, it first informs the terminal in which subframes SPS trans-

TABLE 1

| Special subframe configuration | normal cyclic prefix in downlink | | | extended cyclic prefix in downlink | | |
|---|---|---|---|---|---|---|
| | | UpPTS | | | UpPTS | |
| | DwPTS | normal cyclic prefix in uplink | extended cyclic prefix in uplink | DwPTS | normal cyclic prefix in uplink | extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — | mission/reception should be performed through Radio Resource Control (RRC) signaling. That is, a time resource among time-frequency resources allocated for SPS through RRC signaling is designated first. In order to inform the subframe that can be used, for example, the period and offset of the subframe may be indicated. However, since the terminal is allocated only the time resource region through RRC signaling, even if RRC signaling is received, it does not immediately perform transmission/reception by SPS, and completes the time-frequency resource allocation by allocating a frequency resource domain as needed. Allocating the frequency resource region in this way may be referred to as activation, and releasing the allocation of the frequency resource region may be referred to as deactivation.

Accordingly, after receiving the PDCCH indicating activation, the terminal allocates frequency resources according to RB allocation information included in the received PDCCH, and applies modulation and code rate according to Modulation and Coding Scheme (MCS) information, and starts to perform transmission/reception according to the subframe period and offset allocated through the RRC signaling.

Then, when the terminal receives the PDCCH indicating deactivation from the base station, the transmission and reception are stopped. If a PDCCH indicating activation or reactivation is received after stopping transmission/reception, transmission/reception resumes with the subframe period and offset allocated by RRC signaling using the RB allocation or MCS specified in the PDCCH. That is, time resource allocation is performed through RRC signaling, but actual signal transmission/reception may be performed after receiving a PDCCH indicating activation and reactivation of the SPS, and the interruption of signal transmission/reception may be performed after receiving a PDCCH indicating deactivation of the SPS.

Specifically, when the SPS is activated by RRC, the following information may be provided.

SPS C-RNTI

When SPS for uplink is activated, the uplink SPS interval (semiPersistSchedIntervalUL) and the number of empty transmissions before implicit termination In the case of TDD, whether twoIntervalsConfig is enabled or disabled for uplink When SPS for downlink is activated, downlink SPS interval (semiPersistSchedIntervalDL) and number of HARQ processes configured for SPS In contrast, when the SPS is deactivated by RRC, the configured grant or configured assignment must be discarded.

In relation to the downlink SPS, after semi-persistent downlink assignment is configured, the MAC entity needs to sequentially consider that the N-th assignment occurs in the subframe as shown in Equation 1 below.

$$(10*SFN+subframe)=[(10*SFN\text{start time}+subframe\text{-start time})+N*semiPersistSchedIntervalDL] \text{ modulo } 10240 \quad \text{[Equation 1]}$$

In Equation 1, 'SFNstart time' and 'subframestart time' mean an SFN and a subframe in which a configured downlink designation is (re)initialized, respectively. In the case of BL UEs or UEs with improved coverage, the 'SFN_start time' and 'subframe_start time' may refer to the SFN and subframe of the first PDSCH transmission in which the configured downlink designation is (re)initialized.

In contrast, in relation to the uplink SPS, after the SPS uplink grant (Semi-Persistent Scheduling uplink grant) is configured, the MAC entity needs to sequentially consider that the N-th grant occurs in a subframe as shown in Equation 2 below.

$$(10*SFN+subframe)=[(10*SFN\text{start time}+subframe\text{-start time})+N*semiPersistSchedIntervalUL+ \text{Subframe\_Offset}*(N \text{ modulo } 2)]\text{modulo } 10240 \quad \text{[Equation 2]}$$

In Equation 2, the 'SFNstart time' and the 'subframestart time' mean the SFN and the subframe in which the configured uplink grant is (re)initialized, respectively. In the case of BL UEs or UEs with improved coverage, the 'SFNstart time' and 'subframestart time' may refer to the SFN and subframe of the first PDSCH transmission that is configured uplink grant (re)initialized.

Table 3 is an example of an RRC message (SPS-Config) for specifying the above-described SIPS configuration.

TABLE 3

```
-- ASN1START
SPS-Config ::=    SEQUENCE {
    semiPersistSchedC-RNTI       C-RNTI          OPTIONAL,     --
Need OR
    sps-ConfigDL                 SPS-ConfigDL    OPTIONAL,     --
Need ON
    sps-ConfigUL                 SPS-ConfigUL    OPTIONAL      --
Need ON
}
SPS-ConfigDL ::=      CHOICE{
    release                      NULL,
    setup                        SEQUENCE {
        semiPersistSchedIntervalDL          ENUMERATED {
            sf10, sf20, sf32, sf40, sf64, sf80,
            sf128, sf160, sf320, sf640, spare6,
            spare5, spare4, spare3, spare2,
            spare1},
        numberOfConfSPS-Processes           INTEGER (1..8),
        n1PUCCH-AN-PersistentList           N1PUCCH-AN-PersistentList,
        ...,
        [[ twoAntennaPortActivated-r10      CHOICE {
            release                             NULL,
            setup                               SEQUENCE {
                n1PUCCH-AN-PersistentListP1-r10 N1PUCCH-AN-PersistentList
            }
```

TABLE 3-continued

```
        }                                               OPTIONAL
    -- Need ON
        ]]
    }
  }
}
SPS-ConfigUL : :=       CHOICE {
release                         NULL,
  setup                         SEQUENCE {
    semiPersistSchedIntervalUL      ENUMERATED {
        sf10, sf20, sf32, sf40, sf64, sf80,
        sf128, sf160, sf320, sf640, spare6,
        spare5, spare4, spare3, spare2,
        spare1},
    implicitReleaseAfter            ENUMERATED {e2, e3, e4, e8},
    p0-Persistent                   SEQUENCE {
      p0-NominalPUSCH-Persistent        INTEGER (-126. . 24),
      p0-UE-PUSCH-Persistent            INTEGER (-8. . 7)
    } OPTIONAL,                                 -- Need OP
twoIntervalsConfig              ENUMERATED {true}         OPTIONAL,    --
Cond TDD
    . . . ,
    [[ p0-PersistentSubframeSet2-r12    CHOICE {
        release                         NULL,
        setup                           SEQUENCE {
          p0-NominalPUSCH-PersistentSubframeSet2-r12        INTEGER (-
126. . 24),
          p0-UE-PUSCH-PersistentSubframeSet2-r12            INTEGER (-
8. . 7)
        }
    }                                                   OPTIONAL         --
Need ON
    ]],
    [[ numberOfConfUlSPS-Processes-r13      INTEGER (1. . 8)      OPTIONAL
--
Need OR
    ]]
  }
}
N1PUCCH-AN-PersistentList : :=          SEQUENCE (SIZE (1. . 4)) OF INTEGER (0. . 2047)
-- ASN1STOP
```

PDCCH/EPDCCH/MPDCCH Validation for Semi-Persistent Scheduling

The terminal may check the PDCCH including the SPS indication when all of the following conditions are satisfied. First, the CRC parity bit added for the PDCCH payload should be scrambled with SPS C-RNTI, and secondly, the New Data Indicator (NDI) field should be set to 0. Here, in the case of DCI formats 2, 2A, 2B, 2C, and 2D, the new data indicator field indicates one of the activated transport blocks.

In addition, the terminal may check the EPDCCH including the SPS indication when all of the following conditions are satisfied. First, the CRC parity bit added for the EPDCCH payload must be scrambled with SPS C-RNTI, and secondly, the new data indicator (NDI) field must be set to 0. Here, in the case of DCI formats 2, 2A, 2B, 2C, and 2D, the new data indicator field indicates one of the activated transport blocks.

In addition, the terminal may check the MPDCCH including the SPS indication when all of the following conditions are satisfied. First, the CRC parity bit added for the MPDCCH payload must be scrambled with SPS C-RNTI, and secondly, the new data indicator (NDI) field must be set to 0.

When each field used in the DCI format is set according to Table 4 or Table 5, Table 6, and Table 7 below, verification is completed. When such confirmation is completed, the terminal recognizes the received DCI information as valid SPS activation or deactivation (or cancellation). On the other hand, if the verification is not completed, the terminal recognizes that a non-matching CRC is included in the received DCI format.

Table 4 shows a field for confirming PDCCH/EPDCCH indicating SPS activation.

TABLE 4

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 shows a field for confirming PDCCH/EPDCCH indicating SPS deactivation (or release).

TABLE 5

|  | DCI format 0 | DCI format 1A |
|---|---|---|
| TPC command for scheduled PUSCH | set to '00' | N/A |

TABLE 5-continued

|  | DCI format 0 | DCI format 1A |
|---|---|---|
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 6 shows a field for confirming MPDCCH indicating SPS activation.

TABLE 6

|  | DCI format 6-0A | DCI format 6-1A |
|---|---|---|
| HARQ process number | set to '000' | FDD: set to '000' TDD: set to '0000 |
| Redundancy version | set to '00' | set to '00' |
| TPC command for scheduled PUSCH | set to '00' | N/A |
| TPC command for scheduled PUCCH | N/A | set to '00' |

Table 7 shows a field for checking MPDCCH indicating SPS deactivation (or release).

TABLE 7

|  | DCI format 6-0A | DCI format 6-1A |
|---|---|---|
| HARQ process number | set to '000' | FDD: set to '000' TDD: set to '0000 |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

When the DCI format indicates activation of SIPS downlink scheduling, the TPC command value for the PUCCH field may be used as an index indicating four PUCCH resource values configured by an upper layer.

Table 8 shows PUCCH resource values for downlink SPS.

TABLE 8

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Narrowband Physical Downlink Control Channel Related Procedures

A procedure related to the Narrowband Physical Downlink Control Channel (NPDCCH) used in NB-IoT will be described.

The terminal needs to monitor NPDCCH candidates (i.e., a set of NPDCCH candidates) as configured by higher layer signaling for control information. Here, the monitoring may mean attempting to decode each of the NPDCCHs in the set according to all monitored DCI formats. The set of NPDCCH candidates for monitoring may be defined as an NPDCCH search space. In this case, the terminal may perform monitoring using an identifier (e.g., C-RNTI, P-RNTI, SC-RNTI, G-RNTI) corresponding to the corresponding NPDCCH search space.

In this case, the terminal needs to monitor is one or more of a) Type1-NPDCCH common search space, b) Type2-NPDCCH common search space, and c) NPDCCH UE-specific search space. In this case, the UE does not need to simultaneously monitor the NPDCCH UE-specific search space and the Type1-NPDCCH common search space. In addition, the terminal does not need to simultaneously monitor the NPDCCH UE-specific search space and the Type2-NPDCCH common search space. In addition, the terminal does not need to simultaneously monitor the Type1-NPDCCH common search space and the Type2-NPDCCH common search space.

An NPDCCH search space at an aggregation level and a repetition level is defined by a set of NPDCCH candidates. Here, each of the NPDCCH candidates is repeated in R consecutive NB-IoT downlink subframes excluding a subframe used for transmission of a system information (SI) message starting at subframe k.

In the case of the NPDCCH UE-specific search space, the aggregation and repetition level defining the search space and the corresponding monitored NPDCCH candidates are listed as shown in Table 9 by substituting the RMAX value with the parameter al-Repetition-USS configured by the higher layer.

TABLE 9

| | | NCCE indices of monitored NPDCCH candidates | |
|---|---|---|---|
| $R_{max}$ | R | L' = 1 | L' = 2 |
| 1 | 1 | {0},{1} | {0,1} |
| 2 | 1 | {0},{1} | {0,1} |
|   | 2 | — | {0,1} |
| 4 | 1 | — | {0,1} |
|   | 2 | — | {0,1} |
|   | 4 | — | {0,1} |
| >=8 | $R_{max}/8$ | — | {0,1} |
|   | $R_{max}/4$ | — | {0,1} |
|   | $R_{max}/2$ | — | {0,1} |
|   | $R_{max}$ | — | {0,1} |

Note 1: {x}, {y} denotes NPDCCH Format 0 candidate with NCCE index 'x', and NPDCCH Format 0 candidate with NCCE index 'y'
Note 2: {x,y} denotes NPDCCH Format1 candidate corresponding to NCCEs 'x' and 'y'

For Type1-N PDCCH common search space, the aggregation and repetition levels defining the search spaces and the corresponding monitored NPDCCH candidates are listed in Table 10 by substituting the value of RMAX value with the parameter al-Repetition-CSS-Paging configured by the higher layer.

TABLE 10

| | | NCCE indices of monitored NPDCCH candidates | |
|---|---|---|---|
| $R_{max}$ | R | L' = 1 | L' = 2 |
| 1 | 1 | — | {0,1} |
| 2 | 1,2 | — | {0,1} |
| 4 | 1,2,4 | — | {0,1} |
| 8 | 1,2,4,8 | — | {0,1} |

TABLE 10-continued

|  |  | NCCE indices of monitored NPDCCH candidates | |
|---|---|---|---|
| $R_{max}$ | R | L' = 1 | L' = 2 |
| 16 | 1,2,4,8,16 | — | {0,1} |
| 32 | 1,2,4,8,16,32 | — | {0,1} |
| 64 | 1,2,4,8,16,32,64 | — | {0,1} |
| 128 | 1,2,4,8,16,32,64,128 | — | {0,1} |
| 256 | 1,4,8,16,32,64,128,256 | — | {0,1} |
| 512 | 1,4,16,32,64,128,256,512 | — | {0,1} |
| 1024 | 1,8,32,64,128,256,512,1024 | — | {0,1} |
| 2048 | 1,8,64,128,256,512,1024,2048 | — | {0,1} |

Note 1: {x}, {y}denotes NPDCCH Format 0 candidate with NCCE index 'x', and NPDCCH Format 0 candidate with NCCE index 'y'
Note 2: {x,y} denotes NPDCCH Format1 candidate corresponding to NCCEs 'x' and 'y'

For Type2-NPDCCH common search space, the aggregation and repetition levels defining the search spaces and the corresponding monitored NPDCCH candidates are listed in Table 11 by substituting the value of RMAX value with the parameter npdcch-MaxNumRepetitions-RA configured by the higher layer.

TABLE 11

|  |  | NCCE indices of monitored NPDCCH candidates | |
|---|---|---|---|
| $R_{max}$ | R | L' = 1 | L' = 2 |
| 1 | 1 | — | {0,1} |
| 2 | 1 | — | {0,1} |
|  | 2 | — | {0,1} |
| 4 | 1 | — | {0,1} |
|  | 2 | — | {0,1} |
|  | 4 | — | {0,1} |
| >=8 | $R_{max}/8$ | — | {0,1} |
|  | $R_{max}/4$ | — | {0,1} |
|  | $R_{max}/2$ | — | {0,1} |
|  | $R_{max}$ | — | {0,1} |

Note 1: {x}, {y} denotes NPDCCH Format 0 candidate with NCCE index 'x', and NPDCCH Format 0 candidate with NCCE index 'y'
Note 2: {x,y} denotes NPDCCH Format1 candidate corresponding to NCCEs 'x' and 'y'

In this case, the locations of starting subframe k are given by k=k_b. Here, k_b is the b^th consecutive NB-IoT DL subframe from subframe k_0, and b=u*R, and u=0, 1, . . . , (R_MAX/R)−1, and the subframe k_0 is a subframe satisfying Equation 3.

$$(10n_f + \lfloor n_s/2 \rfloor) \bmod T = \alpha_{effect} \cdot T, \text{ where } T = R_{max} \cdot G \quad \text{[Equation 3]}$$

For NPDCCH UE-specific search space, G in Equation 3 is given by the higher layer parameter nPDCCH-startSF-UESS, $\alpha_{effect}$ is given by the higher layer parameter nPDCCH-startSFoffset-UESS. In addition, for NPDCCH Type2-NPDCCH common search space, G in Equation 3 is given by the higher layer parameter nPDCCH-startSF-Type2CSS, $\alpha_{effect}$ is given by the higher layer parameter nPDCCH-startSFoffset-Type2CSS. In addition, for Type1-NPDCCH common search space, k=k0 and is determined from locations of NB-IoT paging opportunity subframes.

When the terminal is configured by the higher upper layer as a PRB for monitoring the NPDCCH UE-specific search space, the UE should monitor the NPDCCH UE-specific search space in the PRB configured by the higher layer. In this case, the terminal does not expect to receive NPSS, NSSS, and NPBCH in the corresponding PRB. On the other hand, when the PRB is not configured by the higher layer, the UE should monitor the NPDCCH UE-specific search space in the same PRB where the NPSS/NSSS/NPBCH is detected.

If the NB-IoT UE detects NPDCCH with DCI Format N0 ending in subframe n, and if the corresponding NPUSCH format 1 transmission starts from n+k, the UE is not required to monitor NPDCCH in any subframe starting from subframe n+1 to subframe n+k−1.

In addition, if the NB-IoT UE detects NPDCCH with DCI Format N1 or N2 ending in subframe n, and if a NPDSCH transmission starts from n+k, the UE is not required to monitor NPDCCH in any subframe starting from subframe n+1 to subframe n+k−1.

In addition, if the NB-IoT UE detects NPDCCH with DCI Format N1 ending in subframe n, and if the corresponding NPUSCH format 2 transmission starts from subframe n+k, the UE is not required to monitor NPDCCH in any subframe starting from subframe n+1 to subframe n+k−1.

In addition, if the NB-IoT UE detects NPDCCH with DCI Format N1 for "PDCCH order" ending in subframe n, and if the corresponding NPRACH transmission starts from subframe n+k, the UE is not required to monitor NPDCCH in any subframe starting from subframe n+1 to subframe n+k−1.

In addition, if the UE has a NPUSCH transmission ending in subframe n, the UE is not required to monitor NPDCCH in any subframe starting from subframe n+1 to subframe n+3.

In addition, the NB-IoT UE is not required to monitor an NPDCCH candidate of an NPDCCH search space if the NPDCCH candidate of the NPDCCH search space ends in subframe n, and if the UE is configured to monitor NPDCCH candidates of another NPDCCH search space having starting before subframe n+5.

Regarding the NPDCCH starting position, the starting OFDM symbol for the NPDCCH is given by the index I_NPDCCHStart in the first slot of subframe k. In this case, when the higher layer parameter operarionModeInfo indicates '00' or '01', the index I_NPDCCHStart is given by the higher layer parameter eutaControlRegionSize. In contrast, when the higher layer parameter operarionModeInfo indicates '10' or '11', the index I_NPDCCHStart is 0.

DCI Format

DCI transmits downlink or uplink scheduling information for one cell and one RNTI. Here, RNTI is implicitly encoded as CRC.

DCI format N0, DCI format N1, and DCI format N2 may be considered as DCI formats related to NB-IoT.

First, the DCI format N0 is used for scheduling the NPUSCH in one UL cell, and the following information can be transmitted.

Flag for format N0/format N1 differentiation—e.g., 1 bit, where value 0 indicates format N0 and value 1 indicates format N1

Subcarrier indication—e.g., 6 bits as defined in subclause 16.5.1.1 of [3]

Resource assignment—e.g., 3 bits

Scheduling delay—e.g., 2 bits

Modulation and coding scheme—e.g., 4 bits

Redundancy version—e.g., 1 bit

Repetition number—e.g., 3 bits

New data indicator—e.g., 1 bit

DCI subframe repetition number—e.g., 2 bits

Next, DCI format N1 is used for the scheduling of one NPDSCH codeword in one cell, random access procedure initiated by a NPDCCH order. The DCI corresponding to a NPDCCH order is carried by NPDCCH.

The following information is transmitted by means of the DCI format N1:

Flag for format N0/format N1 differentiation—e.g., 1 bit, where value 0 indicates format N0 and value 1 indicates format N1

Format N1 is used for random access procedure initiated by a NPDCCH order only if NPDCCH order indicator is set to '1', format N1 CRC is scrambled with C-RNTI, and all the remaining fields are set as follows:

Starting number of NPRACH repetitions—e.g., 2 bits
Subcarrier indication of NPRACH—e.g., 6 bits
All the remaining bits in format N1 are set to one.
Otherwise,
Scheduling delay—e.g., 3 bits
Resource assignment—e.g., 3 bits
Modulation and coding scheme—e.g., 4 bits
Repetition number—e.g., 4 bits
New data indicator—e.g., 1 bit
HARQ-ACK resource—e.g., 4 bits
DCI subframe repetition number—2 bits When the format N1 CRC is scrambled with a RA-RNTI, then the following fields among the fields above are reserved.

New data indicator
HARQ-ACK resource

If the number of information bits in format N1 is less than that of format N0, zeros shall be appended to format N1 until the payload size equals that of format N0.

Next, DCI format N2 is used for paging, direct indication, and The following information is transmitted.

Flag for paging/direct indication differentiation—e.g., 1 bit, with value 0 for direct indication and value 1 for paging If the Flag=0, DCI format N2 includes (or transmits) direct indication information (e.g., 8 bits), reserved information bits for configuring the same size as format N2 in which the flag value is 1.

On the other hand, when the value of the flag is 1, the DCI format N2 includes (or transmits) resource allocation (e.g. 3 bits), modulation and coding technique (e.g. 4 bits), repetition number (e.g. 4 bits), DCI subframe repetition number (e.g., 3 bits).

Resource Allocation for Uplink Transmission with Configured Grant

When PUSCH resource allocation is semi-statically configured by higher layer parameter ConfiguredGrantConfig in BWP information element, and the PUSCH transmission corresponding to the configured grant triggered, the following higher layer parameters are applied in the transmission:

For Type 1 PUSCH transmissions with a configured grant, the following parameters are given in ConfiguredGrantConfig.

The higher layer parameter timeDomainAllocation value m provides a row index m+1 pointing to an allocated table, indicating a combination of start symbol and length and PUSCH mapping type, where the table selection follows the rules for the UE specific search space, as defined.

Frequency domain resource allocation is determined by the higher layer parameter frequencyDomainAllocation for a given resource allocation type indicated by resourceAllocation.

The I_MCS is provided by higher layer parameter mcsAndTBS;

Number of DM-RS CDM groups, DM-RS ports, SRS resource indication and DM-RS sequence initialization are determined, and the antenna port value, the bit value for DM-RS sequence initialization, precoding information and number of layers, SRS resource indicator are provided by antennaPort, dmrs-SeqInitialization, precodingAndNumberOfLayers, and srs-ResourceIndicator respectively.

When frequency hopping is enabled, the frequency offset between two frequency hops can be configured by higher layer parameter frequencyHoppingOffset.

For Type 2 PUSCH transmissions with a configured grant: the resource allocation follows the higher layer configuration, and UL grant received on the DCI.

The UE shall not transmit anything on the resources configured by ConfiguredGrantConfig if the higher layers did not deliver a transport block to transmit on the resources allocated for uplink transmission without grant.

A set of allowed periodicities P are defined in TS 38.331.

Transport Block Repetition for Uplink Transmissions with a Configured Grant

The higher layer configured parameters repK and repK-RV define the K repetitions to be applied to the transmitted transport block, and the redundancy version pattern to be applied to the repetitions. For the nth transmission occasion among K repetitions, n=1, 2, . . . , K, it is associated with (mod(n−1,4)+1)th value in the configured RV sequence. The initial transmission of a transport block may, the first transmission occasion of the K repetitions if the configured RV sequence is {0, 2, 3, 1} any of the transmission occasions of the K repetitions that are associated with RV=0 if the configured RV sequence is {0, 3, 0, 3} any of the transmission occasions of the K repetitions if the configured RV sequence is {0, 0, 0, 0}, except the last transmission occasion when K=8.

For any RV sequence, the repetitions shall be terminated after transmitting K repetitions, or at the last transmission occasion among the K repetitions within the period P, or when a UL grant for scheduling the same TB is received within the period P, whichever is reached first. The UE is not expected to be configured with the time duration for the transmission of K repetitions larger than the time duration derived by the periodicity P.

For both Type 1 and Type 2 PUSCH transmissions with a configured grant, when the UE is configured with repK>1, the UE shall repeat the TB across the repK consecutive slots applying the same symbol allocation in each slot. If the UE procedure for determining slot configuration determines symbols of a slot allocated for PUSCH as downlink symbols, the transmission on that slot is omitted for multi-slot PUSCH transmission.

Initial Access (IA) Procedure

SSB (Synchronization Signal Block) Transmission and Related Operations

Figure 11:
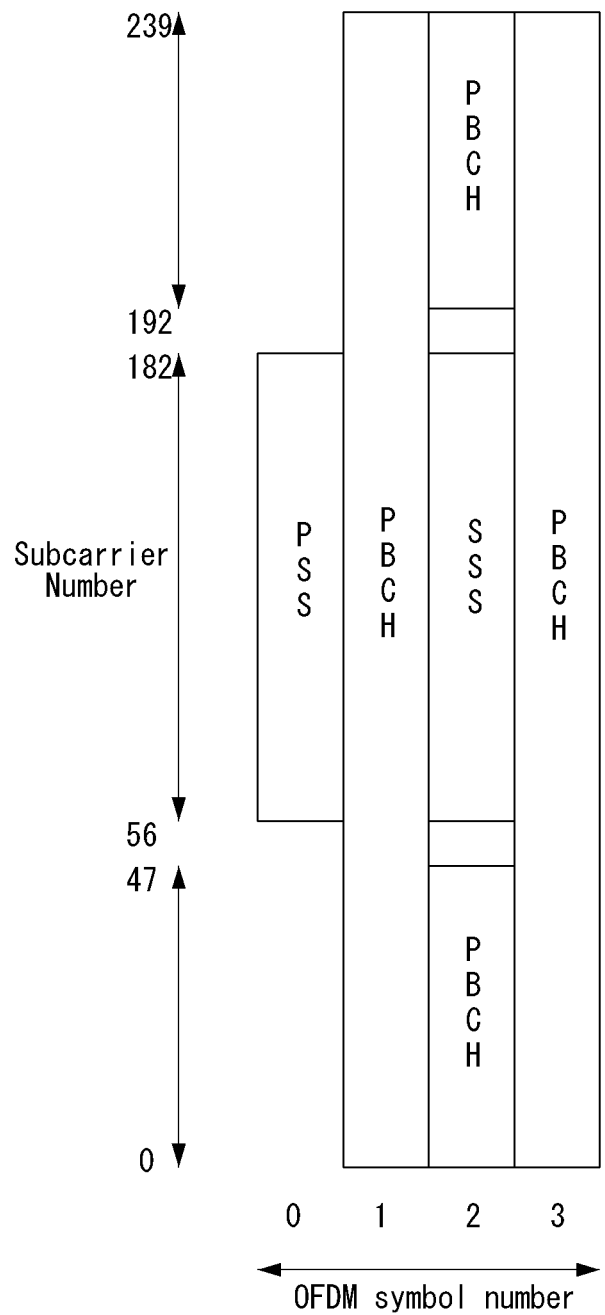
FIG. 11 illustrates an example of an SSB structure.

FIG. 11 illustrates an example of an SSB structure. The UE may perform cell search, system information acquisition, beam alignment for initial access, and DL measurement based on the SSB. SSB is used interchangeably with a Synchronization Signal/Physical Broadcast Channel (SS/PBCH) block.

Referring to FIG. 11, the SSB is composed of PSS, SSS and PBCH. The SSB is composed of four consecutive OFDM symbols, and PSS, PBCH, SSS/PBCH and PBCH are transmitted for each OFDM symbol. The PSS and SSS are, respectively, composed of 1 OFDM symbol and 127 subcarriers, and the PBCH is composed of 3 OFDM symbols and 576 subcarriers. Polar coding and Quadrature Phase Shift Keying (QPSK) are applied to the PBCH. The PBCH consists of a data RE and a demodulation reference signal (DMRS) RE for each OFDM symbol. There are 3 DMRS REs for each RB, and 3 data REs exist between the DMRS REs.

Cell Search

Cell search refers to a process in which the UE acquires time/frequency synchronization of a cell and detects a cell identifier (e.g., physical layer cell ID, PCID) of the cell. PSS is used to detect a cell ID within a cell ID group, and SSS is used to detect a cell ID group. PBCH is used for SSB (time) index detection and half-frame detection.

The cell search process of the UE may be summarized as shown in Table 12 below.

TABLE 3

| Type of Signals | Operations |
| --- | --- |
| 1st step | PSS | SS/PBCH block (SSB) symbol timing acquisition<br>Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF)<br>Remaining Minimum System Information (RMSI) Control resource set (CORESET)/ Search space configuration |
| 5th Step | PDCCH and PDSCH | Cell access information<br>RACH configuration |

There are 336 cell ID groups, and 3 cell IDs exist for each cell ID group. There are a total of 1008 cell IDs, and the cell ID may be defined by Equation 4.

$$N_{ID}^{cell} = 3N_{ID}^{(1)} + N_{ID}^{(2)}$$ [Equation 4]

Here, $N_{ID}^{(1)} \in \{0, 1, \ldots 33\}$ and $N_{ID}^{(2)} \in \{0, 1, 2\}$

Here, NcellID represents a cell ID (e.g., PCID). N(1)ID represents a cell ID group and is provided/acquired through SSS. N(2)ID represents the cell ID in the cell ID group and is provided/acquired through PSS.

The PSS sequence dPSS(n) may be defined to satisfy Equation 5.

$$d_{PSS}(n) = 1 - 2x(m)$$

$$m = (n + 43N_{ID}^{(2)}) \bmod 127$$

$$0 \leq n < 127$$ [Equation 5]

Here, x(i+7) (x(i+4)+x(i))mod2, and [x(6) x(5) x(4) x(3) x(2) x(1) x(0)]=[1 1 1 0 1 1 0]

The SSS sequence dSSS(n) may be defined to satisfy Equation 6.

$$d_{SSS}(n) = \left[1 - \right.$$ [Equation 6]

$$2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

Here, $$x_0(i+7) = (x_0(i+4) + x_0(i)) \bmod 2$$

$$x_1(i+7) = (x_1(i+1) + x_1(i)) \bmod 2,$$

and $$[x_0(6)\, x_0(5)\, x_0(4)\, x_0(3)\, x_0(2)\, x_0(1)\, x_0(0)] = [0\,0\,0\,0\,0\,0\,1]$$

$$[x_1(6)\, x_1(5)\, x_1(4)\, x_1(3)\, x_1(2)\, x_1(1)\, x_1(0)] = [0\,0\,0\,0\,0\,0\,1].$$

Figure 12:
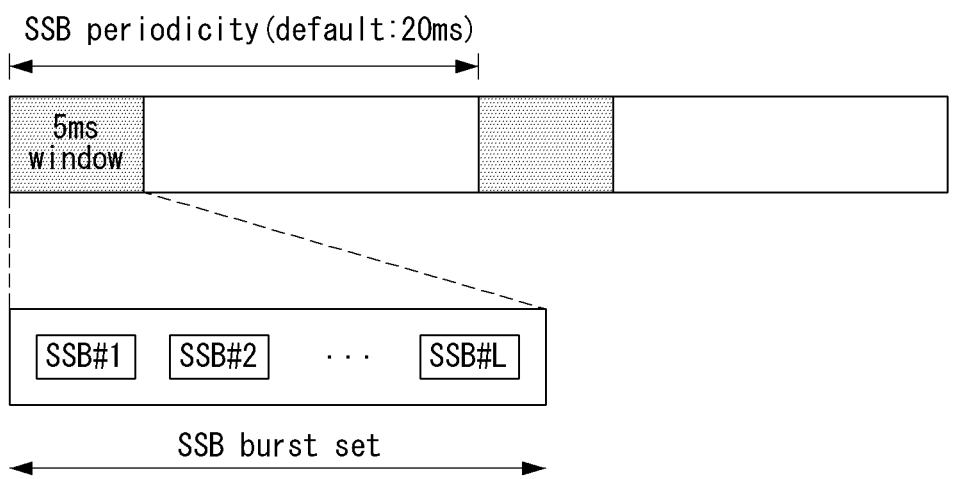
FIG. 12 illustrates an example of SSB transmission.

FIG. 12 illustrates an example of SSB transmission.

SSB is transmitted periodically according to the SSB period. The SSB basic period assumed by the UE during initial cell search is defined as 20 ms. After cell access, the SSB period may be configured to one of {5 ms, 10 ms, 20 ms, 40 ms, 80 ms, 160 ms} by the network (e.g., base station). At the beginning of the SSB period, a set of SSB bursts is configured. The SSB burst set consists of a 5 ms time window (i.e., half-frame), and the SSB can be transmitted up to L times within the SS burst set. The maximum number of transmissions L of the SSB may be given as follows according to the frequency band of the carrier. One slot contains a maximum of two SSBs.

For frequency range up to 3 GHz, L=4
For frequency range from 3 GHz to 6 GHz, L=8
For frequency range from 6 GHz to 52.6 GHz, L=64

The time location of the SSB candidate in the SS burst set may be defined as follows according to the SCS. The time location of the SSB candidate is indexed from 0 to L−1 (SSB index) in the time order within the SSB burst set (i.e., half-frame).

Case A—15 kHz SCS: The index of the start symbol of the candidate SSB is given as {2, 8}+14*n. When the carrier frequency is 3 GHz or less, n=0, 1. When the carrier frequency is 3 GHz to 6 GHz, n=0, 1, 2, 3.

Case B—30 kHz SCS: The index of the start symbol of the candidate SSB is given as {4, 8, 16, 20}+28*n. When the carrier frequency is 3 GHz or less, n=0. When the carrier frequency is 3 GHz to 6 GHz, n=0, 1.

Case C—30 kHz SCS: The index of the start symbol of the candidate SSB is given as {2, 8}+14*n. When the carrier frequency is 3 GHz or less, n=0, 1. When the carrier frequency is 3 GHz to 6 GHz, n=0, 1, 2, 3.

Case D—120 kHz SCS: The index of the start symbol of the candidate SSB is given as {4, 8, 16, 20}+28*n. When the carrier frequency is greater than 6 GHz, n=0, 1, 2, 3, 5, 6, 7, 8, 10, 11, 12, 13, 15, 16, 17, 18.

Case E—240 kHz SCS: The index of the start symbol of the candidate SSB is given as {8, 12, 16, 20, 32, 36, 40, 44}+56*n. When the carrier frequency is greater than 6 GHz, n=0, 1, 2, 3, 5, 6, 7, 8.

Figure 13:
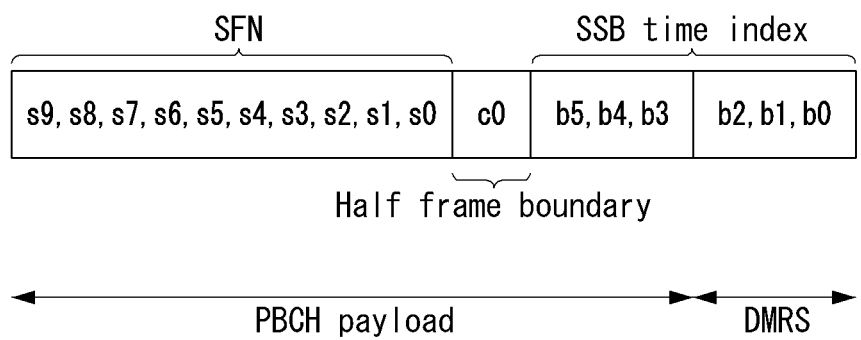
FIG. 13 illustrates that the terminal acquires information about DL time synchronization.

FIG. 13 illustrates that the terminal acquires information about DL time synchronization.

The UE can acquire DL synchronization by detecting the SSB. The terminal may identify the structure of the SSB burst set based on the detected SSB index, and accordingly, detect the symbol/slot/half-frame boundary. The number of the frame/half-frame to which the detected SSB belongs may be identified using SFN information and half-frame indication information.

Specifically, the UE may obtain 10-bit SFN (System Frame Number) information from the PBCH (s0 to s9). 6 bits of the 10-bit SFN information are obtained from MIB (Master Information Block), and the remaining 4 bits are obtained from PBCH TB (Transport Block).

Next, the terminal may acquire 1-bit half-frame indication information (cW). When the carrier frequency is 3 GHz or less, the half-frame indication information may be implicitly signaled using PBCH DMRS. The PBCH DMRS indicates 3-bit information by using one of 8 PBCH DMRS sequences. Therefore, in the case of L=4, the remaining 1 bit after indicating the SSB index among 3 bits that can be indicated using 8 PBCH DMRS sequences may be used for half-frame indication.

Finally, the UE may acquire an SSB index based on the DMRS sequence and PBCH payload. SSB candidates are indexed from 0 to L−1 in time order within the SSB burst set (i.e., half-frame). When L=8 or 64, 3 bits of the least significant bit (LSB) of the SSB index may be indicated using 8 different PBCH DMRS sequences (b0 to b2). When L=64, 3 bits of the MSB (Most Significant Bit) of the SSB index are indicated through the PBCH (b3 to b5). When L=2, the LSB 2 bits of the SSB index may be indicated using four different PBCH DMRS sequences (b0, b1). When L=4, the remaining 1 bit after indicating the SSB index among 3 bits that can be indicated using 8 PBCH DMRS sequences may be used for half-frame indication may be used for half-frame indication (b2).

System Information Acquisition

Figure 14:
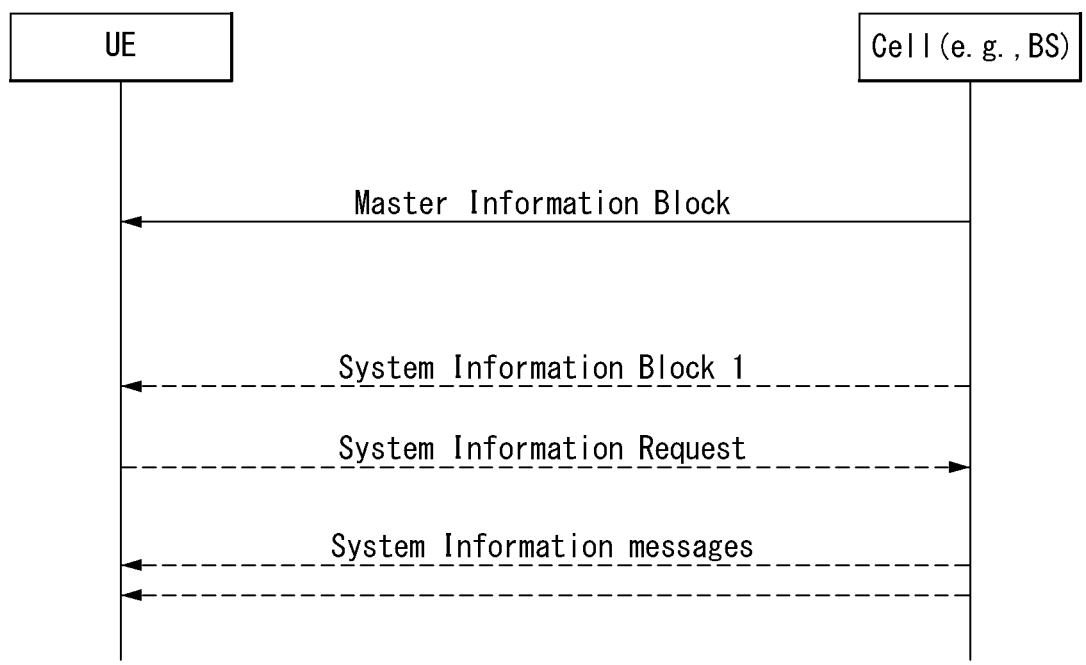
FIG. 14 illustrates an example of a process of obtaining system information (SI).

FIG. 14 illustrates an example of a process of obtaining system information (SI). The UE may acquire AS-/NAS-information through the SI acquisition process. The SI acquisition process may be applied to a UE in an RRC_IDLE state, an RRC_INACTIVE state, and an RRC_CONNECTED state.

SI is divided into MIB (Master Information Block) and a plurality of SIB (System Information Block). SI other than MIB may be referred to as RMSI (Remaining Minimum System Information). For details, refer to the following.

The MIB contains information/parameters related to SIB1 (System Information Block1) reception and is transmitted through the PBCH of the SSB. Upon initial cell selection, the UE assumes that the half-frame with SSB is repeated in a 20 ms period. The UE may check whether there is a CORESET (Control Resource Set) for the Type0-PDCCH common search space based on the MIB. The Type0-PDCCH common search space is a kind of PDCCH search space, and is used to transmit a PDCCH for scheduling SI messages. If there is a Type0-PDCCH common search space, the UE may determine (i) a plurality of consecutive RBs constituting CORESET and one or more consecutive symbols and (ii) PDCCH opportunity (i.e., a time domain location for PDCCH reception) based on information in the MIB (e.g., pdcch-ConfigSIB1). When the Type0-PDCCH common search space does not exist, pdcch-ConfigSIB1 provides information on a frequency location in which SSB/SIB1 exists and a frequency range in which SSB/SIB1 does not exist.

SIB1 includes information related to availability and scheduling (e.g., transmission period, SI-window size) of the remaining SIBs (hereinafter, SIBx, x is an integer greater than or equal to 2). For example, SIB1 may inform whether SIBx is periodically broadcast or is provided at a request of a terminal through an on-demand method. When SIBx is provided by an on-demand method, SIB1 may include information necessary for the UE to perform an SI request. SIB1 is transmitted through the PDSCH, the PDCCH scheduling SIB1 is transmitted through the Type0-PDCCH common search space, and SIB1 is transmitted through the PDSCH indicated by the PDCCH.

SIBx is included in the SI message and is transmitted through the PDSCH. Each SI message is transmitted within a periodic time window (i.e., SI-window).

Channel Measurement and Rate-Matching

Figure 15:
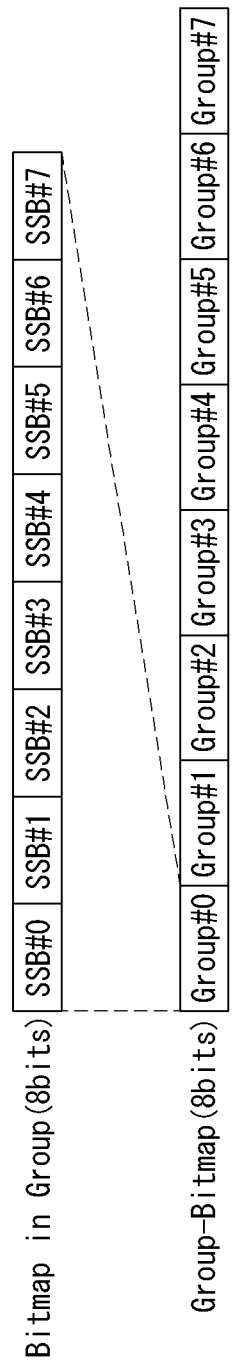
FIG. 15 illustrates an example of a method of informing an actually transmitted SSB (SSB_tx).

FIG. 15 illustrates an example of a method of informing an actually transmitted SSB (SSB_tx).

In the SSB burst set, a maximum of L SSBs may be transmitted, and the number/locations at which SSBs are actually transmitted may vary for each base station/cell. The number/locations at which SSBs are actually transmitted is used for rate-matching and measurement, and information on the actually transmitted SSBs is indicated as follows.

In case of rate-matching: It may be indicated through UE-specific RRC signaling or RMSI. The UE-specific RRC signaling includes a full (e.g., length L) bitmap in both the below 6 GHz and above 6 GHz frequency ranges. On the other hand, RMSI includes a full bitmap at below 6 GHz, and includes a compressed bitmap at above 6 GHz. Specifically, information on the actually transmitted SSB may be indicated using a group-bit map (8 bits)+an intra-group bit map (8 bits). Here, a resource (e.g., RE) indicated through UE-specific RRC signaling or RMSI is reserved for SSB transmission, and PDSCH/PUSCH may be rate-matched in consideration of SSB resources.

In the case of measurement: When in the RRC connected (connected) mode, the network (e.g., the base station) may indicate the SSB set to be measured within the measurement interval. The SSB set may be indicated for each frequency layer. If there is no indication regarding the SSB set, the default SSB set is used. The default SSB set includes all SSBs in the measurement interval. The SSB set may be indicated using a full (e.g., length L) bitmap of RRC signaling. When in RRC idle mode, the default SSB set is used.

DRX (Discontinuous Reception) Operation

The UE may perform the DRX operation while performing the procedures and/or methods described/suggested above. A terminal in which DRX is configured can reduce power consumption by discontinuously receiving DL signals. DRX may be performed in Radio Resource Control (RRC)_IDLE state, RRC_INACTIVE state, and RRC_CONNECTED state. In the RRC_IDLE state and RRC_INACTIVE state, the DRX is used to receive paging signals discontinuously. Hereinafter, DRX performed in the RRC_CONNECTED state will be described (RRC_CONNECTED DRX).

Figure 16:
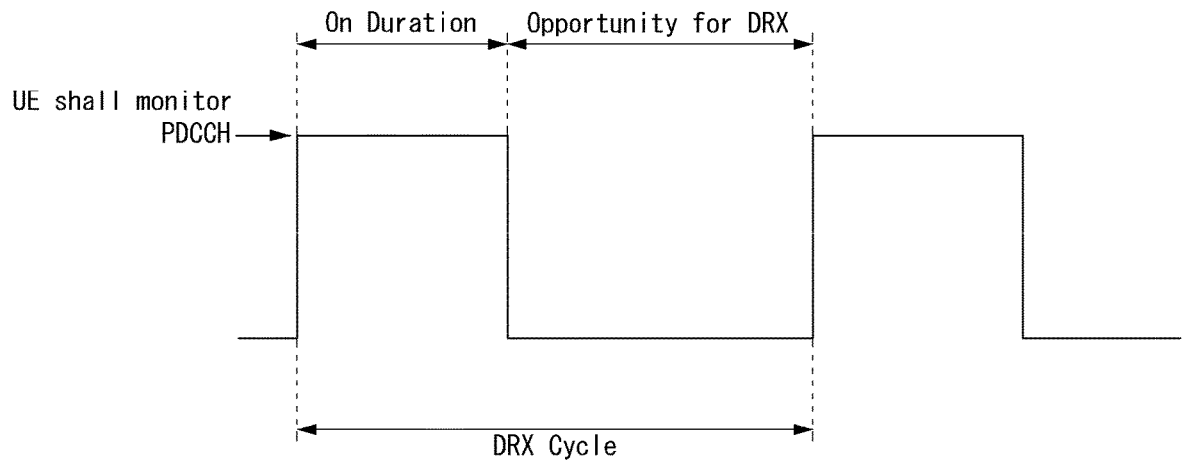
FIG. 16 illustrates an example of the DRX cycle.

FIG. 16 illustrates an example of the DRX cycle (RRC_CONNECTED state).

Referring to FIG. 16, the DRX cycle consists of On Duration and Opportunity for DRX. The DRX cycle defines a time interval in which On Duration is periodically repeated. On Duration represents a time period during which the UE monitors to receive the PDCCH. When DRX is configured, the UE performs PDCCH monitoring during On Duration. If there is a PDCCH successfully detected during PDCCH monitoring, the UE operates an inactivity timer and maintains an awake state. On the other hand, if there is no PDCCH successfully detected during PDCCH monitoring, the terminal enters a sleep state after the On Duration is over. Accordingly, when DRX is configured, PDCCH monitoring/reception may be discontinuously performed in the time domain in performing the procedure and/or method described/proposed above. For example, when DRX is configured, in the present disclosure, a PDCCH reception opportunity (e.g., a slot having a PDCCH search space) may be configured discontinuously according to the DRX configuration. On the other hand, when DRX is not configured, PDCCH monitoring/reception may be continuously performed in the time domain in performing the procedures and/or methods described/suggested above. For example, when DRX is not configured, a PDCCH reception opportunity (e.g., a slot having a PDCCH search space) may be continuously configured in the present disclosure. Meanwhile, regardless of whether or not DRX is configured, PDCCH monitoring may be restricted in a time period configured as a measurement gap.

Table 13 shows the process of the terminal related to the DRX (RRC_CONNECTED state). Referring to Table U1, DRX configuration information is received through higher layer (e.g., RRC) signaling, and whether DRX ON/OFF is controlled by the DRX command of the MAC layer. When DRX is configured, the UE may discontinuously perform PDCCH monitoring in performing the procedures and/or methods described/suggested in the present disclosure, as illustrated in FIG. 12.

TABLE 13

|  | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

Here, the MAC-CellGroupConfig includes configuration information required to configure a medium access control (MAC) parameter for a cell group. MAC-CellGroupConfig may also include configuration information about DRX. For example, MAC-CellGroupConfig defines DRX and may include information as follows.

Value of drx-OnDurationTimer: Defines the length of the start duration of the DRX cycle
  Value of drx-InactivityTimer: Defines the length of the time duration in which the UE is awake after the PDCCH opportunity in which the PDCCH indicating initial UL or DL data is detected
  Value of drx-HARQ-RTT-TimerDL: Defines the length of the maximum time duration from when the initial DL transmission is received until the DL retransmission is received.
  Value of drx-HARQ-RTT-TimerDL: Defines the length of the maximum time duration after the grant for initial UL transmission is received until the grant for UL retransmission is received.
  drx-LongCycleStartOffset: Defines the time length and start point of the DRX cycle
  drx-ShortCycle (optional): Defines the time length of the short DRX cycle Here, if any one of drx-OnDurationTimer, drx-InactivityTimer, drx-HARQ-RTT-TimerDL, drx-HARQ-RTT-TimerDL is in operation, the UE performs PDCCH monitoring at every PDCCH opportunity while maintaining the awake state.

Before describing a method of transmitting and receiving SIB1-NB in the TDD NB-IoT system proposed in the present disclosure, abbreviations and definitions of terms to be described later are summarized.

Abbreviation
  MIB-NB: masterinformationblock-narrowband
  SIB1-NB: systeminformationblock1-narrowband
  CRS: cell specific reference signal or common reference signal
  ARFCN: absolute radio-frequency channel number
  PRB: physical resource block
  PRG: precoding resource block group
  PCI: physical cell identifier
  N/A: non-applicable
  EARFCN: E-UTRA absolute radio frequency channel number
  RRM: radio resource management
  RSRP: reference signal received power
  RSRQ: reference signal received quality
  TBS: transport block size
  TDD/FDD: time division duplex/frequency division duplex Definition
  NB-IoT: NB-IoT allows access to network services through E-UTRA with a channel bandwidth limited to 200 kHz.
  NB-IoT in-band operation: NB-IoT operates in-band when using resource block(s) in a normal E-UTRA carrier.
  NB-IoT guard band operation: NB-IoT operates as a guard band when using resource block(s) not used in the guard band of the E-UTRA carrier.
  NB-IoT standalone operation: NB-IoT operates standalone when using its own spectrum. For example, the spectrum currently used by the GERAN system on behalf of one or more GSM carriers and the spectrum that is scattered for potential IoT deployments.
  Anchor carrier: In NB-IoT, the carrier assumes that NPSS/NSSS/NPBCH/SIB-NB for FDD or NPSS/NSSS/NPBCH for TDD is transmitted.
  Non-anchor carrier: In NB-IoT, a carrier that does not assume that NPSS/NSSS/NPBCH/SIB-NB for FDD or NPSS/NSSS/NPBCH for TDD is transmitted.
  Channel raster: The smallest unit in which the terminal reads resources. In the case of the LTE system, the channel raster (channel raster) has a value of 100 kHz.

In addition, '/' described in the present disclosure can be interpreted as 'and/or', and 'A and/or B' may be interpreted as having the same meaning as 'including at least one of A or (and/or) B'.

The above contents (3GPP system, frame structure, NB-IoT system, etc.) can be applied in combination with the methods proposed in the present disclosure to be described later, or supplemented to clarify the technical characteristics of the methods proposed in the present disclosure.

In addition, the operation related to resource support for the NB-IoT system proposed by the present disclosure to be described later may be applied in combination with the above-described initial access (IA) procedure and random access (RA) procedure, or one or more.

First, the operation related to resource support for the NB-IoT system proposed in the present disclosure is a UE operation performed in connection with the initial access procedure and/or the random access procedure described above is as follows.

The UE may be configured parameters (or control information) that are defined or configured to perform the methods proposed in the present disclosure from the base station through (1) signaling (e.g., DCI, MAC CE, reference signal, synchronization signal, etc.) received through an initial access procedure (or a random access procedure included in the initial access procedure) or (2) signaling (e.g., DCI, MAC CE, reference signal, synchronization signal, RRC signaling, etc.) received in the RRC connected state after the initial access procedure (or the random access procedure included in the initial access procedure).

In addition, the terminal may perform the methods proposed in the present disclosure after the initial access procedure (or the random access procedure included in the initial access procedure) based on the parameters received above.

Next, the operation of the base station is described.

The base station may (1) configure parameters (or control information) for performing the methods proposed in the present disclosure through an initial access procedure (or a random access procedure included in the initial access procedure) and transmit the configured parameters to the UE through specific signaling (e.g., DCI, MAC CE, reference signal, synchronization signal, etc.), or (2) configure the parameters (or control information) in RRC connected state after initial access procedure (or random access procedure included in initial access procedure) and transmit them to the UE through specific signaling (e.g., DCI, MAC CE, reference signal, synchronization signal, RRC signaling, etc.).

And, the base station may perform the methods proposed in the present disclosure after the initial access procedure (or the random access procedure included in the initial access procedure) based on the corresponding parameters.

Second, the operation related to resource support for the NB-IoT system proposed in the present disclosure, for a procedure performed in connection with the procedure for receiving NPDCCH (or MPDCCH) during the on duration of the DRX cycle described above and the procedure for transitioning to the RRC connected state, is described by dividing the UE and the base station operation.

The procedure described below may be performed independently or may be performed in connection with the initial access procedure and/or the random access procedure.

If the procedure described below is performed in connection with the initial access procedure and/or the random access procedure, It may be related to performing initial access and/or random access by the UE or the base station in the process of performing cell (re)selection after transmitting/receiving a paging message in DRX mode.

First, the operation of UE operation is described.

The UE may be configured parameters (or control information) defined or configured to perform the methods proposed in the present disclosure through (1) signaling received in connection with DRX operation (e.g., DCI, MAC CE, reference signal, synchronization signal, RRC, etc.), or (2) a paging message, or (3) RRC signaling in an RRC connected state.

Further, the UE may receive paging in DRX based on the parameters received above and perform the methods proposed in the present disclosure in an RRC connected state.

Next, the operation of the base station is described.

The base station may (1) configure parameters (or control information) for performing the methods proposed in the present disclosure through the DRX-related procedure and transmit the configured parameters to the UE through specific signaling (e.g., DCI, MAC CE, reference signal, synchronization signal, RRC signaling, etc.), or (2) transmit them to the UE through a paging message, or (3) transmit them to the UE through RRC signaling in an RRC connected state.

In addition, the base station may perform the methods proposed in the present disclosure after transmitting paging in the DRX based on the corresponding parameters.

However, the above-described contents are examples, and parameter configuration and UE/base station operation for performing the methods proposed in the present disclosure may be performed in connection with operations mentioned throughout this document.

Narrowband (NB)-LTE is a system for supporting low complexity and low power consumption with a system BW corresponding to 1 PRB of the LTE system. This can be mainly used as a communication method for implementing the internet of things (IoT) by supporting devices such as machine-type communication (MTC) in a cellular system. NB-LTE has the advantage of efficiently using frequency by allocating 1 PRB for NB-LTE to the legacy LTE band without additional band allocation by using the same OFDM parameters as LTE, such as subcarrier spacing of the existing LTE. In the case of downlink, the physical channel of NB-LTE is defined as NPSS/NSSS, NPBCH, NPDCCH/NEPDCCH, NPDSCH, etc., and N is added to distinguish it from LTE.

In legacy LTE and LTE eMTC, semi-persistent scheduling (SPS) is introduced and used. The first UE receives SPS configuration setup information through RRC signaling. Subsequently, when the UE receives the SPS activation DCI (with SPS-C-RNTI), It operates the SPS using SPS configuration information received through RRC signaling and resource scheduling information, MCS information, etc. included in the DCI. When the UE receives the SPS release DCI (with SPS-C-RNTI), the SPS is released. After receiving the SPS activation DCI (with SPS-C-RNTI) again, it operates the SPS as described above.

If, after receiving the SPS release DCI (with SPS-C-RNTI), the UE receives SPS configuration release information through RRC signaling, the UE cannot detect the SPS activation DCI (because it does not know the SPS-C-RNTI value) until it receives the SPS configuration setup information again.

The SPS operation basically has the advantage of reducing the DCI overhead of a base station (e.g., eNB). However, in the NB-IoT system, in addition to reducing the DCI overhead of the base station, SPS can be additionally introduced as a method for battery saving and latency reduction of the NB-IoT UE.

Therefore, this disclosure proposes a method for maintaining the existing complexity, a signal to be included in a higher layer signal, DCI required when introducing an SPS into an NB-IoT system.

In addition, the present disclosure also proposes an operation required to use the SPS in idle mode and connected mode, respectively.

The meaning of 'monitoring the search space' used in the present disclosure means a process of scrambling the corresponding CRC to a predetermined RNTI value to check whether the desired value is correct after decoding the NPDCCH for a specific area according to the DCI format to be received through the search space.

Additionally, since each UE in the NB-LTE system recognizes a single PRB as a respective carrier, it can be said that the PRB referred to in the present disclosure has the same meaning as a carrier. DCI formats N0, N1, and N2 referred to in the present disclosure refer to DCI formats N0, N1, and N2 in the 3GPP TS 36.212 standard.

Figure 17:
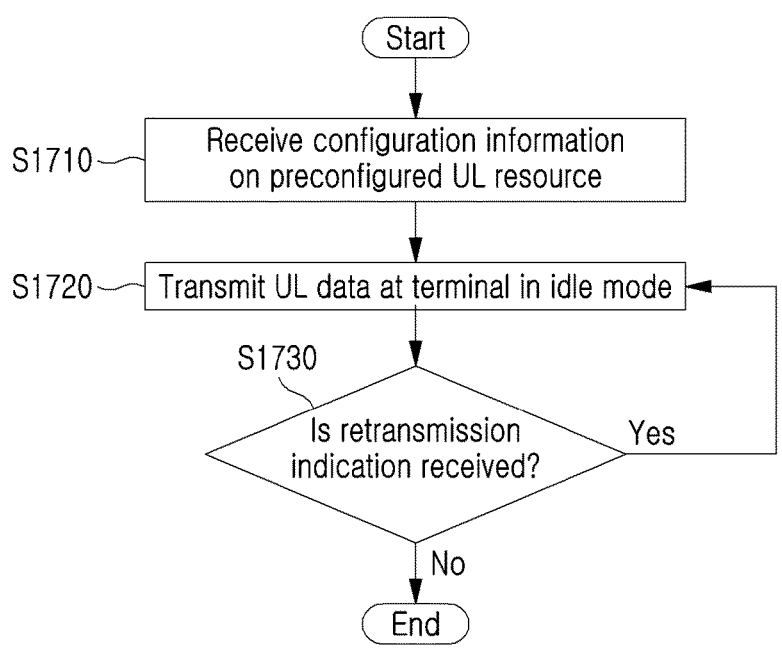
FIG. 17 illustrates an example of an operation flowchart of a UE performing idle mode PUR transmission of one or more physical channels/signals to which the method proposed in the present disclosure can be applied.

FIG. 17 illustrates an example of an operation flowchart of a UE performing idle mode preconfigured UL resource transmission of one or more physical channels/signals to which the method proposed in the present disclosure can be applied. FIG. 17 is merely for convenience of description and does not limit the scope of the present disclosure.

Referring to FIG. 17, the UE receives configuration information for a preconfigured UL resource from the base station (S1710). And, when the UE is in the idle mode (or idle state) (idle mode UE), the idle mode UE transmits UL data to the base station in the idle mode (S1720). In addition, the idle mode UE checks whether retransmission has been indicated from the base station (S1730).

Here, when the idle mode UE is not indicated to retransmit from the base station, the idle mode UE may repeat the process of transmitting the UL data.

Figure 18:
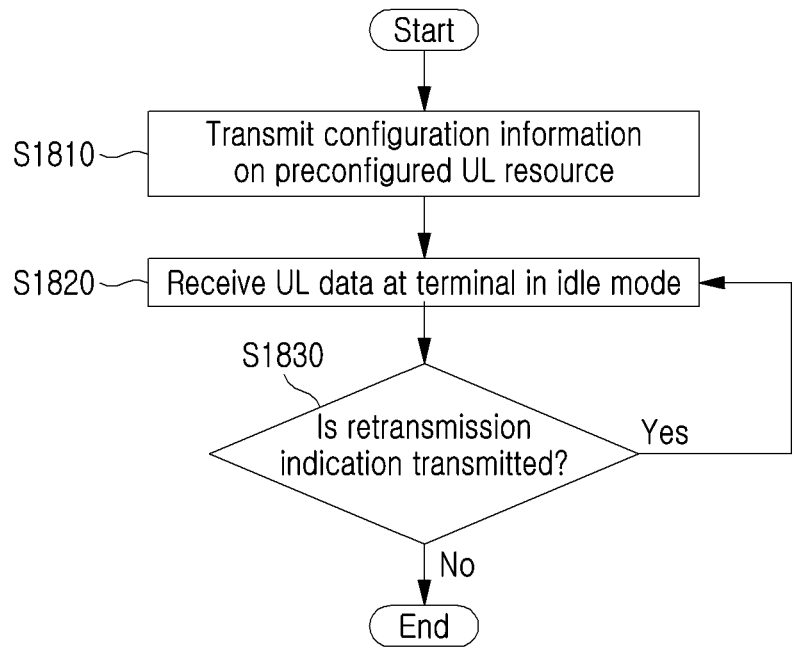
FIG. 18 illustrates an example of an operation flow chart of a base station performing idle mode PUR transmission of one or more physical channels/signals to which the method proposed in the present disclosure can be applied.

FIG. 18 illustrates an example of an operation flow chart of a base station performing idle mode preconfigured UL resource transmission of one or more physical channels/signals to which the method proposed in the present disclosure can be applied. FIG. 18 is merely for convenience of description and does not limit the scope of the present disclosure.

Referring to FIG. 18, the base station transmits configuration information for a preconfigured UL resource to the UE (S1810). Thereafter, it is assumed that the UE has transitioned to the idle mode (or idle state). In this case, the UE in the idle mode may be referred to as an idle mode UE. The base station receives UL data from the idle mode UE (S1820).

And, when the base station indicates the idle mode UE to retransmission (S1830), step S1820 is performed again.

Figure 19:
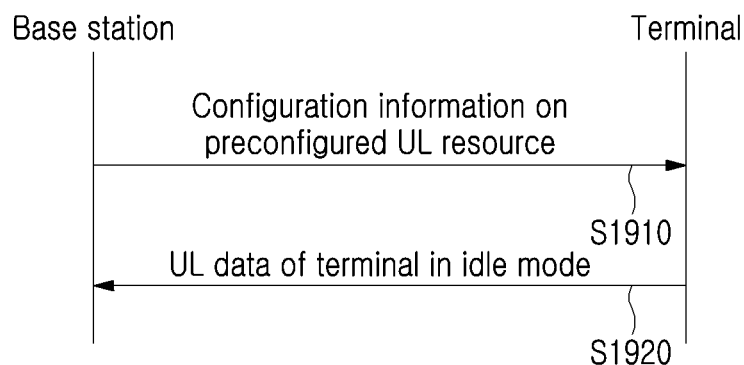
FIG. 19 illustrates an example of signaling between a base station and a UE performing idle mode PUR transmission/reception of one or more physical channels/signals to which the method proposed in the present disclosure can be applied.

FIG. 19 illustrates an example of signaling between a base station and a UE performing idle mode preconfigured UL resource transmission/reception of one or more physical channels/signals to which the method proposed in the present disclosure can be applied. FIG. 19 is merely for convenience of description and does not limit the scope of the present disclosure.

First, the base station transmits configuration information on the preconfigured UL resource to the UE (S1910). Thereafter, it is assumed that the UE has transitioned to the idle mode (or idle state). In this case, the UE in the idle mode may be referred to as an idle mode UE. And, the idle mode UE transmits UL data to the base station in the idle mode (S1920).

Additionally, when the base station does not receive UL data from the idle mode UE, the base station may indicate retransmission to the idle mode UE.

First Embodiment: Idle Mode Operation

The first embodiment relates to a method for a UE operating in an idle mode (hereinafter referred to as an "idle mode UE") to perform an SPS operation. In this case, in order to perform the SPS operation in the idle mode, the UE should store the RRC configuration and the like. Therefore, the operation proposed in the first embodiment can be applied when a specific UE is indicated to postpone RRC connection in the RRC_connected state and moves to the RRC_Idle state. Although the method mentioned in the first embodiment is described based on NB-IoT, it is natural that it can be applied to other systems as well as eMTC. Among the terms used in the methods proposed in the present disclosure, deactivation has the same meaning as 'release' described or defined in 36.213.

(Method 1): Configuration by RRC and (Re-)Activation/Deactivation/Retransmission by Signaling/DCI Method 1 is similar to the SPS operating in the connected mode, and transmits the UE-specific SPS-related configuration to the UE through RRC signaling. Thereafter, it may be configured that the base station indicates (re-)activation/deactivation/retransmission through DCI detection (or specific signal detection) of the UE. In this case, the following method may be considered as a detailed method of indicating (re-)activation/deactivation/retransmission using DCI detection.

(Method 1-1): Method to Introduce a New Search Space for Idle Mode SPS Operation Method 1-1 is a method of introducing a new search space for SPS transmission/reception while leaving the legacy search space as it is. Characteristically, the corresponding search space may be a UE specific search space or a common search space. In the case of a common search space, the base station may indicate (re-)activation or deactivation or retransmission to the UE group. When the aforementioned new search space is called 'SPS-SS', as a parameter for SPS-SS configuration, in addition to Rmax, G, alpha offset, etc., which are parameters for the existing SS configuration, a search space period, search space monitoring duration, etc. may be additionally required.

In this case, the search space period refers to a period in which the UE should wake up to monitor the search space. In addition, the corresponding search space period value may be configured to start from a time point configured by RRC, and may be configured to indicate the start point by RRC signaling.

For example, if the search space period is configured for 12 hours, the UE in the idle mode may be configured to wake up once every 12 hours and monitor the search space at a predetermined timing with Rmax, G, alpha offset, etc. In addition, the search space monitoring duration may be configured that the UE in the idle mode wakes up every search space period and monitors the SPS-SS, and monitors as much as the search space monitoring duration. Characteristically, the search space monitoring duration may be defined in units of PDCCH period (pp), or may be defined in units of absolute time (e.g., ms).

For example, as in the previous example, if the search space period is configured for 12 hours and the search space monitoring duration is configured as 10 pp, the UE in the idle mode may be configured to wake up every 12 hours, and monitor the SPS-SS as much as 10 pp, and sleep again.

On the other hand, in the case of configuring the search space period, the search space monitoring duration, etc. for a new search space, it can be configured that actual SPS resources for SPS transmission/reception are determined by configuring the SPS period, SPS tx/rx duration, etc. Characteristically, the corresponding SPS period and SPS tx/rx duration can be configured independently of the aforementioned search space period and search space monitoring duration, and if one of them is not configured, it can be configured to follow the value of the other.

In addition, the SPS tx/rx duration may be defined as a unit of how many times all repetitive transmissions of NPDSCH/NPUSCH, or may be defined in units of absolute time (e.g., ms). When the duration is configured as an absolute time, it may be configured that the SPS transmission/reception operation is performed when the end point of the last SF of the NPDSCH/NPUSCH to be transmitted/received does not exceed the configured duration.

Figure 20:
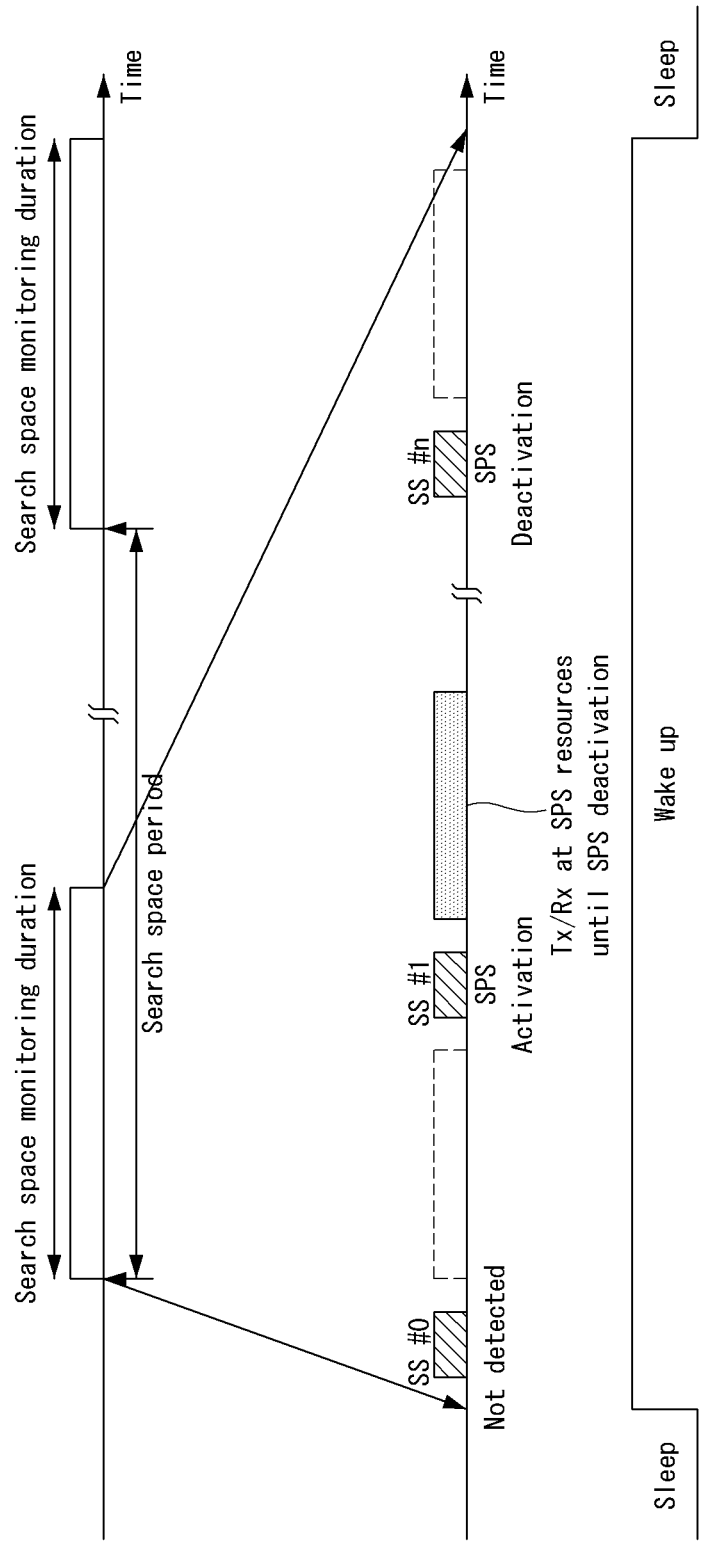
FIG. 20 is a diagram illustrating an example of an idle mode SPS operation having a new search space proposed in the present disclosure.

FIG. 20 is a diagram illustrating an example of an idle mode SPS operation having a new search space proposed in the present disclosure.

FIG. 20 shows Method 1-1. Referring to FIG. 20, it can be seen that the search space period of the longest period exists, and the UE is monitoring during the search space monitoring duration. Also, the SPS period is the same as the search space period, and the SPS tx/rx duration is the same as the search space monitoring duration. Since SPS activation was performed in SS #1, the UE can perform Tx/Rx using the SPS resource that exists thereafter. If SPS deactivation is not performed differently from FIG. 20 in SPS #n, the UE may be configured to proceed with Tx/Rx using SPS resources in the next search space monitoring duration.

When Method 1-1 is used, there is an advantage that the idle mode UE does not need to perform search space monitoring in all SPS-SSs, but the number of search space monitoring increases compared to the existing idle mode UE without SPS operation.

(Method 1-2): Method to Add Specific Parameters (e.g., Monitoring Window, Monitoring Period, Etc.) to the Existing Search Space Method 1-2 is similar to Method 1-1, but relates to a method in which no new search space is introduced. That is, it can be configured that the search space period and the search space monitoring duration proposed in Method 1-1 are additionally configured to the legacy search space (e.g., UE specific search space or common search space). Method 1-2 has the advantage that it is not necessary to provide new search space information through RRC because no new search space is introduced compared to Method 1-1, and other operations are similar to Method 1-1.

Similar to Method 1-1, Method 1-2 has the advantage that the idle mode UE does not need to monitor all search spaces, but the number of search space monitoring increases compared to the existing idle mode UEs without SPS operation.

(Method 1-3): Method to Share an Existing Search Space

Method 1-3 is a method of sharing the existing search space used by the legacy NB-IoT UE in the idle mode as a search space for DCI detection.

For example, Method 1-3 may configure to indicate (re-)activation/deactivation/retransmission, etc. of the SPS by sharing type-1 CSS, which can detect paging, type-1A CSS, and type-2A CSS for SC-PTM (Single Cell-Point To Multipoint). In order to use Method 1-3, there is a limitation that the DCI payload size for the SPS operation should be the same as the DCI payload size that could be transmitted to each search space. This is for the purpose of not increasing the number of BDs from the perspective of the UE.

The advantage of Method 1-3 is that the number of search space monitoring performed by the existing idle mode UE is maintained, so it can be said that it is the most advantageous in terms of power saving of the UE among SPS operation methods using DCI. However, compared to the previously proposed methods, this method has the characteristic of operating the SPS in a UE group specific manner, rather than operating the SPS in a UE specific manner, since CSS should be shared.

In addition, the following methods may be considered as detailed methods of indicating (re-)activation/deactivation/retransmission using signal detection.

(Method 1-4): Method to Use WUS Like Signal

Method 1-4 is a method of configuring that the wake up signal, which determines whether to monitor the existing paging search space, is used as a signal that indicates SPS (re-)activation/deactivation/retransmission. Characteristically, Method 1-4 may be configure to distinguish it from the wake up signal by changing the existing wake up signal type, root index, and scrambling sequence, and may be configured to operate the SPS by configuring the corresponding parameter to UE specific/UE group specific.

Figure 21:
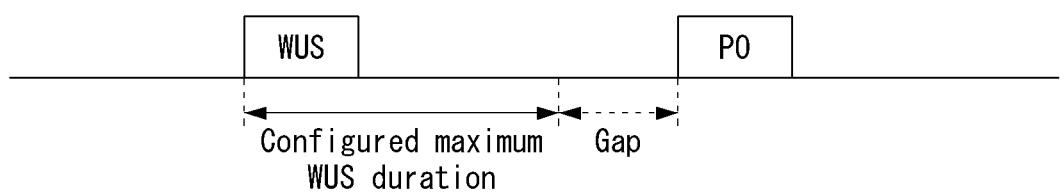
FIG. 21 is a diagram illustrating an example of a timing relationship between WUS and paging occasion.

FIG. 21 is a diagram illustrating an example of a timing relationship between WUS and paging occasion.

Referring to FIG. 21, a brief description will be given of UE/base station operations related to WUS.

The UE receives configuration information related to WUS from the base station through higher layer signaling.

And, the UE receives the WUS from the base station for the configured maximum WUS duration.

Here, WUS refers to a signal used to indicate whether the UE should monitor the NPDCCH to receive paging (in a specific cell), and is associated with one or more paging occasions (PO) depending on whether extended DRX is configured.

And, the UE (receiving WUS) may additionally perform the aforementioned DRX operation and/or cell reselection operation.

In addition, it is apparent that more specific UE operations and base station operations related to reception of a narrowband wake up signal (NWUS) may be briefly summarized as follows, and can be described in connection with the methods proposed in the present disclosure.

Base Station Operation

First, the base station generates a sequence for WUS (or used for WUS) in a specific subframe using the previously defined equation.

And, the base station maps the generated sequence to at least one RE. And, the base station transmits the WUS to the terminal on the mapped RE(s).

The at least one RE may be a concept including at least one of a time resource, a frequency resource, or an antenna port.

UE Operation

The UE receives the WUS from the base station (or the UE may assume that the WUS is transmitted from the base station on a specific RE(s)).

In addition, the UE may check (or determine) whether to receive paging based on the received WUS.

If paging is transmitted, the UE receives paging based on the paging reception-related operation described above, and proceeds with a procedure for transitioning from the RRC idle mode to the RRC connected state.

Second Embodiment: Configuration and (Re-)Activation/Deactivation by RRC

The second embodiment relates to a method similar to the type 1 configured grant operation introduced in the NR. That is, SPS-related (re-)configuration is UE-specific transmission through RRC signaling as in the first embodiment described above, but the biggest difference is that (re-)activation (or (re-)configuration) is indicated by RRC signaling, so it is not necessary to monitor the search space to receive (re-)activation/deactivation. Characteristically, the SPS-related (re-)configuration may include MCS, RU, resource assignment, repetition number, etc., which should be included in the DL/UL grant (i.e., DCI format N0, N1 with C-RNTI) along with the SPS interval, #(number) of HARQ for SPS.

In the second embodiment, when the UE receives an SPS (re-)configuration indication through RRC signaling, the corresponding operation may be configured to be a (re-)activation operation immediately, or configured to be (re-)activated at the moment the UE moves to the RRC idle state after the UE receives an SPS (re-)configuration indication through RRC signaling.

Thereafter, the UE (idle mode UE) returns to the RRC connected state and until the base station releases the SPS configuration to the UE through RRC signaling, the UE may think that the configured grant is valid and perform the transmission/reception operation.

Characteristically, the reason that the UE may think that the configured grant is valid may be additionally necessary to determine that the TA (Timing Advance) is valid at the time of transmission/reception. The advantage of the second embodiment is that DCI monitoring is not required for SPS operation. This may soon be linked to the battery saving effect of the UE. However, once (re-)configure the SPS in the connected mode, it is always activated in the idle mode, so there is a disadvantage that the UE should be switched back to the connected mode state in order for the base station to reconfiguration, deactivation (if introduced) or release the corresponding SPS, Additionally, the retransmission operation when using the method proposed in the second embodiment may be divided into detailed methods as follows.

(Method 1): No SPS Retransmission in RRC Idle State

Method 1 is a method in which the UE believes that the base station has smartly indicated that the resource is configured through RRC signaling, transmits/receives using the corresponding resource, and does not perform a retransmission operation.

In this case, in order to increase the probability of successful reception of the base station, a repetition method introduced in NR may be additionally applied in addition to the repetition used previously.

That is, the repetition number (e.g., R) indicating the number of repetitive transmissions of NPDSCH/NPUSCH is repetitive transmission using a fixed RV value. In addition, the base station may indicate to the terminal an RV value that is additionally provided through RRC signaling and an R2 value indicating additionally transmit while changing the RV value. The terminal may be configured to perform repetitive transmission/reception accordingly.

For example, if the R value configured through RRC signaling for UL SPS is 16, the RV value is {0, 2, 3, 1}, and the R2 value is 4, the base station may configured that the initial RV value is 0 and the NPUSCH is repeatedly transmitted 16 times, and then the RV value is 2 and the NPUSCH is repeatedly transmitted 16 times. In this way, it may be configured to continue the legacy idle mode UE operation until the next SPS resource exists after repeating each of 16 times for RV 3 and RV 1.

If the base station wants to request retransmission of UL data from the UE or the base station wants to retransmit the DL data, the base station may resume the UE in the idle mode (with suspension) in the connected mode through the paging signal and schedule through the dynamic grant.

Additionally, it may be configured that the base station indicates to the UE on which SPS transmission/reception is activated using the paging NPDSCH for the purpose of SPS deactivation (or release or reconfiguration). This method has the advantage that deactivation/release/reconfiguration, etc. can be performed in the idle mode state while the UE in which SPS transmission/reception is activated through RRC is not resumed in the connected mode.

(Method 2): Retransmission by Using DCI (or Signaling)

Method 2 may be to apply the method of indicating through DCI (or signaling) proposed in the first embodiment described above to only retransmission.

Characteristically, method 2 can be configured to use compact DCI having a small DCI payload size because the corresponding DCI (or signaling) indicates only retransmission. Here, it may be configured that a resource for retransmission through RRC signaling can be indicated together with the aforementioned SPS configuration. Method 2 has the disadvantage of monitoring the search space, but has the advantage that the base station can dynamically request retransmission when desired.

Third Embodiment: Configuration by RRC and (Re-)Activation/Deactivation/Retransmission by Paging NPDSCH The first embodiment has the advantage that (re-)activation/deactivation/retransmission, etc. can be indicated when the base station wants, but there is a disadvantage in that the search space to be monitored by the legacy idle mode UE is increased, and the second embodiment has the advantage that the search space monitored by the idle mode UE does not increase, but there is a disadvantage in that the UE in the idle mode UE should be switched to the connected mode and then RRC singling should be transmitted in order to deactivation (or release).

The third embodiment is a method of configuring that (re-)activation/deactivation/retransmission is indicated by including the SPS UL/DL grant in the payload of the paging NPDSCH after configuring SPS-related parameters through RRC configuration.

Characteristically, the UL/DL grant included in the paging NPDSCH may be configured to be UE-specific. To this end, the UE may be configured to receive a new UE specific ID from the base station through RRC signaling, or may be configured to use resumeIdentity, which is a parameter that the UE already has.

Here, the validation field configuration confirming that the UL/DL grant included in the paging NPDSCH indicates (re-)activation/deactivation may be configured similarly to LTE/eMTC. Retransmission may also be configured to indicate this by configuring a new data indicator (NDI) value to 1.

When the third embodiment is used, there is an advantage that the number of search spaces that the idle mode UE should monitor does not increase compared to the number of search spaces monitored by the legacy idle mode UE, which means that the battery usage does not increase while supporting SPS operation. In addition, there is an advantage that (re-)activation/deactivation/retransmission, etc. can be performed without switching the idle mode UE to the connected mode when the base station desires.

(Method 3-1): Configuration by RRC and (Re-)Activation/Deactivation/Retransmission and/or NPDSCH Payload by Type1-CSS (or Type1A-CSS)

The third embodiment was a method of indicating SPS (re-)activation/deactivation/retransmission, etc. using only the NPDSCH payload, but Method 1 additionally considers a method of indicating SPS (re-)activation/deactivation/retransmission, etc. using a search space in which a DCI scheduling NPDSCH is transmitted. Here, in order not to have an impact on the legacy UE, NPDCCH candidates to which DCI indicating SPS (re-) activation/deactivation/retransmission can be transmitted may be configured to be transmitted without overlapping with NPDCCH candidates of Type1-CSS (or Type1A-CSS).

And, in order for the base station to simultaneously transmit the legacy DCI and the DCI for SPS indication, both DCIs have a feature that Rmax is set to be large and the actual repetition is set to be small. In addition, it may be configured that the base station controls the start time of the legacy NPDSCH by indicating a fake repetition number different from the actual repetition value in the field indicating the legacy DCI repetition number.

In this case, the UE can monitor the DCI for SPS indication between the legacy DCI and the legacy NPDSCH, and the base station can configure to indicate SPS (re-)activation/deactivation/retransmission through this. Here, the RNTI value that can be used for DCI for SPS indication may be configured to be indicated by RRC in UE specific (or UE group specific).

(Method 3-2): Configuration by RRC and (Re-)Activation/Deactivation/Retransmission by (Additional) Paging Opportunity (or New Indication Parameter)

If activation/deactivation/retransmission is configured to be able to be indicated by the base station by reusing the legacy CSS (or reusing the shape of the legacy CSS), it is possible to wake up an unnecessary UE while trying to transmit information to a UE using PUR.

Accordingly, so that the base station can indicate only the UEs using PUR, the base station can broadcast through system information by configuring a paging occasion (e.g. PUR paging occasion, PPO). In addition, the UE may be configured to receive activation/deactivation/retransmission through the corresponding PPO. Here, the UE may be configured to monitor both the paging occasion for the legacy paging procedure and the PPO for the PUR operation. However, if only one of the two needs to be monitored from the viewpoint of battery saving of the UE, if the UE can use a paging occasion for a legacy paging procedure and a PPO for PUR operation, the UE may be configured to expect that a legacy paging procedure may be performed through a PPO for PUR operation.

Here, since the base station also knows in advance which UE (based on contention free PUR) to perform the PUR, it may be configured that the legacy paging signal for the corresponding UE is also transmitted through the PPO for the PUR operation. In addition, the PPO proposed above may be applied by being replaced with a wake up signal. That is, it is possible to configure only the PUR UE to monitor paging by using a (group wise) wake up signal to wake the PUR UE. Alternatively, there may be a wake up signal for waking the PUR UE before the PPO for the PUR operation, and the base station may inform the UE that paging containing activation/deactivation/retransmission, etc. is transmitted through the corresponding wake up signal.

Additionally, a system information change notification that only UEs using PUR can recognize may be added, or a system information channel that is monitored by only UEs using PUR may be configured to exist. These methods also have the advantage of not having to wake up a UE that does not perform PUR when waking up a UE that performs PUR, as proposed above.

Characteristically, the proposed paging occasion (or SI change notification, or monitoring SI channel) may be configured differently according to the PUR type. That is, the paging occasion configuration/resource to be monitored may be different according to the PUR type used by the UE. Here, if the system information and part/all of the monitoring DL channel for PUR overlap, the UE may configure to prioritize the monitoring DL channel for PUR. This is because the UE is performing the PUR operation in the idle mode, it may be a desirable operation to first check the monitoring DL channel for the PUR and listen to the system information transmitted in the next period.

Fourth Embodiment: Configured Resource with RACH Procedure

It is desirable for the UE entering the RRC idle state to save power as much as possible. However, in this case, because oscillator drift of the UE occurs, it may be difficult to ensure a good TA. Therefore, considering how the TA is well guaranteed without consuming power periodically, a method of operating the configured resource based on the RACH procedure as shown in FIG. 13 may be considered.

Figure 22:
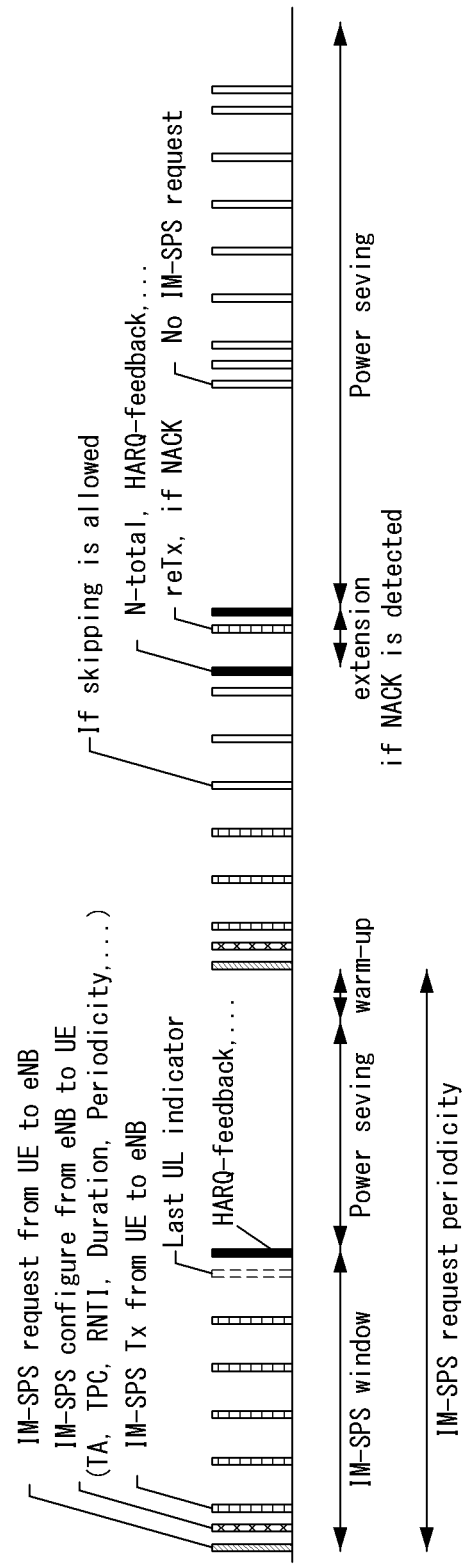
FIG. 22 is a diagram illustrating an example of a resource configured by the RACH procedure proposed in the present disclosure.

FIG. 22 is a diagram illustrating an example of a resource configured by the RACH procedure proposed in the present disclosure.

First, the base station may configure a resource capable of requesting Idle mode SPS (IM-SPS) to the UE.

First, to UEs configured in the RRC connected state and moved to the RRC idle state, the base station may indicate the NPRACH preamble for the IM-SPS trigger through SIB or RRC signaling. Characteristically, the corresponding NPRACH preamble can be configured to be indicated as one of contention based random access (CBRA) or contention free random access (CFRA) resources.

Here, it may be desirable to indicate one of the CFRA resources to UE specific through RRC signaling so that IM-SPS can be performed without a contention process for power saving. Here, it may be configured that NPRACH resource related parameters (period, repetition number (or CE level), PRB index, etc.) are also transmitted. In this way, when the UE indicated with one of the CFRA resources transmits the corresponding preamble to proceed with the IM-SPS request, the base station may configure to accept the IM-SPS request through MSG2 (i.e., RAR).

Characteristically, here, the TBS required for the UE may follow a structure similar to EDT (Early Data Transmission), or be preconfigured at the request of the UE in the RRC connected state.

Meanwhile, it may be configured so that a UE not configured in the RRC connected state can trigger the IM-SPS in the RRC idle state.

The base station may indicate the NPRACH preamble for the IM-SPS trigger through the SIB (e.g., SIB2-NB, SIB22-NB, etc.). Characteristically, the NPRACH preamble may be configured to be indicated as one of CBRA resources.

Here, it may be configured that parameters related to NPRACH resource (period, repetition number (or CE level), PRB index, etc.) are also transmitted.

In this way, when the UE indicated with one of the CBRA resources transmits the corresponding preamble to proceed with the IM-SPS request, the base station may configure to accept the IM-SPS request through MSG4. The UE can be configured to request the SPS cycle, TBS, etc. necessary for itself through MSG3.

Next, the base station that has accepted the IM-SPS trigger of the UE may indicated the corresponding terminal with TA, TPC, RNTI, Duration, Periodicity, TBS, Resource allocation, repetition, etc. to use for IM-SPS. The UE indicated to this may be configured to transmit the IM-SPS within a valid transmission period or as many times as valid transmission times.

Characteristically, the UE may configure the base station to determine that the corresponding IM-SPS has ended by making an indication when transmitting the last NPUSCH of the transmission period. And, when the UE receives the indication, it may be configured that the base station gives feedback. In addition, when UL skipping is allowed in the transmission period, it may be configured that the IM-SPS is implicitly released when UL skipping occurs by the number (e.g., N, N are natural numbers) indicated by the base station. In addition, it may be configured that the base station explicitly indicates the release of the IM-SPS.

Additionally, it may be configured that the base station can perform HARQ-feedback, and the corresponding HARQ-feedback may be indicated such as explicit release. In addition, when UL skipping is allowed, the base station may be configured to inform the number of NPUSCHs actually transmitted from the UE. In addition, it can be configured that ACK/NACK is indicated in the form of a bitmap for each of the corresponding NPUSCHs. If the UE is indicated to NACK, retransmission may be performed even if the IM-SPS transmission period is terminated, and TA/TPC values may be additionally informed while indicating NACK.

Alternatively, the NPUSCH in which NACK has occurred may be configured to be retransmitted in the next SPS interval.

Characteristically, even if the UE is indicated to a resource capable of triggering an IM-SPS, if the UE determines that there is no UL resource to be transmitted, it may be configured to not transmit the corresponding NPRACH preamble.

Alternatively, if the UE is indicated to a resource capable of triggering an IM-SPS, it may be configured that the UE first proceeds with an IM-SPS request to perform IM-SPS transmission, and then receives a back-off parameter from the base station through a feedback channel/signal to determine a time at which the next IM-SPS request can be made.

Hereinafter, the following items may be applied in common to the above-described embodiments and/or methods.

(Collision Handling)

A region in which WUS (wake up signal) can be transmitted, or paging NPDSCH, type-1 CSS in which the NPDCCH scheduling the paging NPDSCH can be transmitted, or SPS NPDSCH/NPUSCH, or SPS-SS to which NPDCCH indicating SPS (re-)activation/deactivation/retransmission, etc. can be transmitted overlaps all or part of the time/frequency, the UE may be configured to operate with priority to either side. Viewing paging from the standpoint of the Idle mode UE is important to the operation of the entire system, so it may be configured that the area in which WUS can be transmitted, or Paging NPDSCH, or type-1 CSS has a higher priority than those related to SPS transmission (i.e., SPS NPDSCH/NPUSCH, or SPS-SS). That is, if the region in which WUS can be transmitted, or Paging NPDSCH, or type-1 CSS overlaps all or part of those related to SPS transmission, the UE may be configured to not transmit/receive anything related to SPS transmission. The above scheme may be configured to apply equally between the RACH process and those related to SPS transmission. That is, if the NPRACH resource to transmit the NPRACH preamble, or the type-2 CSS in which the NPDCCH scheduling the NPDSCH to which the RAR grant is to be transmitted can be transmitted overlaps all or part of SPS NPDSCH/NPUSCH, or SPS-SS in which NPDCCH indicating SPS (re-)activation/deactivation/retransmission, etc. can be transmitted, the UE may be configured that it does not transmit/receive anything related to SPS transmission.

Additionally, when the NPUSCH transmission according to the UL SPS configuration and paging/RACH overlap, it can be configured to postpone instead of dropping the NPUSCH transmission. This may be applied for a UE capable of receiving early termination from a base station. That is, if the NPUSCH transmission and the paging search space overlap, it may be configured that NPUSCH transmission according to the SPS configuration is temporarily stopped and the paging search space is monitored to determine early termination, and then when early termination is indicated, NPUSCH transmission can be stopped, and when early termination is not indicated, the remaining NPUSCH transmission can be performed according to the SPS configuration.

(Timing Advance (or Power) Control by Retransmission)

Among the above-described embodiments and/or methods, methods considering SPS retransmission may be configured to perform TA control and power control through retransmission. In terms of UL SPS, the TA or tx power control method may be configured to gradually increase the tx power according to the number of retransmissions indicated by the base station. And, when the maximum number of retransmissions is reached, the UE determines that there is a problem with TA or tx power, and may configured to transmit a resume request to the base station to move to the RRC connected state.

Alternatively, when the maximum number of retransmissions is reached, it may be configured that the SPS configuration may be implicitly deactivated (or released). Alternatively, when the base station attempts to indicate retransmission for UL configured resources through a DL channel/signal, etc., it may be configured to additionally indicate a TA/TP value along with parameters for retransmission.

That is, before the UE performs a procedure for tracking because the TA is misaligned, the base station can contribute to power saving of the UE by automatically indicating a value such as TA/TP.

Additionally, it may be configured to use the RACH procedure to control TA and power for the idle mode SPS operation.

In a specific way, when SPS transmission/reception is performed more than the configured number of times or predetermined number of times, or a specific time has passed, the UE may be configured to receive confirmation from the base station so that the corresponding SPS transmission/reception can be continuously used by transmitting the NPRACH preamble and receiving a random access response (RAR).

To this end, the base station may configure the NPRACH preamble for SPS confirmation. When the base station receives the NPRACH preamble for SPS confirmation, it can be configured to transmit the RAPID and TA values (additionally, an explicit confirm message) to the UE through the RAR. To this end, the base station may be configured to indicate to the UE through the SIB-NB (e.g., SIB2-NB or SIB22-NB) the RACH carrier and CE level for performing the RACH procedure for SPS confirmation. If there is a limit to the division of the NPRACH preamble for SPS confirmation, it can be configured to scrambling with SPS-C-RNTI instead of TC-RNTI in MSG3.

Additionally, when there is a feedback channel for TA tracking, when the TA value exceeds a specific range or corresponds to a specific value, or when the base station indicates retransmission more than a specific number of times, or when a timer for TA tracking is configured and the corresponding timer expires, the UE performing the SPS transmission/reception may perform a RACH procedure to regain TA.

Characteristically, it may be configured that the MSG3 of the RACH procedure includes information indicating that it was an operation for TA update by the UE. In addition, the RACH procedure may be terminated by receiving ACK from the base station in the MSG4 step. And, if necessary, the UE may be configured to be indicated by the base station for idle mode SPS reconfiguration/release through MSG4.

Additionally, when triggering the RA in the feedback channel for TA tracking, the base station may designate a dedicated resource to be used for MSG1 or may indicate a UE-ID to be used in MSG3.

In addition, when there is a TA valid window based on the timer for TA tracking, if TA is acquired again using the RACH procedure (e.g., early data transmission (EDT)) before the timer expires, it may be configured by increasing the time of the timer or by resetting the timer. Characteristically, the UE having configured the idle mode SPS may be configured to include information indicating that the operation was for TA update instead of transmitting UL data using the EDT.

Characteristically, the UE configured for SPS transmission/reception in the idle mode may be indicated to perform a RACH procedure for TA tracking. To this end, it may be configured that the base station transmits configuration information (e.g., NPRACH preamble index, CE level, preamble transmission carrier, RAR carrier, RNTI value, EDT timer, etc.) for the RACH procedure together with the SPS configuration. The UE having configured such information may be configured to perform SPS transmission/reception at a configured period and then perform a RACH procedure (e.g., EDT) at a specific period. In addition, it can be configured to perform the RACH procedure at the time when the SPS resource and the NPRACH resource are collided.

Meanwhile, when there is no feedback channel for TA tracking, the base station may indicate an NPDCCH order-based RACH procedure when the TA value exceeds a specific range or corresponds to a specific value.

In this case, in terms of the UL SPS, by configuring the UE to always transmit minimum data (e.g., SRS, etc.) without a UL skipping operation, the base station can be configured to determine the TA. Additionally, even if the UL skipping operation is indicated, it may be configured that skipping is not allowed for TA tracking in a specific period.

Characteristically, NPDCCH order DCI may also be expected in CSS (e.g., Type1-CSS, Type1A-CSS, Type2A-CSS) so that the UE in the idle mode can receive this indication. Additionally, configuration (e.g., MSG1 dedicated resource, UE-ID, RNTI value, etc.) for triggering NPRACH may be included together in the idle mode SPS configuration. In addition, the MSG1 resource may be implicitly mapped according to the specific location of the SPS resource configured by RRC, and although it is NPDCCH order based NPRACH, CBRA may be performed.

Characteristically, during the RACH procedure for the TA update and/or until it is confirmed that the TA is valid, the SPS configuration indicated by the RRC is configured to be invalid, and the it may be configured that the UE does not perform the corresponding transmission/reception operation.

In addition, the UE indicated by the UL idle mode SPS may be configured to transmit a predetermined signal/data to a specific period, a specific duration, and a specific number of SPS resources for TA tracking even when UL SPS skipping is enabled. For example, it may be configured that the N-th transmission of the SPS UL resource always transmits a predetermined specific signal for TA tracking.

Here, the predetermined specific signal may be UL DMRS, NPRACH preamble, etc., and the base station may be configured to indicate UE specific.

Additionally, the terminal may detect the DCI scrambled with the RNTI value defined based on the time and frequency location of the UL SPS resource, and give TA feedback by dividing it by UE ID, etc. in the MAC of the NPDSCH payload scheduled by the corresponding DCI.

In this case, the DCI may be configured to be transmitted together in a search space indicating (re-)activation/deactivation, etc., and the DCI payload size may be configured equally through zero padding to prevent BD increase.

Additionally, it may be configured that the UE monitors/detects the DL channel/signal for TA tracking. For example, it may be configured to monitor a specific DCI of the NPDCCH search space for TA tracking, or to detect signals such as NRS, NPSS, NSSS, and WUS.

Additionally, it may be configured that SPS resources are used to control TA and power for idle mode SPS operation. That is, it may be configured that the UE transmits a TA validity request or a Tx power control request, etc. to the base station through the configured resource, and the base station updates corresponding information through a feedback channel. If configured in this way, there is an advantage that it is not necessary to separately configure a resource for TA update and/or TPC (in the following, both TA and TPC can be interpreted as TA update and/or TPC update).

Additionally, it may be configured to transmit MSG1 for requesting TA update and Tx power control by configuring a resource of a longer period than the period of the configured SPS resource. Characteristically, the resource for transmitting the MSG1 may be part of the configured SPS resource or may be a resource for early data transmission (i.e., EDT).

In addition, the base station may configure a dedicated MSG1 for requesting TA update and Tx power control. In this case, the TA value used when transmitting the MSG1 may be configured to use the latest TA value. Thereafter, the UE that has transmitted MSG1 monitors the RAR, and (1) it may be configured to receive only the TA command information of the RAR and ignore the UL grant for the remaining MSG3 transmission.

Alternatively, if the UE transmits the MSG1 for requesting control of the TA and power as described above, and the base station understands this, it may be configured to transmit the Tx power command to the UL grant position of the RAR.

In addition, the information included in MSG2, which is a response to MSG1 transmission used for the above purpose, may be configured in a different format from MSG2 in the existing random access process or may be interpreted differently.

Alternatively, the terminal may be configured to notify the base station that the MSG2 information has been well received by transmitting data if there is data to be transmitted to the SPS resource based on the received MSG2 information (eg, TA and/or TPC), or even dummy data if there is no data.

Alternatively, the UE receiving the RAR may continuously use (e.g., a timer indicating the period in which the SPS resource is valid is reset) the configured SPS resource after transmitting the MSG3 by receiving the TA command and the MSG3 UL grant and receiving MSG4.

Here, the MSG4 may reconfiguration the SPS resource (for example, a timer reset, which means a duration in which the SPS resource is valid, may be performed at the time of MSG4 reception).

It can be configured to perform a TA validity confirmation algorithm to determine the validity of the TA value currently held by the corresponding UE according to the time point when the UE intends to transmit the preconfigured UL resource to transmit the PUR, the period configured from the base station, or the period specified in the specification, etc.

Here, the TA validity confirmation algorithm may be configured to consist of AND operation of various criteria such as TA validity timer, (N) RSRP detection, and Time Difference of Arrival (TDoA), etc. That is, if all of the criteria included in the corresponding algorithm are positive (or means no problem), it may be determined that the TA value of the corresponding UE is valid. Characteristically, the threshold of each criterion may be configured to be independently configured by the base station. For example, when the TA validity confirmation algorithm includes the TA validity timer and the NRSRP level, and the base station indicates 10 min as the TA validity timer value (the TA validity timer may be configured to start counting when the UE enters the idle mode for the first time after being configured from the base station, or (re)start when a valid TA value is received from the base station through the previous TA update procedure (e.g., RACH, EDT, etc.)) and indicates X dBm as NRSRP level, the UE performing the TA validity confirmation algorithm may determine that the TA value currently held by the UE is valid when the current TA validity timer has not expired and the NRSRP level is greater than or equal to X dBm at that time, and transmit the PUR.

Additionally, since the action of measuring the NRSRP each time the TA validity confirmation algorithm is performed is not beneficial in terms of power saving of the UE, an NRSRP measurement period may be introduced.

That is, the UE may be configured the NRSRP measurement period from the base station, and it may be configured that the UE measures the NRSRP according to the period, and applies the result of comparison with the threshold configured from the base station to the TA validity confirmation algorithm.

Here, since the period in which the TA validity confirmation algorithm is performed and the NRSRP measurement period may be independent of each other, if it is determined that the current NRSRP value of the corresponding UE is less than the threshold value during the NRSRP measurement period, it may be determined that the current TA of the corresponding UE is invalid and configured to attempt TA update.

In this case, when the TA is invalid, the UE may be configured not to transmit a subsequent PUR. Alternatively, if the TA is invalid, the PUR that follows can also be configured to be invalid. Thereafter, when the TA becomes valid through the TA update, the UE may be configured to transmit to a subsequent PUR. In addition, if the TA is valid, the PUR that follows can also be configured to be valid.

The proposed PUR may be independently configured by a base station for each PUR type (e.g., Dedicated PUR, Contention free shared PUR, Contention based shared PUR). In addition, it may be configured that PUR for each type can be defined as cell/CE-level specific.

In addition, the following method can be proposed as a method that can be performed using only 2-step (e.g., MSG1 and MSG2 or NPUSCH and NPDCCH+NPDSCH), not the existing RACH procedure or EDT procedure for TA update.

(Method 1): Method to Update TA Using Only MSG1 and MSG2

Method 1 can be applied to contention free based PUR (e.g., Dedicated PUR, Contention free shared PUR). The base station may configure to UE-specifically allocate a specific NPRACH resource (i.e., carrier index, period, starting offset, resource subcarrier number, repetition number, etc.) and NPRACH preamble for TA update.

In this case, the dedicated NPRACH resource for TA update of the UE using the PUR may be limited so that only the NPRACH resource configured in a specific relationship with the PUR period can be used. In addition, NPRACH preamble transmission for TA update of a UE using PUR may be allowed only in a preconfigured NPRACH resource.

Characteristically, it may be preferable that the NPRACH preamble is a preamble for a contention based random access (CBRA) procedure.

The reason is that the UE transmitting the preamble should be one UE designated by the base station so that base station ambiguity does not occur. Accordingly, the base station can know in advance which UE is transmitting through the preamble index, and when detecting the preamble index, it can be configured to update the TA value to the corresponding UE through RAR.

Characteristically, since the base station knows that the corresponding UE has transmitted the NPRACH preamble for TA update, it can be configured to not transmit the UL grant to the RAR. In addition, for confirmation operation, the base station may configure to transmit the RNTI value configured to be used for PUR to the corresponding UE once more in the RAR. In addition, the RNTI value configured to be used by the base station for PUR may be changed through the corresponding RAR. When configured in this way, the UE does not need to operate the MSG3 or MSG4 procedure, so it can take advantage in terms of battery life.

However, there is a disadvantage in that the number of NPRACH resources that should be configured in advance by the base station increases. In addition, the base station may need to share legacy NPRACH resources that do not additionally allocate NPRACH resources for TA update, and here, NPRACH preamble resources may be insufficient.

(Method 1-1)

Method 1 has a disadvantage in that the overload is large in terms of resource utilization since the base station configures a large number of NPRACH resources to update the TA of the UE for PUR transmission. Therefore, as a solution to this, Method 1-1 is a method of configuring to transmit the NPRACH preamble in the PUR.

A specific example will be described as follows. It can be assumed that the base station configures 12 different UEs to use 3.75 kHz subcarrier spacing single tones from #k to #k+11 for each dedicated PUR transmission.

The period for TA update may be configured with a period that is N times larger than the period of the dedicated PUR configured by the base station, and it may be configured that 12 different UEs transmit different NPRACH preambles configured from the base station in the PUR located in the TA update period to receive the TA update. As another example, it may be assumed that the base station configures three different UEs to use 15 kHz subcarrier spacing single tones from #k to #k+2 for each dedicated PUR transmission.

Similarly, it may be configured that three different UEs transmit different NPRACH preambles configured from the base station in the PUR located in the TA update period to receive the TA update.

When set in this way, since one of the PURs is used as an NPRACH resource for TA update, there is an advantage in that the burden of the NPRACH resource that should be configured in advance by the base station is reduced.

However, in order to do this, there may be a limitation that the time domain size (e.g., repetition number) of the PURs of UEs configured for back-to-back should be the same. In addition, there is a limitation that the corresponding UEs should update the TA in the same period. It is natural that this method can be used not only for dedicated PUR, but also for contention free shared PUR (CFS PUR).

(Method 1-2)

Method 1-2 is a method of transmitting a known sequence in the PUR.

If the TA is updated using the NPRACH preamble, there is an advantage that it is possible to estimate the TA in the same range as the initial access procedure. However, when the TA of the UE performing PUR becomes invalid, it is determined that the TA can be updated with most of the TA tracking. Therefore, it can be configured that TA update is performed by transmitting a known sequence known to each other in the PUR instead of the NPRACH preamble.

In this case, the known sequence may be a QAM type signal, may be a mapping of the DMRS sequence in the order indicated by the base station in advance, or may be a RACH sequence (in the case of eMTC).

If method 1-2 is used, there is an advantage that the base station does not need to additionally allocate/assign the NPRACH resource for the PUR UE. However, there is a disadvantage that the range of the TA that can be estimated is limited to the CP length of the NPUSCH.

Additionally, although the proposed TA update methods may be configured to be performed when the TA of the corresponding UE is invalid, if the TA is expected to be invalid before the next PUR transmission, the UE may be configured to perform TA update in the TA update resource configured before the corresponding PUR. The base station may configure to transmit only the TA command in the form of MAC CE in response to the corresponding information.

Thereafter, the UE may operate to report to the base station that it has updated its TA by the corresponding TA command through the initial PUR transmitted by applying the corresponding TA command. As mentioned above, the algorithm that can expect that the TA of the UE will become invalid before the next PUR transmission may correspond to a case where NACK for PUR transmission is (continuously) received a certain number of times (e.g., X times) (or Y % within a specific duration) or more, or a case where ACK is not received a specific number of times (e.g., X times) (or Y % within a specific duration). In addition, this may correspond to a case where the UE directly determines when the TA validity timer known to the UE expires and expires before the next PUR. In addition, a case in which the base station directly receives an indication from the terminal that the TA of the corresponding UE is invalid through a physical channel such as a feedback channel may be applicable.

Additionally, for a UE configured to use a TA update method without using the NPRACH preamble, TA update may not be easy if the TA is actually changed a lot for any reason. Therefore, in order to compensate for these disadvantages, the UE configured to use the TA update method without using the NPRACH preamble may be configured to perform the TA update method using the NPRACH preamble if the TA cannot be updated within a specific threshold (e.g., timing window, number of attempts, etc.). As an example, if a UE performing TA update through a method of transmitting a known signal in the PUR does not receive the TA update during N attempts to update the TA, it may be configured that the base station performs TA update using a preconfigured dedicated NPRACH preamble for TA update. Since the TA update through PUR is attempted and the update receives actually, if this method is used, there is an advantage that the NPRACH preamble for TA update can be configured with a larger period compared to the methods using the NPRACH preamble among the previously proposed methods.

Either way, if the UE has updated a valid TA through TA update, the TA validation timer may be configured to restart.

In addition, when one or more criterions for determining TA validity for PUR transmission are configured, the UE does not transmit UL data, and it is configured that PUR transmission may be skipped, it is necessary to configure when the UE should perform TA validity criterion.

If it is configured that TA validity criterion should be performed and determined before each PUR, the UE tried to skip because there is no UL data to be sent in the corresponding PUR, but it should determine whether the current TA is valid according to the TA validity criterion.

This has a disadvantage in terms of the battery life of the UE, because even a UE that does not transmit in PUR should always test TA validity (e.g., serving cell NRSRP measurements, etc.) by consuming UE power. Therefore, as a time point when the UE performs TA validity criterion, in the case that there is UL data to be transmitted in a specific PUR by the corresponding UE, it may be configured to perform in a specific subframe (i.e., time) before the corresponding PUR transmission start subframe. That is, when there is no UL data to be transmitted, the UE does not have to waste unnecessary power for the TA validity test, which can be an advantage. Alternatively, if there is no UL data to be transmitted by the UE in the corresponding PUR, it may be configured that the UE does not perform (or does not have to) the operations that the UE needs to use power (e.g., serving cell NRSRP measurements, etc.) during TA validity criterion.

In this case, the TA alignment timer, etc., performs a validity test before every PUR position, and an operation such as NRSRP measurements performs a validity test only when there is UL data to be transmitted.

Also, this can be an advantage because when there is no UL data to be transmitted by the UE, unnecessary power is not wasted for TA validity test. Explaining the proposed method in a more different aspect, if the UE does not transmit UL data in the PUR, a timer for performing TA validity criterion (or a timer for performing operations that the UE needs to use power among TA validity criterion) may be configured to hold. It may be configured that the UE holds the timer, and then determines TA validity by restarting the timer to perform the TA validity criterion when there is any transmission of UL data in the subsequent PUR.

In addition, it may be configured to implicitly indicate to the UE the size of the cell through the (N)PRACH preamble format configured in the cell. The UE may use this information to determine the size of the corresponding cell, and if the cell size is small, the TA validity test may be rarely performed, that is, the test period may be configured to be longer than when it is not determined that the cell size is small (e.g., normal cell size). For example, if the base station indicates the (N)PRACH preamble format in which the CP length is configured to be short, such as FDD NPRACH preamble format 0, or TDD NPRACH preamble format 0-a, (or eMTC PRACH preamble format 4), the terminal may determine that the size of the cell is small. In addition, it may be configured to perform a sparse test by a specific multiple of the TA validity test period indicated by the base station or by a specific multiple of the TA validity test period defined in the spec. In this case, the specific multiple may be indicated by the base station or may be defined in spec.

In the case of applying the method, since the UE can maintain the same level of TA validity even if it tests only a smaller number of times than the general number of TA validity tests, it has an advantage in terms of power saving of the UE.

In addition, transmission power of the UE may be added to the TA validity criteria. That is, if the UL TX power value of the UE is not greater than a specific threshold configured by the base station, the UE may be configured that it cannot transmit to the corresponding PUR. This method can be used as an indirect indicator of whether the current PUR can be used because the available UL TX max power value may be configured as the downlink CE level of the UE changes.

In the case that the UE attempting to transmit in a specific PUR determines that the TA alignment timer has expired through the TA validity test (or determines that it will be soon), and the UE performs an operation for TA update, but does not receive a TA update command from the base station, it is necessary to define the UE operation.

Most basically, when the UE does not receive a TA update command from the base station during a time duration in which the TA update command can be received, the UE may think that the current TA update is not required. Although this operation has the advantage of being simple, it may not be an appropriate operation considering a case where the base station transmits the TA update command but the UE does not receive it.

Alternatively, if the UE does not receive the TA update command from the base station for a time duration in which the TA update command can be received, it may be configured that the UE continuously determines that the current TA is invalid. After that, it may be desirable for the UE to perform operations such as legacy RACH/EDT again.

Alternatively, when the UE does not receive the TA update command from the base station for a time duration in which the TA update command can be received, the UE may determine that the currently owned PUR configuration is invalid (i.e., has been released). In this case, the operation that the UE thinks to release the PUR (the base station must also be aware of that) may be a desirable operation from the viewpoint of resource utilization of the base station. In addition, since the actual TA may have changed a lot, it may be desirable to operate conservatively until explicit information is received from the base station.

(Mechanism to Facilitate Base Station BD)

If skipping (i.e., not transmitting when there is no data to be transmitted) is allowed in the resource configured with the idle mode UL SPS, the base station must BD the corresponding resource regardless of whether the UE transmits data. This can be a burden for the base station. And, even if no UE is transmitted to the resource, the resource cannot be used for other purposes (e.g., NPUSCH, NPRACH, etc.). Therefore, it is possible to introduce a method of notifying the base station about whether the UE transmits to the SPS resource.

As the first method, it can notify the base station that data is transmitted to the corresponding SPS resource by transmitting a pre-promised signal/channel at a location configured from the base station before the SPS resource or a pre-promised number of SFs or slots or symbols away from the SPS resource. Characteristically, the corresponding signal/channel can be configured to be cell specific.

This is, if even one UE transmits data to a corresponding resource, since the base station should perform BD for the corresponding resource, it may be configured to be common within the same cell. On the other hand, since it should be distinguished from a signal/channel used in an adjacent cell, a cell ID, frame index, etc. may be required to design a corresponding signal/channel.

If the idle mode SPS resource is independently configured for each CE level, the corresponding signal/channel may be configured differently for each CE level even in the same cell. If only one signal/channel is used in the same cell, the base station needs to properly configure the idle mode SPS resource so that the positions transmitting the corresponding signal/channel for each CE level do not overlap.

That is, if it is an important factor whether or not any terminal transmits actually in the SPS resource, the base station may configure not a different signal/channel for each UE, but all or some UEs using the resource to use the same signal/channel.

As a second method, it can be configured that the UE notifies the base station of whether to transmit data in the idle mode SPS resource every specific period. At this time, the specific period may be a period in which the UE wakes up to monitor/receive a paging or wake up signal, or may be a period such as DRX or eDRX.

Characteristically, the period may be greater than or equal to the period of the idle mode SPS resource. In this case, the UE using this method has the advantage of being able to inform the base station of whether to transmit one or more SPS resources through one notification.

Characteristically, one notification may be transmitted in the form of a bitmap of each UE specific, or may be a cell specific signal/channel as mentioned above.

In addition, it can be configured to inform the base station whether to transmit data in the idle mode SPS resource by transmitting UCI information of the UE. Here, the UCI information may include HARQ process ID, initial transmission/retransmission, TBS, and the like, and this may be included in MSG1/MSG3 or DMRS.

In the case of introducing such a method, since the base station does not need to BD in a region that the UE does not transmit, it is effective in power saving of the base station. In addition, there is an advantage in efficient resource management because the resource can be used for other purposes without emptying it.

Similar to the proposed methods, but in order to perform a slightly different function, a method of informing the base station that the UE does not transmit in the SPS resource (i.e., PUR) may be considered. That is, if the UE informs the base station that the UL data is not transmitted to the base station using the proposed methods, the base station has the advantage that the base station can detect the corresponding signal and use the PUR for other UEs.

Characteristically, this method has an advantage in the case of a dedicated PUR. That is, when a specific PUR is allocated to a single UE and it is notified that the PUR is not used, the base station can reallocate and use the PUR resource to another UE.

In addition, the proposed signals may be transmitted previously by a specific location away from the PUR resource, as in the proposed methods, but may be transmitted to the earliest part of the corresponding PUR resource. For example, when the PUR resource allocated by the base station is K subframe, N subframes among them are used to inform the PUR that UL data is transmitted or not. If it is notified that UL data is to be transmitted, it may be configured to transmit UL data to the K-N subframe.

(SPS Search Space Configuration)

When a search space for idle mode SPS is newly introduced or an existing search space configuration is reused, a carrier for monitoring the search space for idle mode SPS may be configured to be indicated by RRC.

If a search space is newly introduced for the idle mode SPS, if the base station does not explicitly indicate the carrier, it may be configured to monitor the search space in the anchor DL carrier. On the other hand, in the case of reusing the existing search space configuration, if the base station does not indicate the carrier to monitor the search space for the idle mode SPS, it can be configured to monitor the search space in the same place as the carrier corresponding to the existing search space.

For example, when the legacy USS is reused as a search space for the idle mode SPS, the base station may explicitly indicate the carrier for the idle mode SPS, but when the base station does not explicitly indicate the corresponding carrier information, it may be configured to think that the NPDCCH for idle mode SPS is transmitted in the same carrier as the carrier that the legacy USS was monitored, and monitor the corresponding search space.

(HARQ Process)

The maximum number of HARQ processes available for the idle mode SPS may be configured to be determined based on the HARQ capability of each UE. For example, in the case of NB-IoT, the maximum number of HARQ processes available for idle mode SPS for a single HARQ capable UE is 1, and the maximum number of HARQ processes available for idle mode SPS for two HARQ capable UE is 2.

For a UE capable of 8 HARQ or 16 HARQ like eMTC, the maximum number of HARQ processes available for idle mode SPS is 8 or 16.

Meanwhile, the actual number of HARQ processes to be used for the idle mode SPS may be configured to be indicated through RRC configuration by the base station. If the actual number of HARQ processes to be used for the idle mode SPS indicated by the base station is greater than the number of HARQ processes that the corresponding UE can have, the UE considers that the RRC configuration is invalid and discards the related configuration.

(Early Termination)

When (re-)activation/deactivation/retransmission is indicated through the DCI of the search space for the idle mode SPS or the payload of the paging NPDSCH, early termination may be additionally indicated from the base station. That is, when the base station determines that there is no need for further reception after indicating the UL resource and repetition number in a semi-static manner, it may be configured to indicate early termination.

As a specific method, if the (re-)activation/deactivation message is received while the NPUSCH is being transmitted according to the SPS configuration, it may be configured to stop the UL NPUSCH that has been repeatedly transmitted.

Alternatively, it may be configured that validation for early termination is newly defined and explicitly indicated by the base station. Alternatively, the base station may explicitly indicate early termination by adding a 1-bit field to the UL grant field.

(Actions Directed Using Paging or WUS)

Among the proposed methods, the following methods may be introduced for an operation in which the base station indicates (re-)activation or deactivation or retransmission or release by using paging NPDCCH/NPDSCH or wake up signal (WUS).

First, a method of additionally configuring WUS for indicating SPS (re-)activation or deactivation or retransmission or release to the SPS configuration may be considered. That is, the first method is a method in which a WUS resource for an SPS-related indication purpose and a WUS resource for a paging indication purpose are separately configured in the case of a UE supporting the SPS operation. Here, it can be configured to indicate retransmission, (re-)activation, deactivation, release, etc. for each different WUS for SPS-related indication purposes. Characteristically, the WUS should be configured differently from the WUS for paging purposes so that it can be distinguished from legacy WUS operation.

In this case, there are disadvantages in that the base station overhead increases and the amount of time that the UE wakes up to receive the WUS for SPS-related indication purposes increases.

Second, a method of using some WUS resources classified by grouping in WUS for paging purposes for SPS-related indication purposes may be considered. This method has the advantage that it does not require a separate resource allocation for the WUS for the purpose of SPS indication, but it has the disadvantage that the capacity for grouping of WUSs for the paging purpose is reduced, and that collision may occur.

Third, it can be configured to independently configure a new paging occasion for UEs configured for SPS operation using SIB or RRC signaling. In this way, the new paging occasion can be configured to wake up faster than the DRX (or eDRX) cycle of the legacy paging occasion. Here, this shortened period may be configured to depend on the time during which the TA between the UE and the base station performing the SPS operation can be maintained. When a new paging occasion is introduced, a location at which WUS is transmitted may also be naturally configured according to the corresponding PO.

(UE Initiate Release Process)

There are several methods mentioned above for how the base station indicates release in the situation where the TA is aligned, but when the UE in the RRC idle state reaches a situation where the TA cannot be matched for any reason, a situation in which self-release is required may occur.

In addition to the above-mentioned method of performing TA tracking through the RACH procedure, if the UE fails to track TA within a specific number of times or a specific timer, the UE may be configured to self-release IM-SPS.

Alternatively, the base station can be configured to periodically transmit an IM-SPS (re-)confirm message through a DL channel/signal, etc., and if the UE does not receive the corresponding (re-)confirm message within a specific number of times or a specific timer, the UE may be configured to self-release IM-SPS.

The specific number of times, timer, etc. of the above methods may be indicated by the base station when receiving SPS configuration through RRC signaling, or may be configured to be defined as a specific value in spec.

As another concept, a method in which the UE informs the base station of IM-SPS release/reconfiguration may be considered. In addition to the above-mentioned method of performing TA tracking through the RACH procedure, It can be configured to report to the base station through MSG3 that this RACH procedure is for requesting release/reconfiguration of IM-SPS, not to the base station through MSG3 that this procedure is for TA tracking.

The base station can be configured to confirm the IM-SPS release/reconfiguration request through MSG4. Alternatively, the UE may return to the connected mode through the RRC resume request and request SR/BSR, and perform the IM-SPS release/reconfiguration request using the UL NPUSCH. In response, the base station may confirm the request, and the UE may be configured to act according to the indication of the base station.

In addition, when there is no data to be transmitted by the UE or skipping is performed continuously or discontinuously for a specific reason N times (here, N is a natural number greater than or equal to 1), It may be configured to automatically release the corresponding SPS resource or to transmit information notifying the release to the base station in the subsequent SPS resource after skipping N times.

In this way, there is an advantage because the UE can release itself without receiving release information from the base station.

In addition, although the UE allows skipping for data transmission when there is no data to be transmitted, if the UE needs confirmation of the (re-)configuration and release transmitted by the base station, it may be configured that the skipping is not allowed. When the skipping exception period is configured as described above, there is an advantage that the base station can receive confirmation of the terminal for (re-)configuration and release transmitted by the base station.

In addition, it may be configured that the UE expects that the base station will not transmit a retransmission request for the confirmation transmitted by the UE. The reason why the expectation can be configured is that the confirmation information transmitted by the UE is not actual UL data, so it may be configured that retransmission of the corresponding information is unnecessary in the opinion of the UE.

Thereafter, if the base station requests retransmission for the corresponding information, the UE may determine that this is invalid.

In the PUR into which HARQ is introduced, DCI indicating retransmission may be introduced. The base station may configure to explicitly release the PUR operating in the idle mode through the NPDCCH indicating the retransmission.

For example, it may be configured to indicate PUR release by using a specific 1-bit field of the retransmission DCI. Alternatively, a specific field value of the DCI format may be configured to a predetermined value in advance to convey that the release indication is valid. Alternatively, it may be configured that a DL grant other than a retransmission UL grant may come through the NPDCCH indicating the retransmission. In addition, it may be configured to explicitly indicate PUR release through the NPDSCH scheduled by the corresponding DL grant.

Additionally, when a UE that has not received an explicit release for a PUR from a base station enters the connected mode, the UE may be configured to determine that the existing PUR configuration has been released. In order for the base station to reuse the corresponding PUR configuration value, it may be configured to explicitly indicate the UE entering the connected mode to use the legacy PUR configuration.

Second Embodiment: Connected Mode Operation

Among the methods proposed in the first embodiment, methods that can be used even in a connected mode can be basically applied. Meanwhile, the existing connected mode SPS is applied to LTE/eMTC, etc., and SPS for BSR is introduced in NB-IoT. If an SPS for unicast use is introduced in NB-IoT, the following details may be considered.

(Dynamic Grant-Based Deactivation)

Since the connected mode UE is always monitoring the USS, (re-)activation/deactivation/retransmission, etc. may be indicated from the base station using a search space such as dynamic grant.

Here, the base station may be configured to indicate dynamic grant-based deactivation, and this dynamic grant-based deactivation may be divided into whether or not deactivation is indicated according to an NPDSCH/NPUSCH transmission/reception timing according to the dynamic grant and an NPDSCH/NPUSCH transmission/reception timing according to the SPS grant.

If the NPDSCH/NPUSCH transmission/reception timing according to the dynamic grant overlaps at least part of the NPDSCH/NPUSCH transmission/reception timing according to the SPS grant, the UE may determine that SPS deactivation is indicated. And, if the NPDSCH/NPUSCH transmission/reception timing according to the dynamic grant does not overlap at all with the NPDSCH/NPUSCH transmission/reception timing according to the SPS grant and both can transmit/receive, the UE may determine that SPS deactivation is not indicated.

(HARQ Process)

In a state in which the 2 HARQ capable UE is indicated to perform 2 HARQ, when using one HARQ process for SPS, the UE may be configured to expect only a single HARQ when monitoring the USS that exists during a specific period (e.g., PDCCH Period) from the resource indicated to transmit/receive with the configured grant after UE is SPS (re-)activation.

Third Embodiment

The third embodiment relates to a shared resource for a configured resource.

Figure 23:
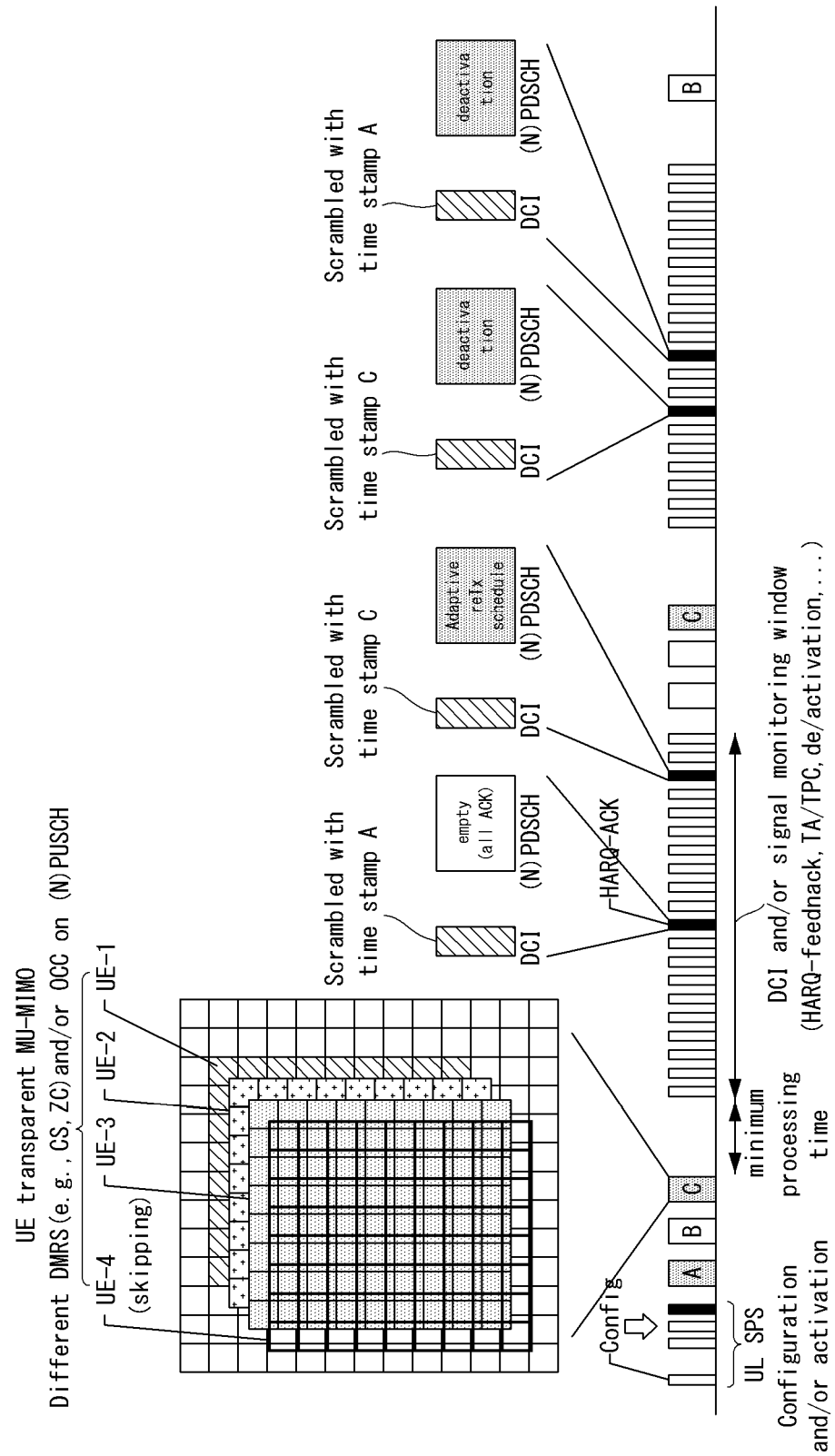
FIG. 23 is a diagram illustrating an example of a shared resource for a configured resource proposed in the present disclosure.

FIG. 23 is a diagram illustrating an example of a shared resource for a configured resource proposed in the present disclosure.

MU-MIMO may be considered as a method in which a plurality of UEs share a resource for a resource configured in an idle mode and/or a connected mode. An example of a situation in which MU-MIMO is considered may be shown as shown in FIG. 23.

The base station may configure UL SPS information to each UE through SIB or RRC signaling. The configuration may include SPS share resource, DMRS for each UE and/or PUSCH OCC for each UE, (re-)activation/deactivation/retransmission channel/signal configuration (e.g., period, offset, etc.).

Subsequently, the activated UEs may be configured to transmit NPUSCH in the share resource according to their configuration. Here, UL skipping may be configured to be allowed, and each UE may be configured to receive an indication of how many UEs share the corresponding shared resource.

Thereafter, all UEs configured with each shared resource may be configured to monitor/detection the region in which the (re-)activation/deactivation/retransmission channel/signal can be transmitted. Characteristically, in the case of using a shared resource as described above, it may be configured that operations such as (re-)activation/deactivation/retransmission proceed in the form of a UE group.

In this case, when DCI plays a role of indicating (re-)activation/deactivation/retransmission, the search space in which the DCI can be transmitted may be configured similarly to the RAR search space. That is, depending on which shared resource is transmitted, the DCI may have been scrambling with different RNTI values, and the terminal can be configured to know the corresponding RNTI value according to information such as time/frequency of shared resource transmitted by itself.

In addition, the search space in which the corresponding DCI can be transmitted may be configured to be the same as the search space in which the DCI indicating (re-)activation/deactivation can come. In this case, the RNTI value may be determined in advance according to the time/frequency value of the shared resource as described above. Additionally, the DCI payload size may be configured to be the same by performing zero padding on the shorter side to prevent BD increase. A specific field of the DCI may be configured to indicate ACK/NACK in the form of a bitmap. In addition, the position/order of each bit constituting the bitmap may be configured to be implicitly mapped by the DMRS sequence or OCC.

In addition, the DL assignment field of the DCI may schedule the NPDSCH for adaptive retransmission. A specific field of the corresponding DCI may be configured to indicate whether there is adaptive retransmission scheduling information for NACK among ACK/NACK previously indicated in the form of a bitmap. Here, the UE that detected the ACK is detected does not need to receive the subsequent NPDSCH.

On the other hand, when the UE that detected the NACK is indicated that non-adaptive retransmission information is not existed in the NPDSCH in the aforementioned specific field, the UE does not need to receive the subsequent NPDSCH, and performs non-adaptive retransmission on the next UL SPS resource.

If the UE that detected the NACK is indicated that non-adaptive retransmission information is in the NPDSCH in the aforementioned specific field, it is necessary to receive the subsequent NPDSCH. In addition, the UE may be configured to read the UL grant of the payload (e.g., MAC message, etc.) of the corresponding NPDSCH and perform dynamic UL retransmission or adaptive retransmission to the next UL SPS resource accordingly.

Unlike previously described, if there is no DCI indicating (re-)activation/deactivation and (re-)activation/deactivation, etc. can be indicated in the NPDSCH scheduled by the corresponding DCI, the specific field of the DCI may be configured to indicate whether (re-)activation/deactivation, etc. is included in the subsequent NPDSCH.

In this case, a UE that has not been activated or has not transmitted a share NPUSCH due to an operation such as UL skipping may also attempt to detect the DCI. In addition, the RNTI value for this may be configured to be transmitted through SIB or RRC signaling. If the UE is indicated that (re-)activation/deactivation information is included in a specific field of the DCI detected by the UE, the UE needs to receive the NPDSCH and may be configured to operate according to the (re-)activation/deactivation indication. Additionally, the base station configures a shared resource to a plurality of UEs through RRC signaling or system information, and it may be configured to select a resource suitable for each UE by applying a UE ID or a UE specific value to a predetermined formula.

Alternatively, as a method applicable to a system that uses the same UL/DL carrier such as TDD, the base station independently configures the UL SPS transmission resource of each UE through RRC signaling. And, Each UE may sense the UL resource from a position prior to the start SF of its configured resource by K SF (e.g., K=4), determine whether the UL resource of another UE is transmitted based on energy detection, and determine whether the preconfigured grant is valid or not.

Although the third embodiment describes UL as a target, the same can be applied to DL.

Figure 24:
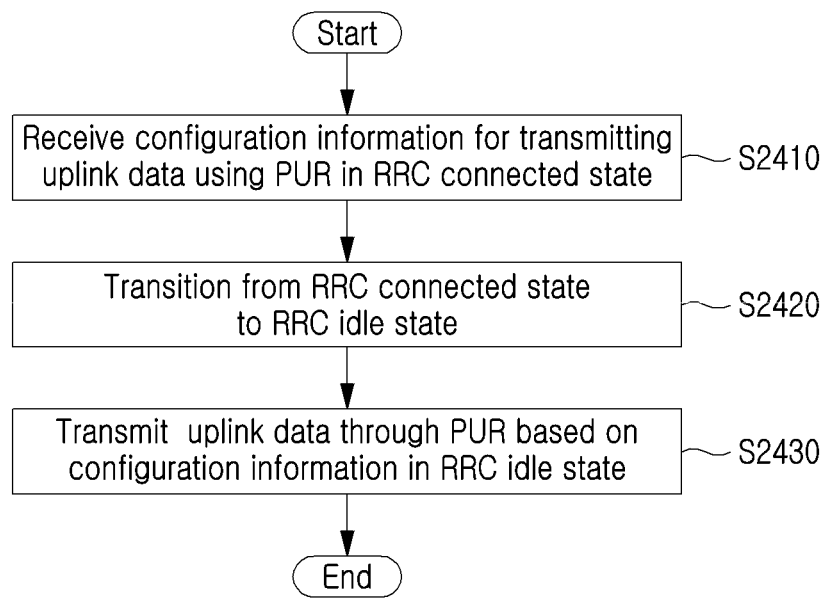
FIG. 24 is a flowchart illustrating an operation method of a terminal for transmitting uplink data using PUR proposed in the present disclosure.

FIG. 24 is a flowchart illustrating an operation method of a terminal for transmitting uplink data using PUR proposed in the present disclosure.

That is, FIG. 24 shows a method for transmitting uplink data using a preconfigured uplink resource (PUR) in a wireless communication system.

First, in the RRC connected state, the terminal receives configuration information for transmitting the uplink data using the PUR in the RRC idle state from the base station (S2410).

The configuration information may include information on a transmission interval of the uplink data and information on the number of repetitions of transmission of the uplink data.

Then, the terminal transitions from the RRC connected state to the RRC idle state (S2420).

In addition, in the RRC idle state, the terminal transmits the uplink data to the base station using the PUR based on the configuration information (S2430).

Additionally, the terminal may determine the validity of a configured timing advance (TA).

More specifically, the terminal determines the validity of the TA based on the TA validity timer, Reference Signal Received Power (RSRP) detection information, and time difference of arrival (TDoA) information.

More specifically, the validity of the TA may be determined by the AND operation of the TA validity timer, the RSRP detection information and the TDoA.

That is, when the TA validity timer, the RSRP detection information and the TDoA are all positive, the TA may be determined to be valid.

As a result of determining the validity of the TA, if the TA is not valid, the terminal performs a random access procedure for updating the TA.

In addition, the terminal may receive downlink control information (DCI) including resource information related to retransmission of the uplink data from the base station.

In this case, the DCI may be received in a new search space that is distinguished from a legacy search space.

The configuration information related to the new search space may be included in the configuration information in step S1410.

Figure 25:
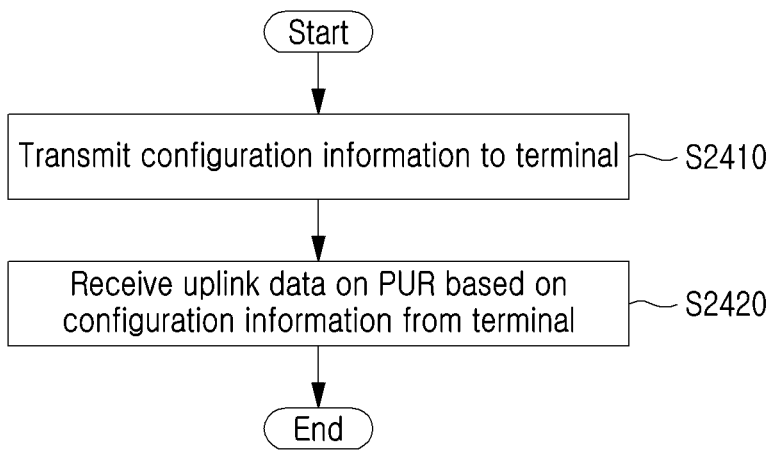
FIG. 25 is a flowchart illustrating an operation method of a base station for receiving uplink data using PUR proposed in the present disclosure.

FIG. 25 is a flowchart illustrating an operation method of a base station for receiving uplink data using PUR proposed in the present disclosure.

That is, FIG. 25 shows an operation method of a base station for receiving uplink data from a terminal using a preconfigured uplink resource (PUR) in a wireless communication system.

First, the base station transmits configuration information for the terminal to transmit uplink data using PUR in the RRC idle state to the terminal (S2510). Here, the terminal may be in an RRC connected state.

The configuration information may include information on a transmission interval of the uplink data and information on the number of repetitions of transmission of the uplink data.

And, the base station receives the uplink data from the terminal on the PUR based on the configuration information (S2520). Here, the terminal may be in an RRC idle state.

Additionally, the base station may transmit downlink control information (DCI) including resource information related to retransmission of the uplink data to the terminal.

In this case, the DCI may be transmitted in a new search space that is distinct from a legacy search space.

The configuration information related to the new search space may be included in the configuration information in step S1610.

General Apparatus to which the Present Disclosure May be Applied

Figure 26:
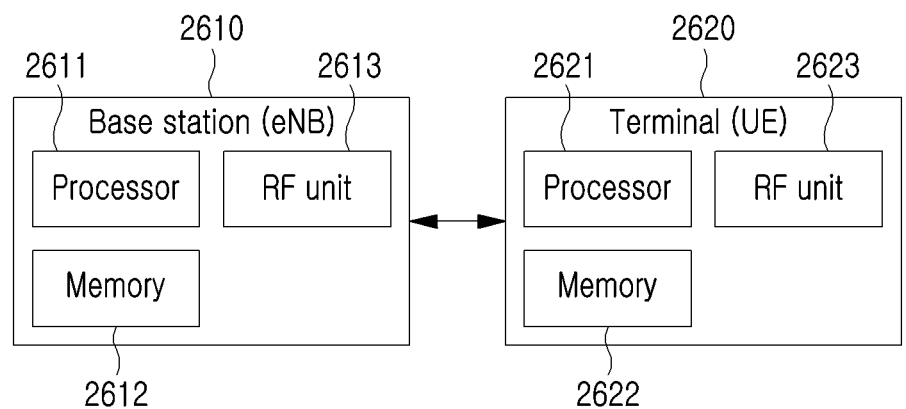
FIG. 26 illustrates a block diagram of a radio communication device to which methods suggested in the present disclosure may be applied.

FIG. 26 illustrates a block diagram of a radio communication device to which methods suggested in the present disclosure may be applied.

In reference to FIG. 26, a radio communication system includes a base station 2610 and a plurality of terminals 2620 positioned in a region of a base station.

The base station and terminal may be represented as a radio device, respectively.

A base station 2610 includes a processor 2611, a memory 2612 and a radio frequency (RF) module 2613. A processor 2611 implements a function, a process and/or a method previously suggested in FIG. 1 to FIG. 25. Radio interface protocol layers may be implemented by a processor. A memory is connected to a processor to store a variety of information for operating a processor. A RF module is connected to a processor to transmit and/or receive a radio signal.

A terminal includes a processor 2621, a memory 2622 and a RF module 2623.

A processor implements a function, a process and/or a method previously suggested in FIG. 1 to FIG. 25. Radio interface protocol layers may be implemented by a processor. A memory is connected to a processor to store a variety of information for operating a processor. A RF module is connected to a processor to transmit and/or receive a radio signal.

Memories 2612 and 2622 may be inside or outside processors 2611 and 2621 and may be connected to a processor in a well-known various means.

In addition, a base station and/or a terminal may have one single antenna or multiple antenna.

Antennas 2614 and 2624 function to transmit and receive radio signals.

Figure 27:
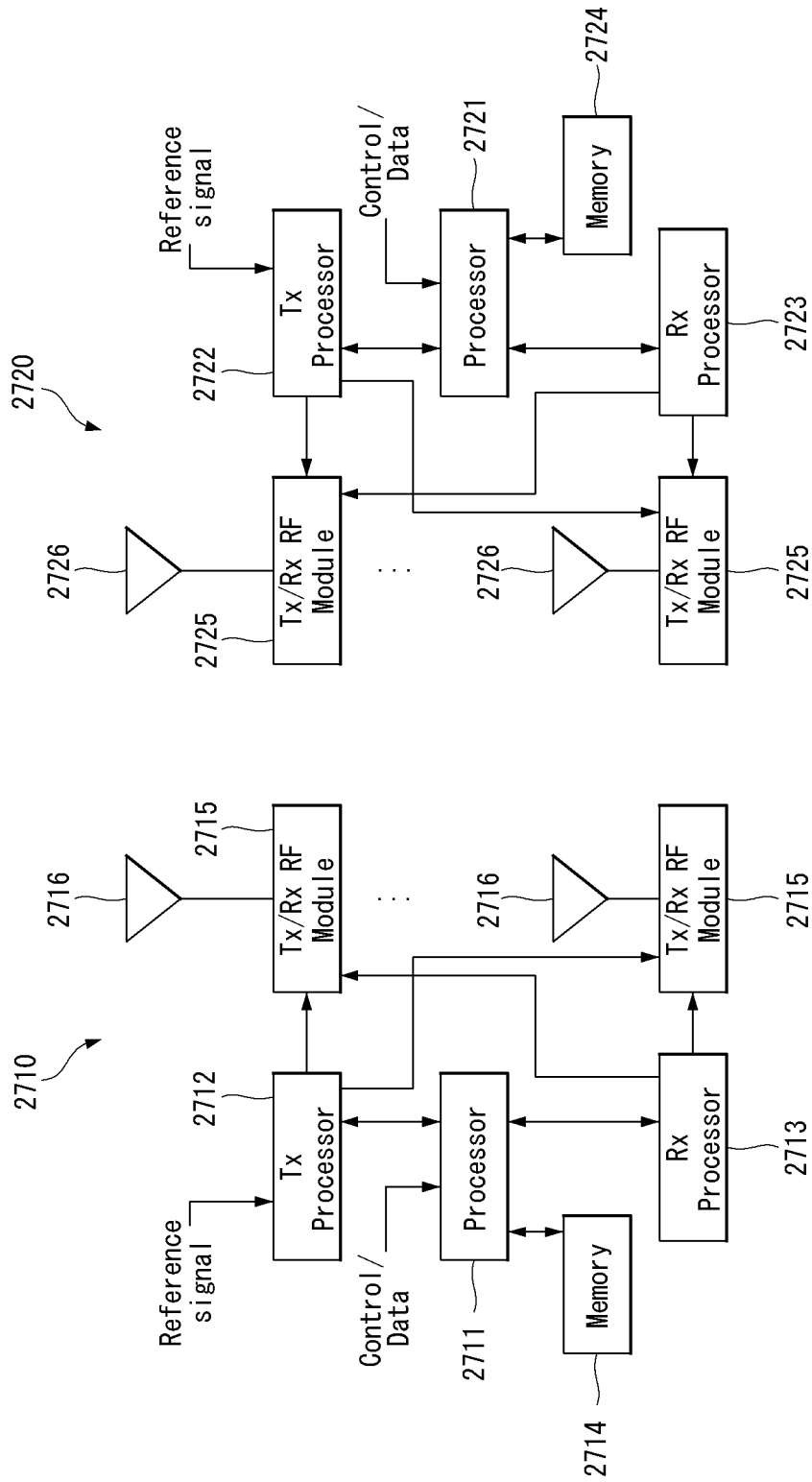
FIG. 27 is another example of a block diagram of a radio communication device to which methods suggested in the present disclosure may be applied.

FIG. 27 is another example of a block diagram of a radio communication device to which methods suggested in the present disclosure may be applied.

In reference to FIG. 27, a radio communication system includes a base station 2710 and a plurality of terminals 2720 positioned in a region of a base station. A base station may be represented as a transmission device and a terminal may be represented as a reception device, and vice versa. A base station and a terminal include processors 2711 and 2721, memories 2714 and 2724, one or more Tx/Rx radio frequency (RF) modules 2715 and 2725, Tx processors 2712 and 2722, Rx processors 2713 and 2723 and antennas 2716 and 2726. A processor implements the above-described function, process and/or method. In more detail, an upper layer packet from a core network is provided for a processor 2711 in a DL (a communication from a base station to a terminal). A processor implements a function of a L2 layer. In a DL, a processor provides radio resource allocation and multiplexing between a logical channel and a transmission channel for a terminal 2720 and takes charge of signaling to a terminal. A transmission (TX) processor 2712 implements a variety of signal processing functions for a L1 layer (e.g., a physical layer). A signal processing function facilitates a forward error correction (FEC) in a terminal and includes coding and interleaving. An encoded and modulated symbol is partitioned into parallel streams, and each stream is mapped to an OFDM subcarrier, is multiplexed with a reference signal (RS) in a time and/or frequency domain and is combined together by using Inverse Fast Fourier Transform (IFFT) to generate a physical channel which transmits a time domain OFDMA symbol stream. An OFDM stream is spatially precoded to generate a multiple spatial stream. Each spatial stream may be provided for a different antenna 2716 in each Tx/Rx module (or a transmitter-receiver 2715). Each Tx/Rx module may modulate a RF carrier in each spatial stream for transmission. In a terminal, each Tx/Rx module (or a transmitter-receiver 2725) receives a signal through each antenna 2726 of each Tx/Rx module. Each Tx/Rx module reconstructs information modulated by a RF carrier to provide it for a reception (RX) processor 2723. A RX processor implements a variety of signal processing functions of a layer 1. A RX processor may perform a spatial processing for information to reconstruct an arbitrary spatial stream heading for a terminal. When a plurality of spatial streams head for a terminal, they may be combined into a single OFDMA symbol stream by a plurality of RX processors. A RX processor transforms an OFDMA symbol stream from a time domain to a frequency domain by using Fast Fourier Transform (FFT). A frequency domain signal includes an individual OFDMA symbol stream for each subcarrier of an OFDM signal. Symbols and a reference signal in each subcarrier are reconstructed and demodulated by determining the most probable signal arrangement points transmitted by a base station. Such soft decisions may be based on channel estimated values. Soft decisions are decoded and deinterleaved to reconstruct data and a control signal transmitted by a base station in a physical channel. The corresponding data and control signal are provided for a processor 2721.

An UL (a communication from a terminal to a base station) is processed in a base station 2710 by a method similar to that described in a terminal 2720 in relation to a function of a receiver. Each Tx/Rx module 2725 receives a signal through each antenna 2726. Each Tx/Rx module provides a RF carrier and information for a RX processor 2723. A processor 2721 may be related to a memory 2724 which stores a program code and data. A memory may be referred to as a computer readable medium.

Examples of Mobile Devices to which the Present Disclosure is Applied

Figure 28:
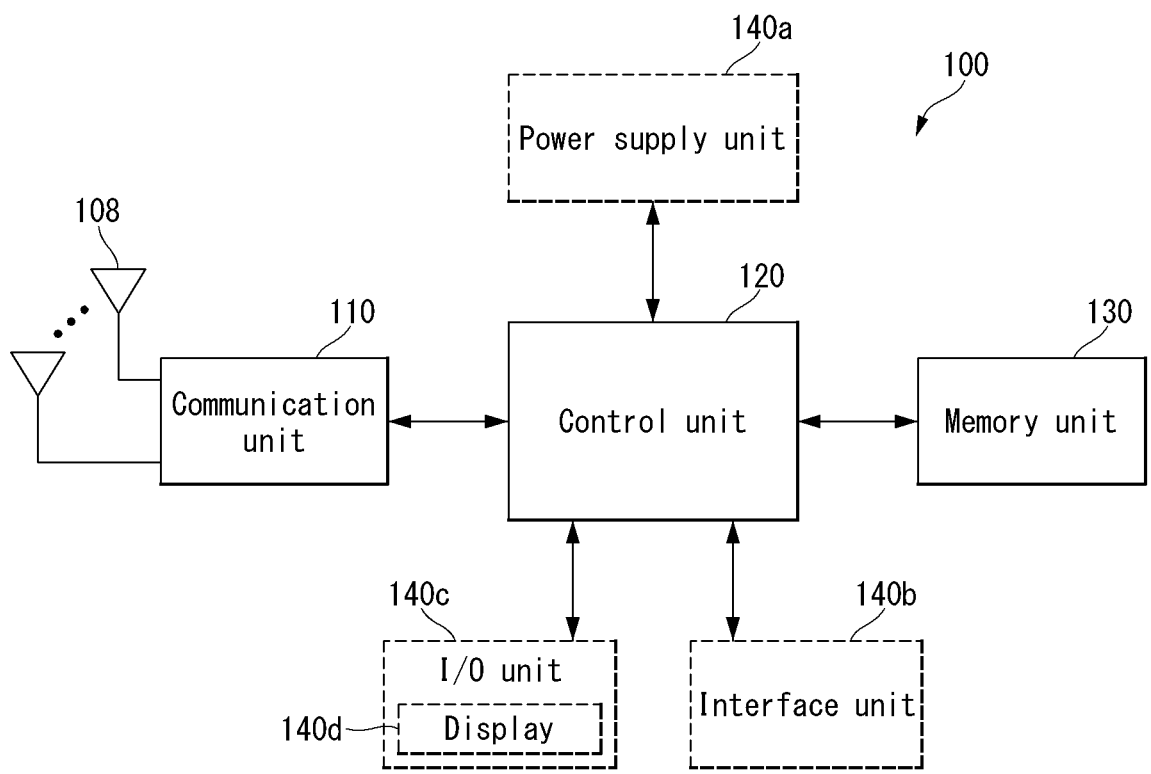
FIG. 28 illustrates an example of a portable device to which the present disclosure is applied.

FIG. 28 illustrates an example of a portable device to which the present disclosure is applied. The portable device may include a smart phone, a smart pad, a wearable device (e.g., a smart watch, a smart glass), and a portable computer (e.g., a notebook computer, etc.). The portable device may be referred to as a mobile station (MS), a user terminal (UT), a mobile subscriber station (MSS), a subscriber station (SS), an advanced mobile station (AMS), or a wireless terminal (WT).

Referring to FIG. 28, the portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110.

The communication unit 110 may transmit and receive signals (e.g., data, control signals, etc.) with other wireless devices and base stations. The control unit 120 may perform various operations by controlling components of the portable device 100. The control unit 120 may include an application processor (AP). The memory unit 130 may store data/parameters/programs/codes/commands required for driving the portable device 100. Also, the memory unit 130 may store input/output data/information, and the like. The power supply unit 140a supplies power to the portable device 100 and may include a wired/wireless charging circuit, a battery, and the like. The interface unit 140b may support connection between the portable device 100 and other external devices. The interface unit 140b may include various ports (e.g., audio input/output ports, video input/output ports) for connection with external devices. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c may acquire information/signals (e.g., touch, text, voice, image, video) input from the user, and the obtained information/signals may be stored in the memory unit 130. The communication unit 110 may convert the information/signal stored in the memory into a radio signal, and may directly transmit the converted radio signal to another wireless device or to a base station. In addition, after receiving a radio signal from another radio device or a base station, the communication unit 110 may restore the received radio signal to the original information/signal. After the restored information/signal is stored in the memory unit 130, it may be output in various forms (e.g., text, voice, image, video, heptic) through the input/output unit 140c.

Robot Example to which the Present Disclosure is Applied

Figure 29:
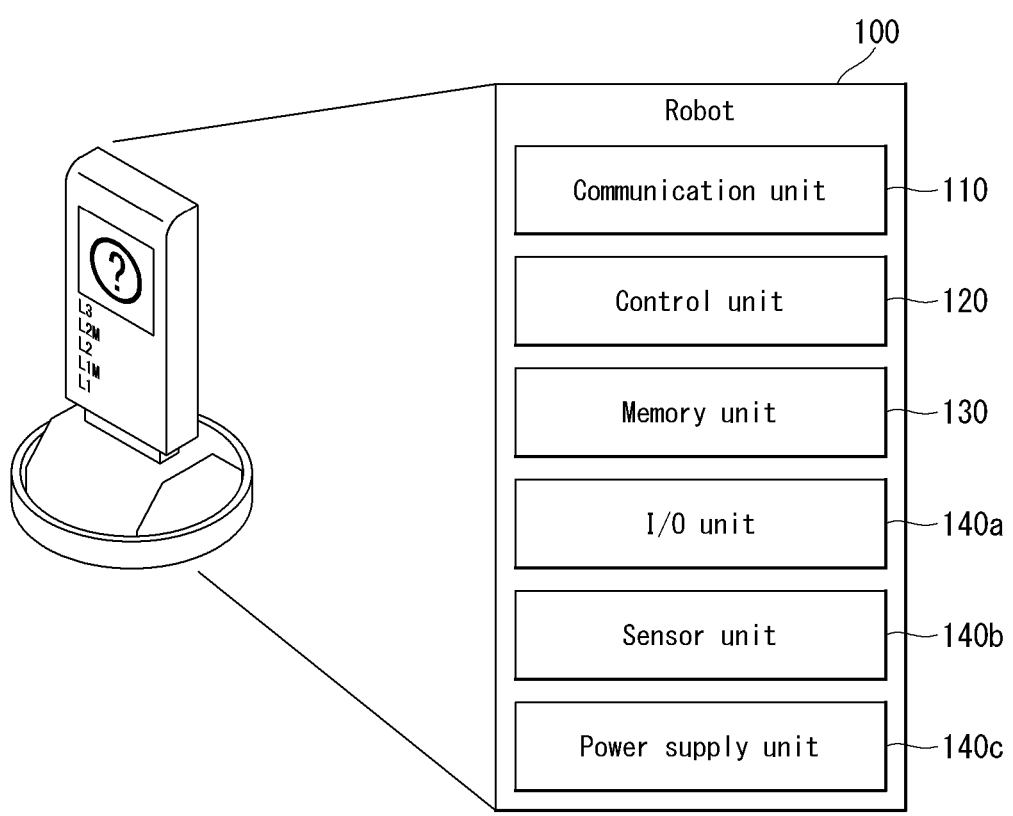
FIG. 29 illustrates a robot applied to the present disclosure.

FIG. 29 illustrates a robot applied to the present disclosure. Robots can be classified into industrial, medical, household, military, etc. depending on the purpose or field of use.

Referring to FIG. 29, the robot 100 may include a communication unit 110, a control unit 120, a memory unit 130, an input/output unit 140a, a sensor unit 140b, and a driving unit 140c.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The input/output unit 140a obtains information from the outside of the robot 100 and may output information to the outside of the robot 100. The input/output unit 140a may include a camera, a microphone, a user input unit, a display unit, a speaker, and/or a haptic module. The sensor unit 140b may obtain internal information of the robot 100, surrounding environment information, user information, and the like. The sensor unit 140b may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may cause the robot 100 to travel on the ground or fly in the air. The driving unit 140c may include an actuator, a motor, a wheel, a brake, a propeller, and the like.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the disclosure. Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

The present disclosure has been described mainly with the example applied to 3GPP LTE/LTE-A, 5G system, but may also be applied to various wireless communication systems except the 3GPP LTE/LTE-A, 5G system.

The invention claimed is:

1. A method of transmitting uplink data using a preconfigured uplink resource (PUR) in a wireless communication system, the method performed by a terminal and comprising:
receiving in a radio resource control (RRC) connected state, from a base station, configuration information for transmitting the uplink data using the PUR in an RRC idle state, wherein the configuration information includes first information regarding a timing advance (TA) validity timer and second information regarding a reference signal received power (RSRP) level;
transitioning from the RRC connected state to the RRC idle state; and
transmitting, to the base station, the uplink data using the PUR based on the configuration information in the RRC idle state,
wherein, based on i) the TA validity timer not being expired and ii) a RSRP measurement value being greater than or equal to the RSRP level, a TA for transmitting the uplink data using the PUR is determined to be valid, and
wherein there is only one hybrid automatic repeat request (HARQ) process for transmitting the uplink data using the PUR.

2. The method of claim 1, wherein the configuration information includes information on a transmission interval of the uplink data and information on a number of repetitions of transmission of the uplink data.

3. The method of claim 1, further comprising:
performing a random access procedure for updating the TA when the TA is not valid as a result of determining the validity of the TA.

4. The method of claim 1, further comprising:
receiving, from the base station, downlink control information (DCI) including resource information related to retransmission of the uplink data.

5. The method of claim 4, wherein the DCI is received in a new search space that is distinguished from a legacy search space.

6. The method of claim 5, wherein the configuration information further includes information related to the new search space.

7. A terminal configured to transmit uplink data using a preconfigured uplink resource (PUR) in a wireless communication system, the terminal comprising:
- a transmitter configured to transmit a radio signal;
- a receiver configured to receive a radio signal; and
- a processor configured to perform operations comprising:
  - receiving in a radio resource control (RRC) connected state, from a base station, configuration information for transmitting the uplink data using the PUR in an RRC idle state, wherein the configuration information includes first information regarding a timing advance (TA) validity timer and second information regarding a reference signal received power (RSRP) level;
  - transitioning from the RRC connected state to the RRC idle state; and
  - transmitting, to the base station, the uplink data using the PUR based on the configuration information in the RRC idle state,
- wherein, based on i) the TA validity timer not being expired and ii) a RSRP measurement value being greater than or equal to the RSRP level, a TA for transmitting the uplink data using the PUR is determined to be valid, and
- wherein there is only one hybrid automatic repeat request (HARQ) process for transmitting the uplink data using the PUR.

8. The terminal of claim 7, wherein the configuration information includes information regarding a transmission interval of the uplink data and information regarding a number of repetitions of transmission of the uplink data.

9. The terminal of claim 7, wherein the operations further comprise:
- performing a random access procedure for updating the TA when the TA is not valid as a result of determining the validity of the TA.

10. The terminal of claim 7, wherein the operations further comprise:
- receiving, from the base station, downlink control information (DCI) including resource information related to retransmission of the uplink data.

11. The terminal of claim 10, wherein the DCI is received in a new search space that is distinguished from a legacy search space.

12. The terminal of claim 11, wherein the configuration information further includes information related to the new search space.

13. A base station configured to receive uplink data using a preconfigured uplink resource (PUR) in a wireless communication system, the base station comprising:
- a transmitter configured to transmit a radio signal;
- a receiver configured to receive a radio signal; and
- a processor configured to perform operations comprising:
  - transmitting, to a terminal in a radio resource control (RRC) connected state, configuration information for receiving the uplink data using the PUR from the terminal in an RRC idle state, wherein the configuration information includes first information regarding a timing advance (TA) validity timer and second information regarding a reference signal received power (RSRP) level; and
  - receiving, from the terminal in the RRC idle state, the uplink data using the PUR based on the configuration information,
- wherein, based on i) the TA validity timer not being expired and ii) a RSRP measurement value being greater than or equal to the RSRP level, a TA for transmitting the uplink data using the PUR is determined to be valid, and
- wherein there is only one hybrid automatic repeat request (HARQ) process for transmitting the uplink data using the PUR.

* * * * *